US012099876B2

(12) United States Patent
Kondiles et al.

(10) Patent No.: US 12,099,876 B2
(45) Date of Patent: Sep. 24, 2024

(54) COORDINATING MAIN MEMORY ACCESS OF A PLURALITY OF SETS OF THREADS

(71) Applicant: Ocient Inc., Chicago, IL (US)

(72) Inventors: George Kondiles, Chicago, IL (US); Rhett Colin Starr, Long Grove, IL (US)

(73) Assignee: Ocient Inc., Chicago, IL (US)

( * ) Notice: Subject to any disclaimer, the term of this patent is extended or adjusted under 35 U.S.C. 154(b) by 336 days.

(21) Appl. No.: 16/732,560

(22) Filed: Jan. 2, 2020

(65) Prior Publication Data

US 2020/0133732 A1 Apr. 30, 2020

Related U.S. Application Data

(63) Continuation-in-part of application No. 16/267,608, filed on Feb. 5, 2019, now Pat. No. 11,977,545, and (Continued)

(51) Int. Cl.
*G06F 9/50* (2006.01)
*G06F 9/48* (2006.01)
*G06F 16/2453* (2019.01)

(52) U.S. Cl.
CPC .......... *G06F 9/5027* (2013.01); *G06F 9/4881* (2013.01); *G06F 9/5016* (2013.01); *G06F 9/5077* (2013.01); *G06F 16/24532* (2019.01)

(58) Field of Classification Search
CPC ................ G06F 9/5027; G06F 9/5016; G06F 16/24532; G06F 9/5077; G06F 9/4881; G06F 9/544
See application file for complete search history.

(56) References Cited

U.S. PATENT DOCUMENTS

| 5,548,770 A | 8/1996 | Bridges |
| 6,230,200 B1 | 5/2001 | Forecast |
| (Continued) | | |

OTHER PUBLICATIONS

A new high performance fabric for HPC, Michael Feldman, May 2016, Intersect360 Research.
(Continued)

*Primary Examiner* — Mariela Reyes
*Assistant Examiner* — Fernando M Mari Valcarcel
(74) *Attorney, Agent, or Firm* — Garlick & Markison; Bruce E. Stuckman; Timothy Taylor

(57) ABSTRACT

A computing device includes a plurality of nodes, where a first node operates in accordance with a computing device operation system (OS) and remaining nodes operate in accordance with a custom OS. The remaining nodes include a plurality of sets of processing core resources that process a plurality of sets of threads of an application. The computing device also includes a main memory divided into a computing device memory section and a custom memory section that includes portions logically allocated as a plurality of buffers. The computing device also includes a memory access control module operable to coordinate access to the plurality of buffers by at least some of the plurality of sets of threads in accordance with the custom OS. The computing device also includes disk memory and a disk memory access control module operable to coordinate access to the disk memory in accordance with the computing device OS.

8 Claims, 65 Drawing Sheets

Related U.S. Application Data a continuation-in-part of application No. 15/942,976, filed on Apr. 2, 2018, now abandoned.

(60) Provisional application No. 62/745,787, filed on Oct. 15, 2018, provisional application No. 62/480,601, filed on Apr. 3, 2017.

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,577,667 | B2* | 8/2009 | Hinshaw ............ G06F 16/2455 |
| 7,908,242 | B1 | 3/2011 | Achanta |
| 8,024,731 | B1* | 9/2011 | Cornwell ............. G06F 9/4881 |
| | | | 718/103 |
| 2001/0051949 | A1 | 12/2001 | Carey |
| 2002/0032676 | A1 | 3/2002 | Reiner |
| 2004/0162853 | A1 | 8/2004 | Brodersen |
| 2006/0161922 | A1* | 7/2006 | Amano ................ G06F 9/4881 |
| | | | 718/103 |
| 2007/0124568 | A1* | 5/2007 | Kra ........................ G06F 9/462 |
| | | | 712/226 |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2009/0254917 | A1* | 10/2009 | Ohtani ................. G06F 9/5027 |
| | | | 718/104 |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0131584 | A1* | 5/2012 | Raevsky ................ G06F 8/451 |
| | | | 718/102 |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2014/0192583 | A1* | 7/2014 | Rajan ...................... G11C 5/06 |
| | | | 365/63 |
| 2015/0149514 | A1* | 5/2015 | Kim ................... G06F 16/2282 |
| | | | 711/170 |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2016/0092235 | A1* | 3/2016 | Gonzalez-Alberquilla ................ G06F 9/3851 |
| | | | 712/220 |
| 2016/0283278 | A1* | 9/2016 | Duran Gonzalez ....... G06F 9/46 |
| 2017/0010834 | A1* | 1/2017 | Parkes ................. G06F 12/023 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy . . . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable_html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplied Data Processing on Large Clusters, OSDI 2004, Jeffrey Dean and Sanjay Ghemawat, Google, Inc.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws. amazon.com/amazondynamodb/latestldeveloperguide!Ti . . . .

* cited by examiner

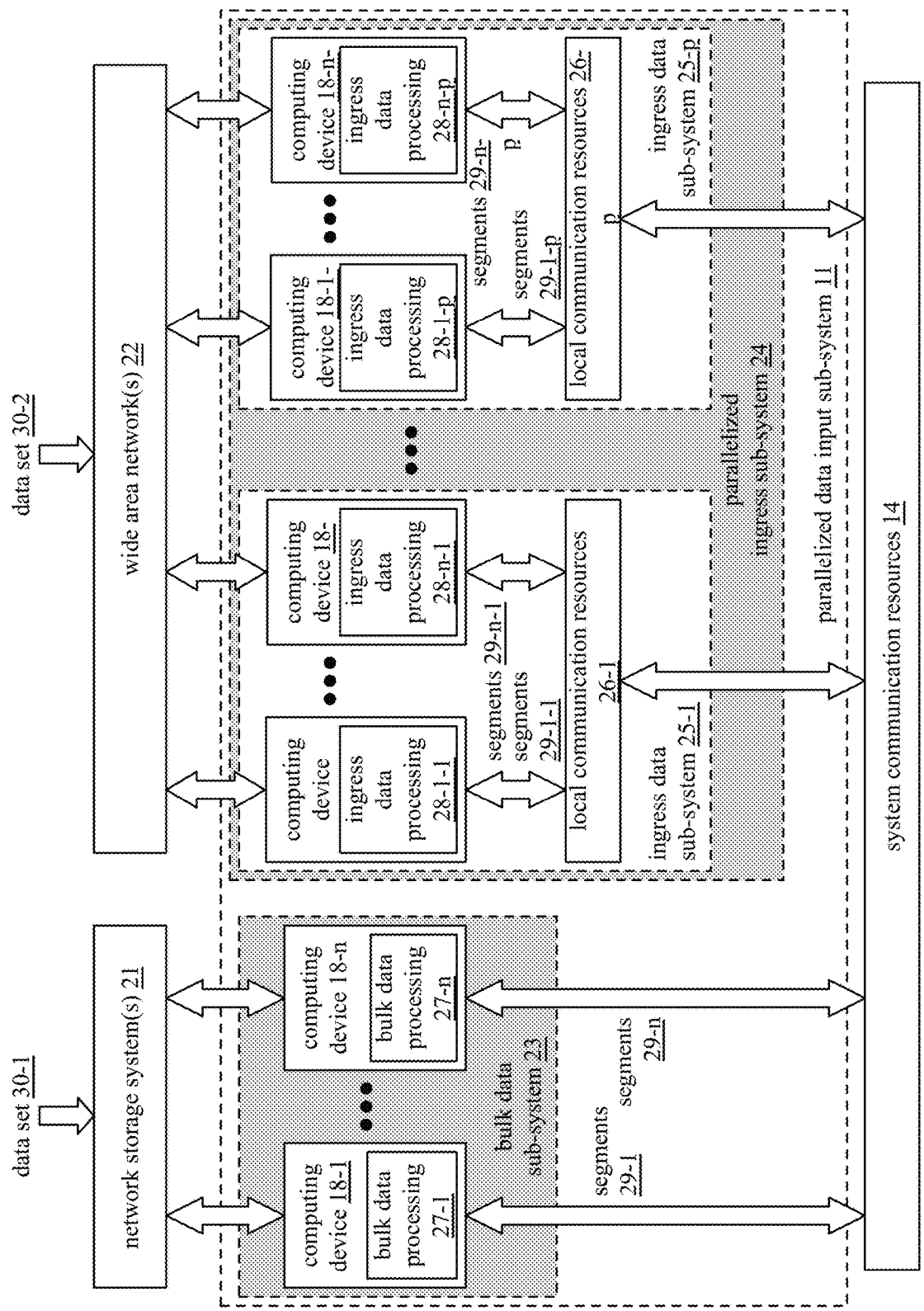

computing device 18 computing device 18 computing device 18

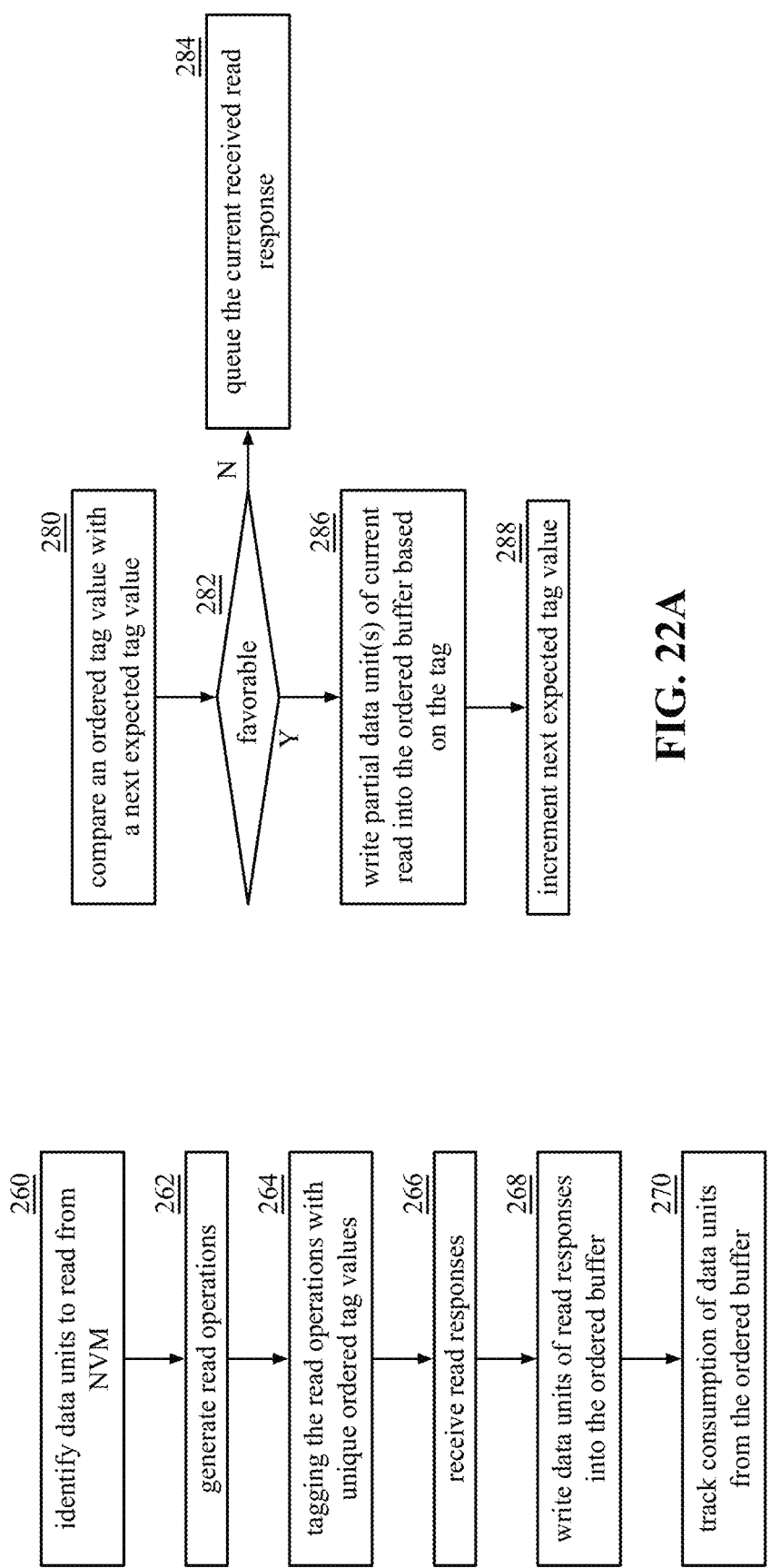

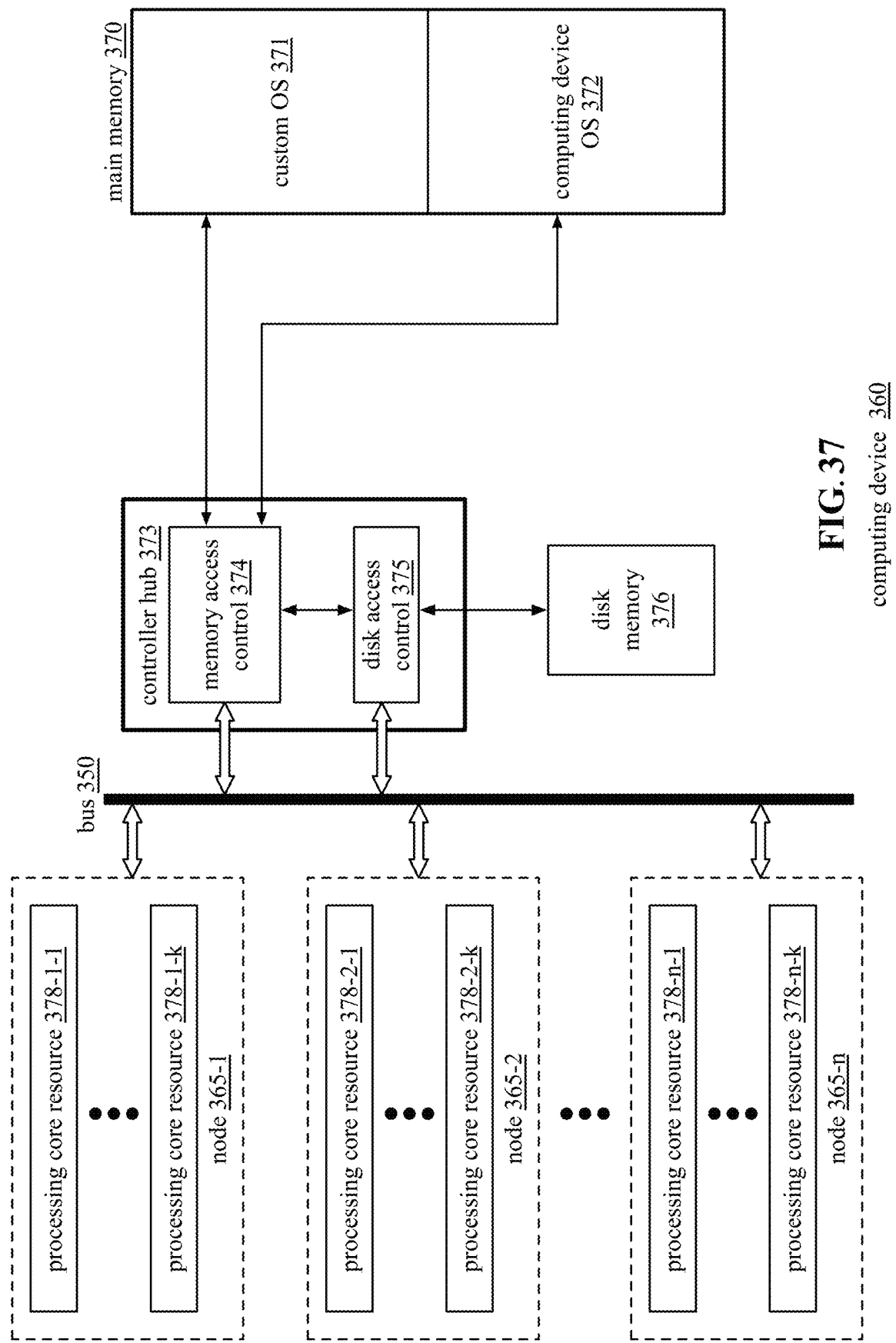
FIG.37 computing device 360

DBT = database thread
CDT = computing device thread

FIG. 43

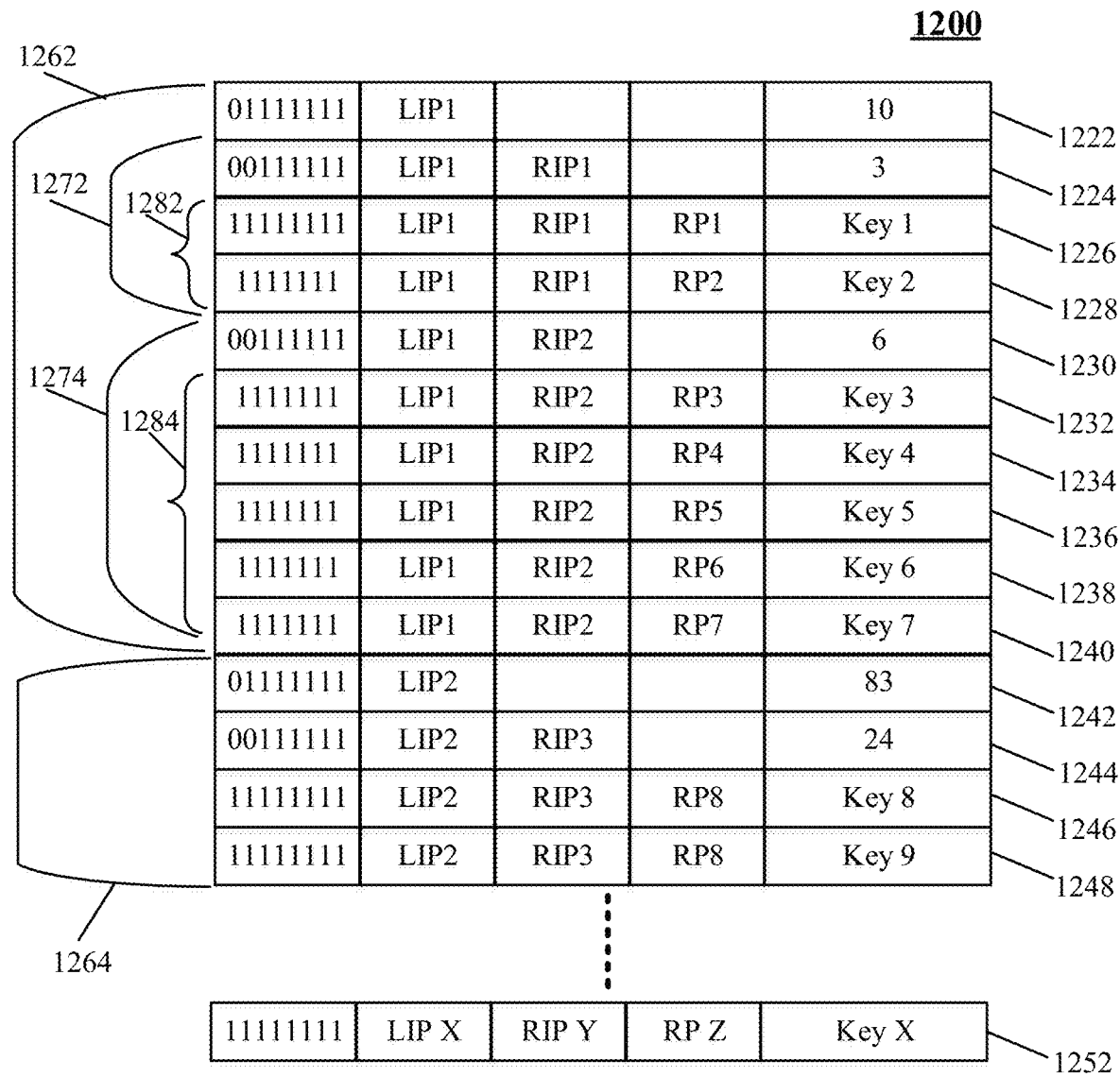
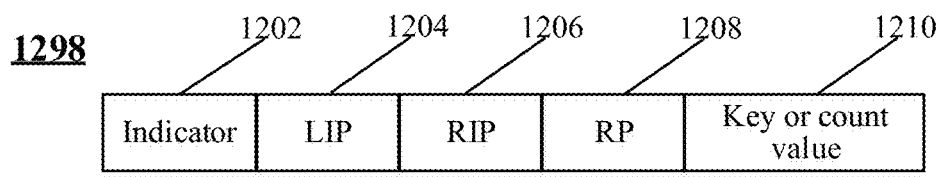
FIG. 51

COORDINATING MAIN MEMORY ACCESS OF A PLURALITY OF SETS OF THREADS

CROSS-REFERENCE TO RELATED APPLICATIONS

The present U.S. Utility Patent Application claims priority pursuant to 35 U.S.C. § 120 as a continuation-in-part of U.S. application Ser. No. 15/942,976, entitled "DATABASE MANAGEMENT SYSTEM CLUSTER NODE SUBTASKING DATA QUERY," filed Apr. 2, 2018, which claims priority pursuant to 35 U.S.C. § 119(e) to U.S. Provisional Application No. 62/480,601, entitled "DATABASE MANAGEMENT SYSTEM USING HYBRID INDEXING LIST AND HIERARCHICAL QUERY PROCESSING ARCHITECTURE," filed Apr. 3, 2017, all of which are hereby incorporated herein by reference in their entirety and made part of the present U.S. Utility Patent Application for all purposes.

The present U.S. Utility Patent Application also claims priority pursuant to 35 U.S.C. § 120 as a continuation-in-part of U.S. application Ser. No. 16/267,608, entitled "GENERATION OF A QUERY PLAN IN A DATABASE SYSTEM," filed Feb. 5, 2019, which claims priority pursuant to 35 U.S.C. § 119(e) to U.S. Provisional Application No. 62/745,787, entitled "DATABASE SYSTEM AND OPERATION," filed Oct. 15, 2018, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 4 is a schematic block diagram of an embodiment of a parallelized data input sub-system in accordance with the present invention;

FIGS. 22 and 22A are a logic diagram of an example of a method for creating tagged read operations and processing responses thereto in accordance with the present invention;

FIG. 37 is a schematic block diagram of another example of a computing device in accordance with the present invention;

Figure 38B:
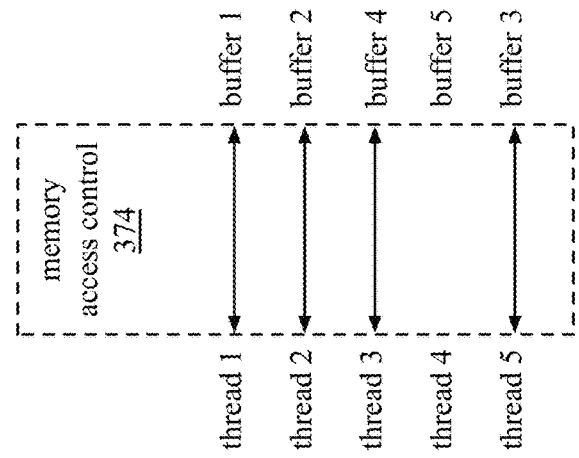
FIG. 38B is a schematic block diagram of an embodiment of assigning threads to buffers in accordance with the present invention.
Figure 38A:
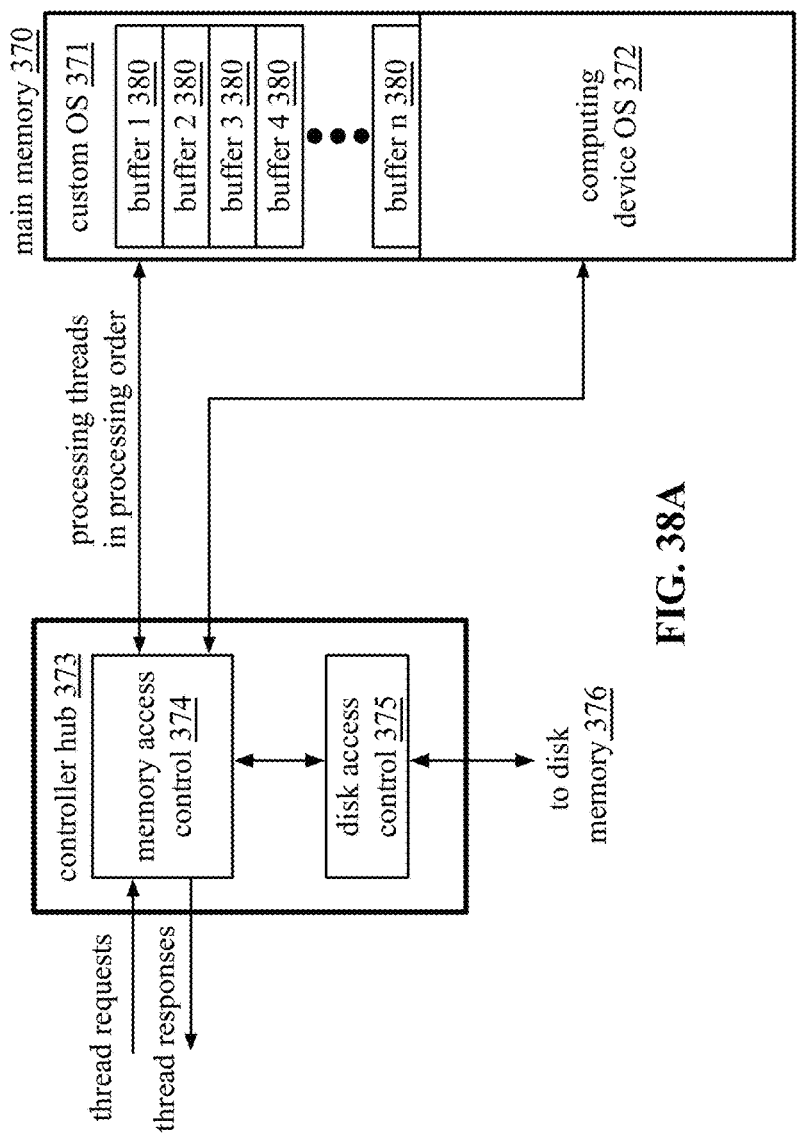
FIG. 38A is a schematic block diagram of an embodiment of a controller hub and a main memory of a computing device in accordance with the present invention.
Figure 38C:
Figure 38D:
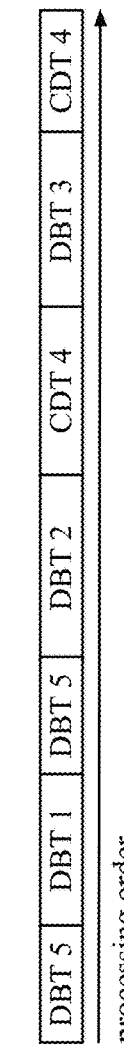
Figure 39:
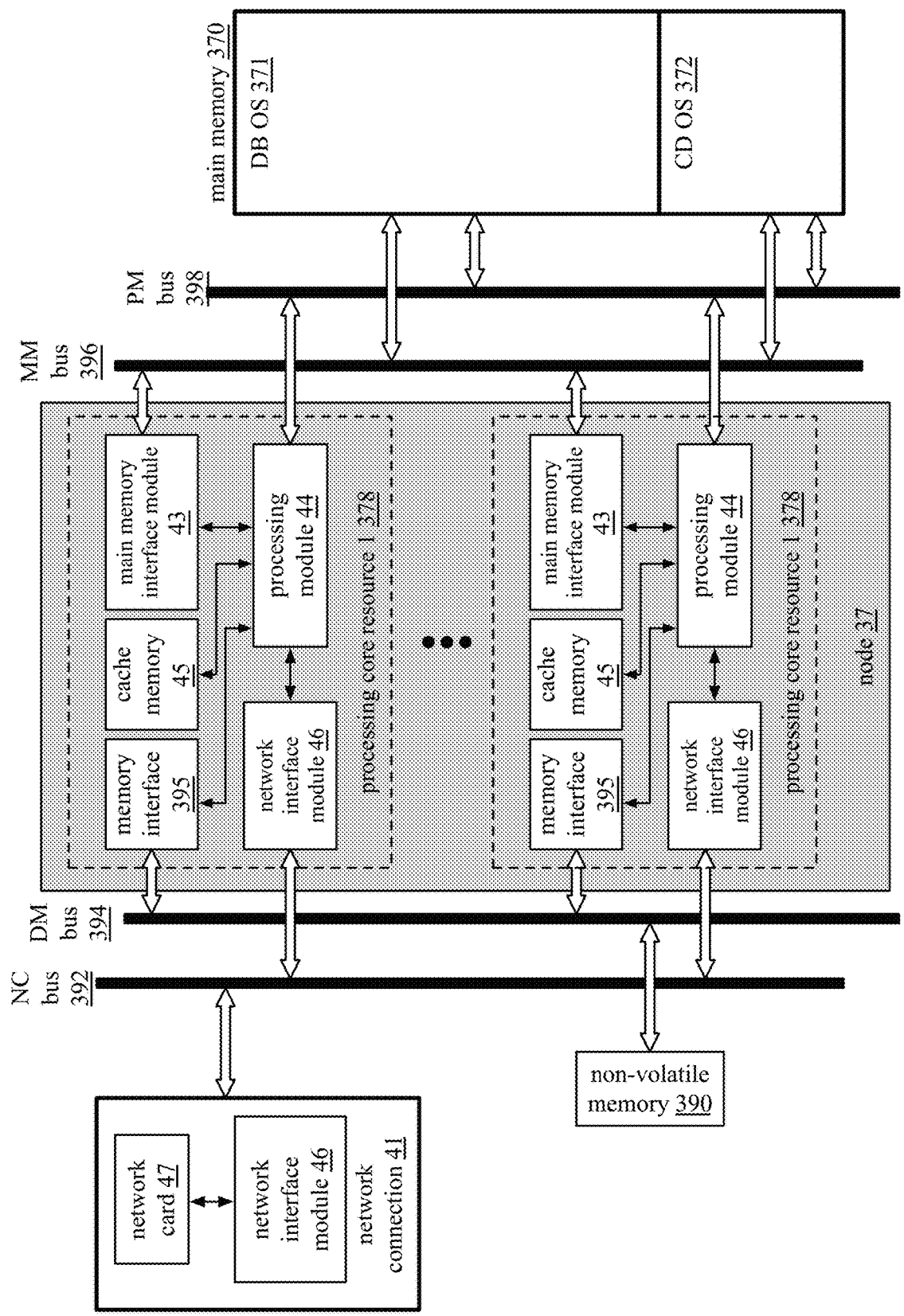
Figure 40:
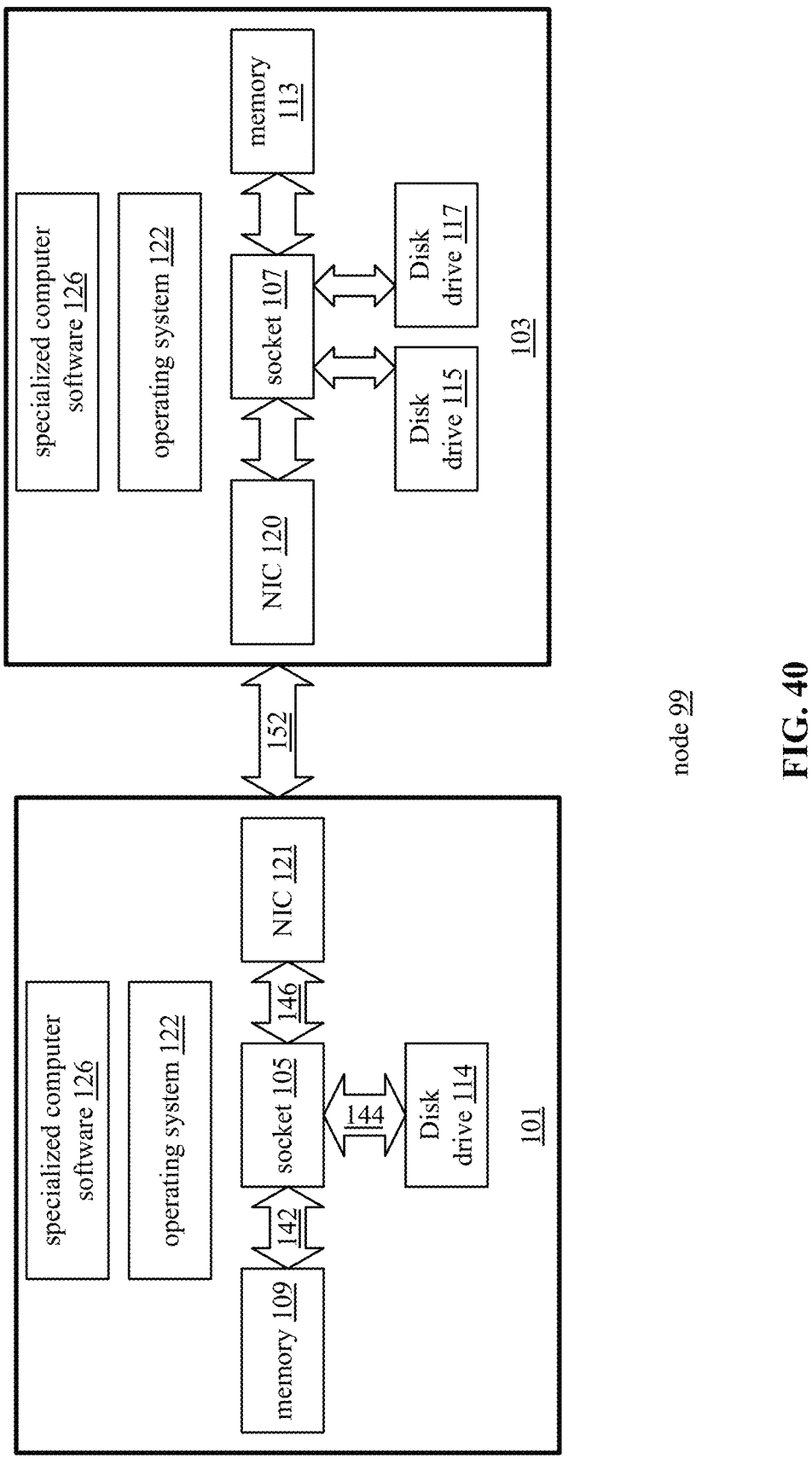
Figure 41A:
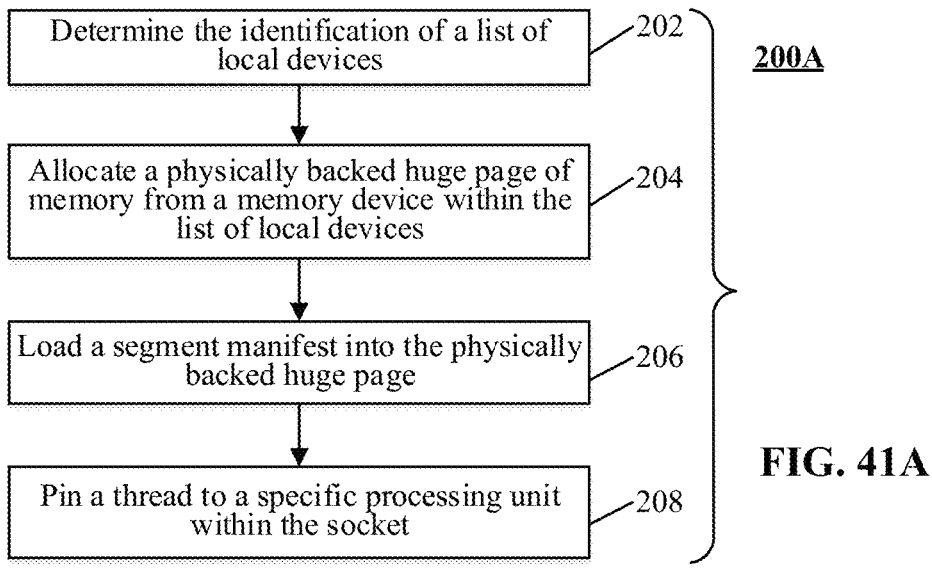
Figure 41B:
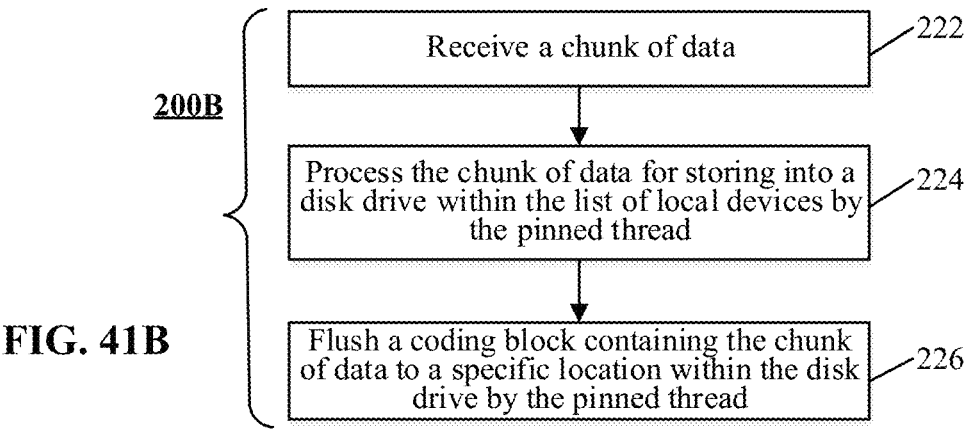
Figure 41C:
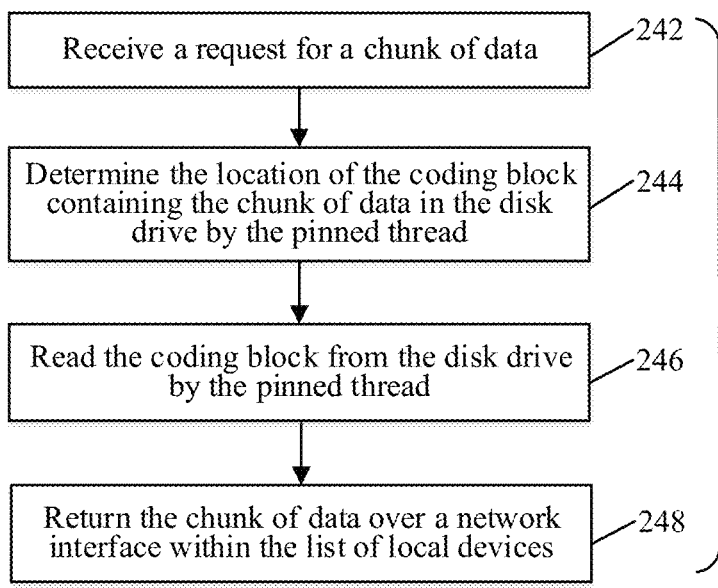
Figure 42:
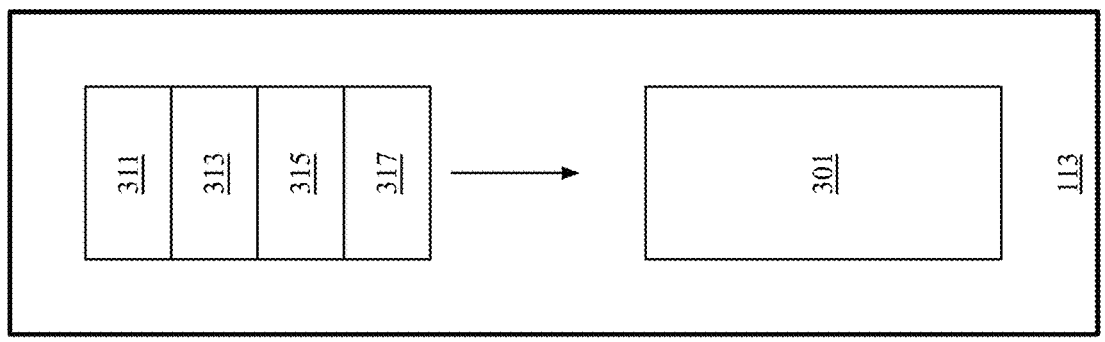
Figure 44:
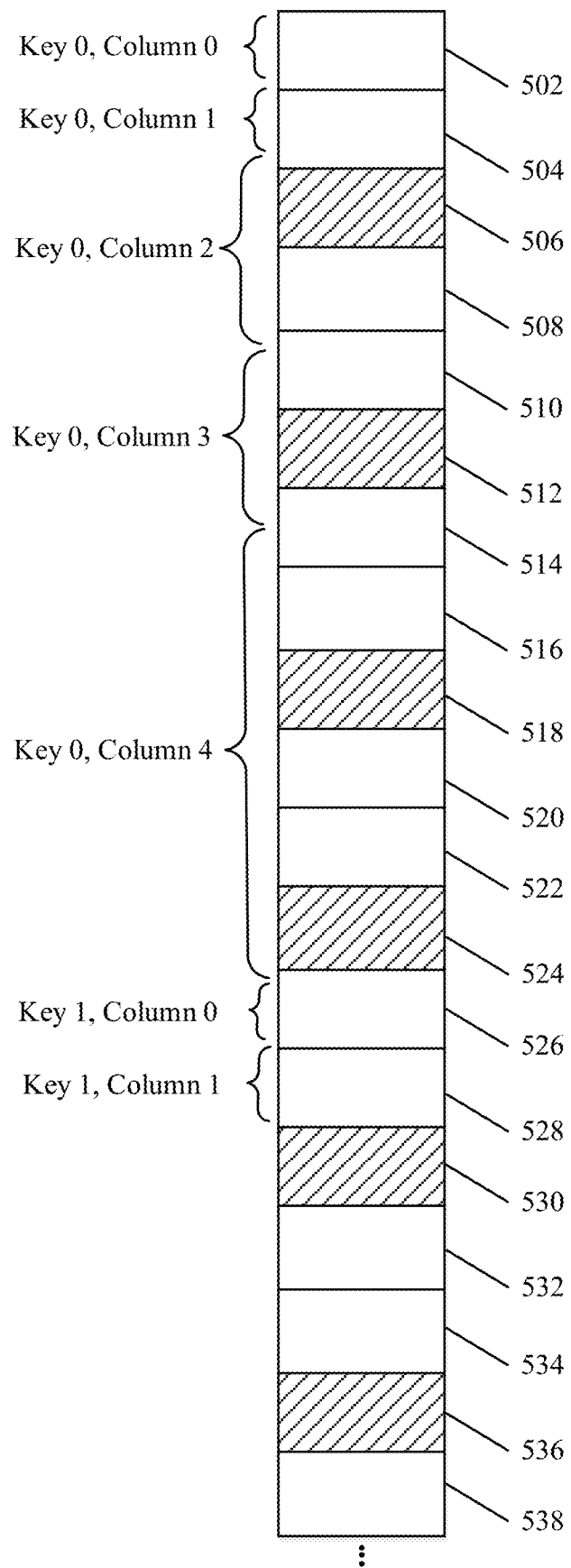
Figure 45:
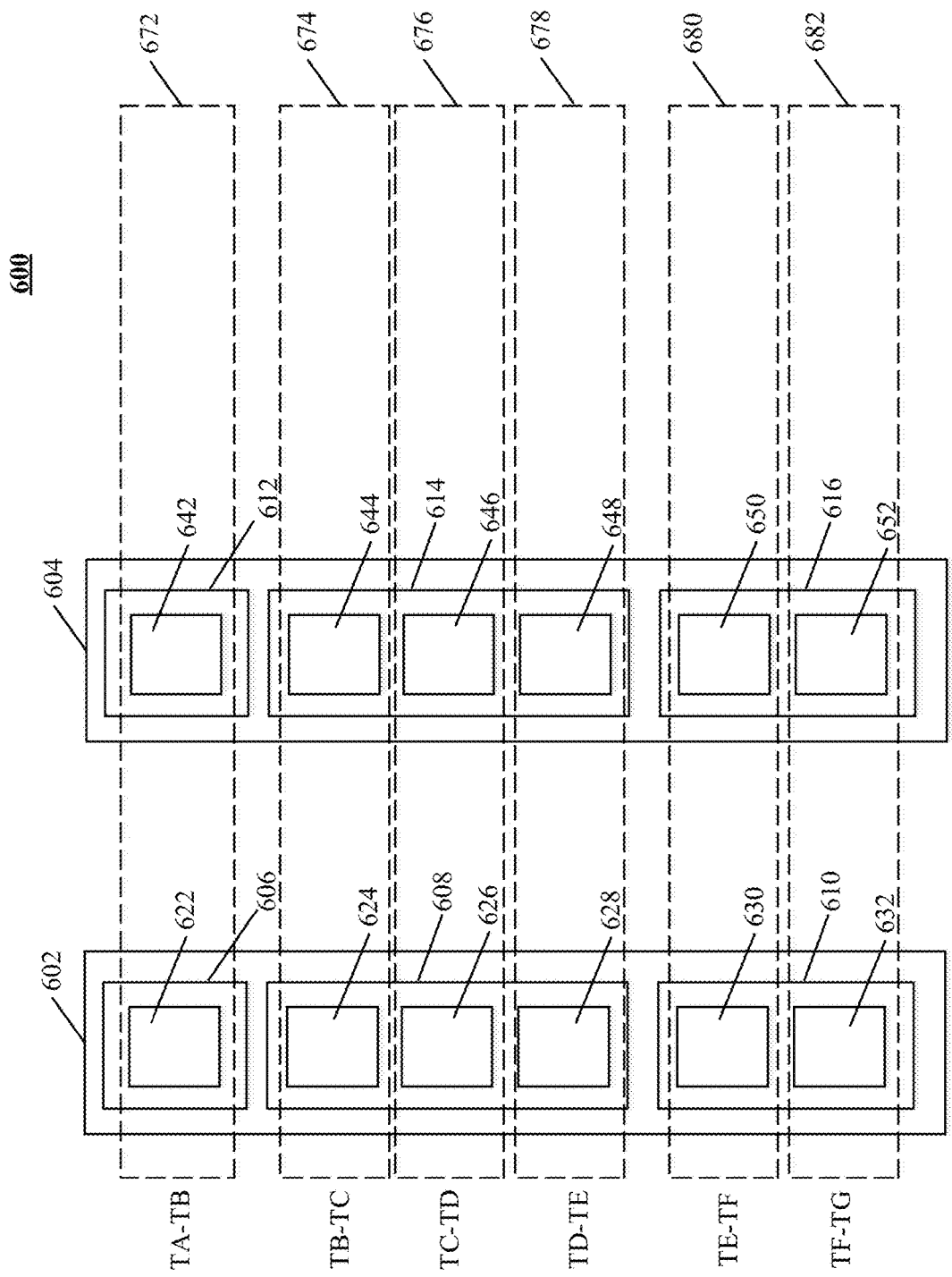
Figure 46:
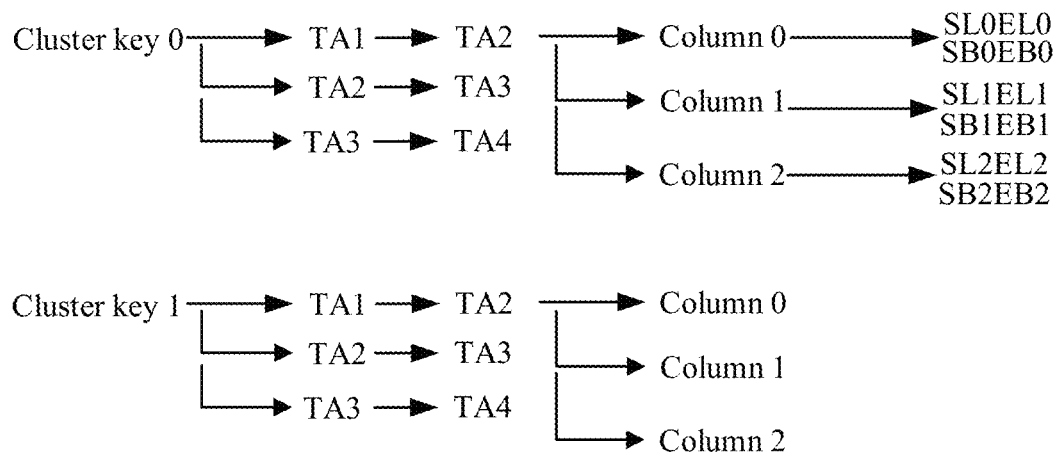
Figure 47:
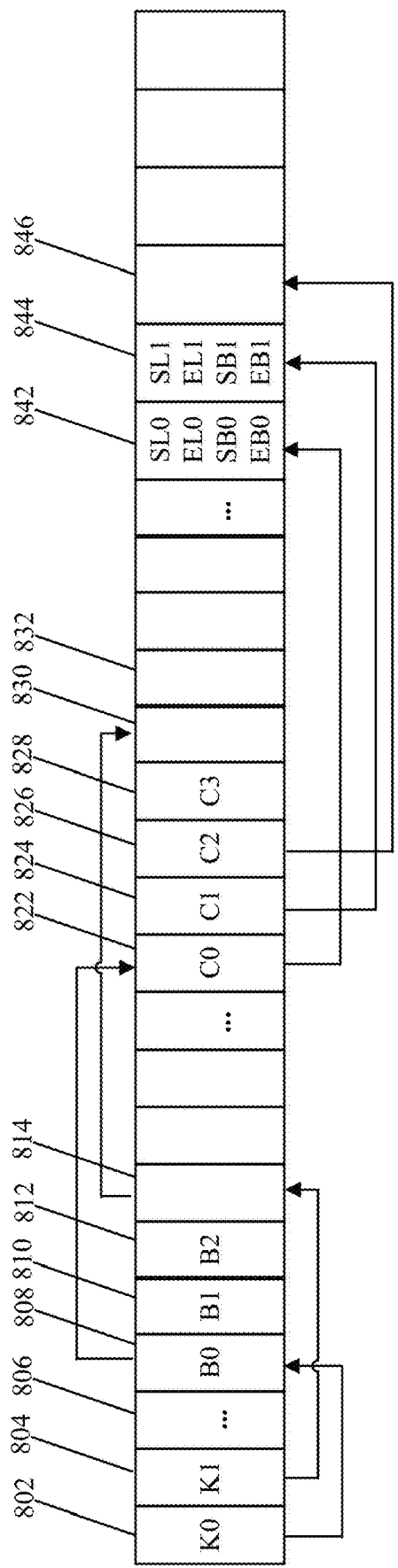
Figure 48:
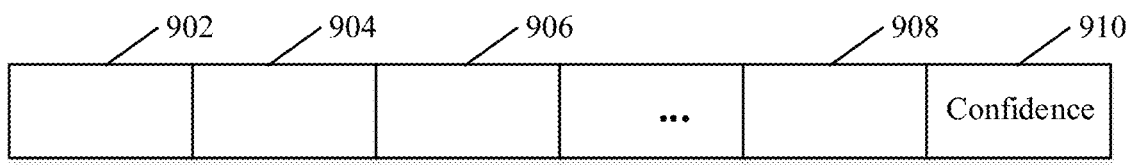
Figures 49A, 49B:
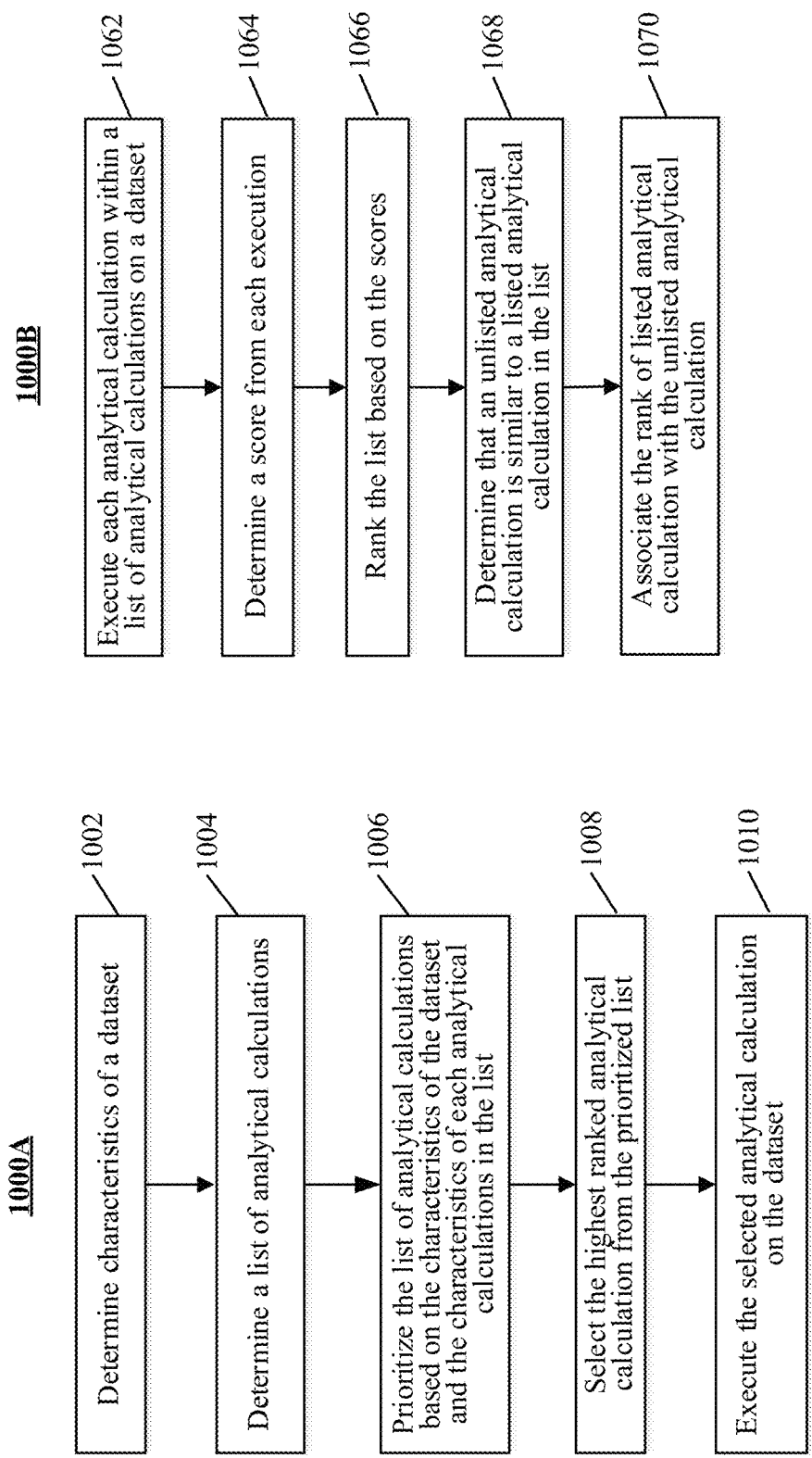
Figure 50:
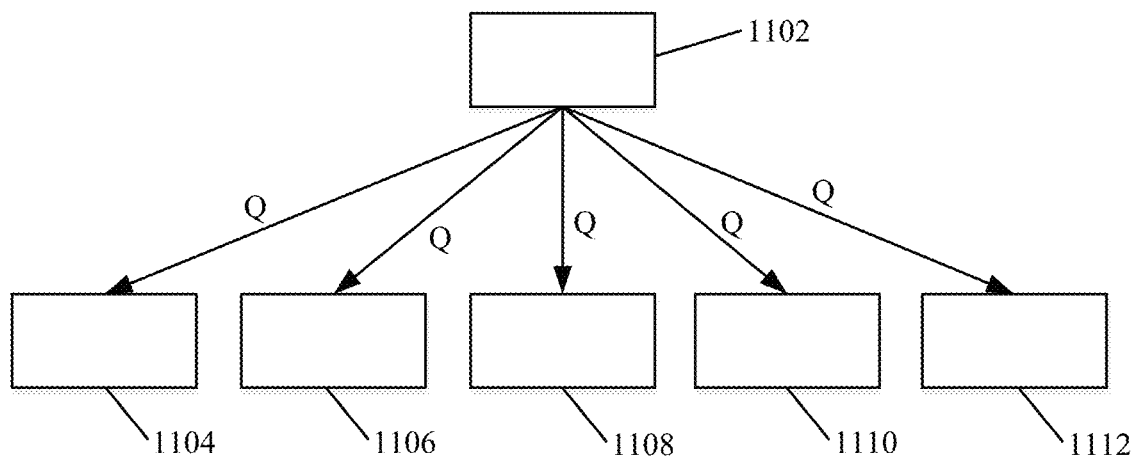
Figure 52:
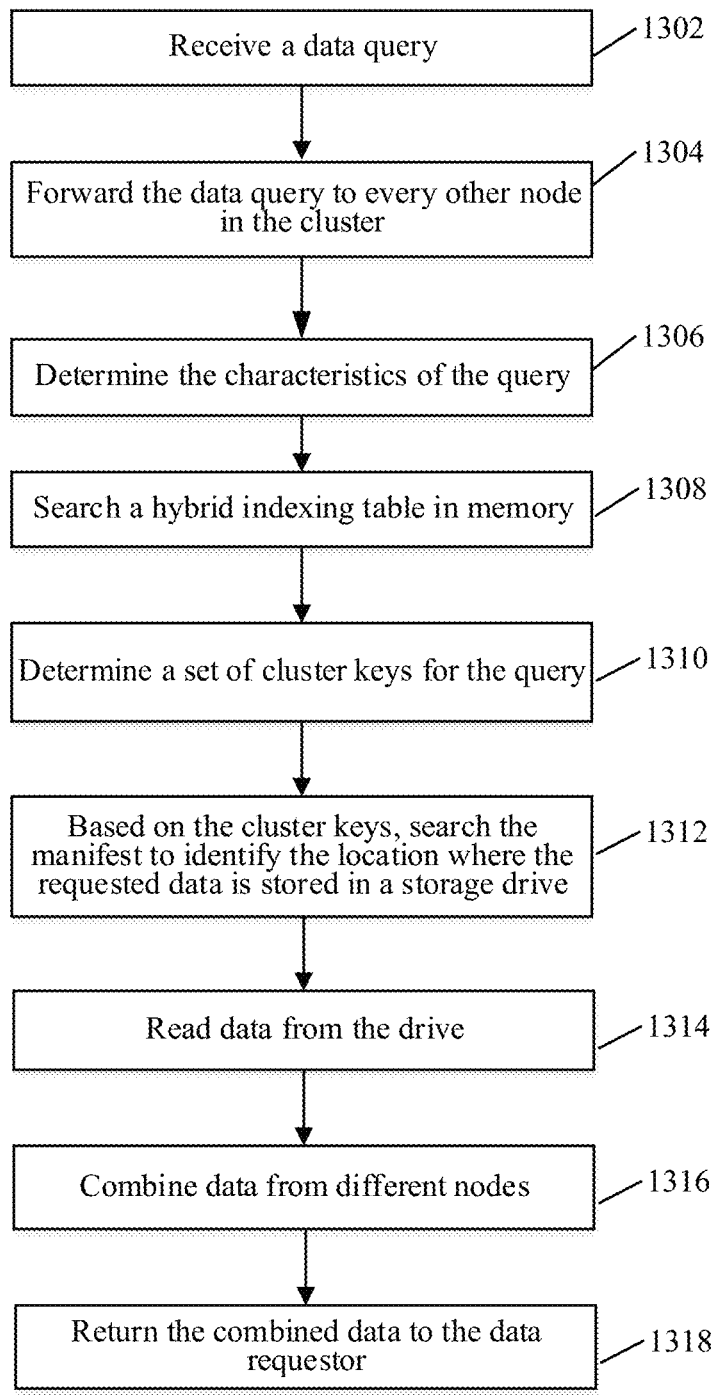
Figure 53:
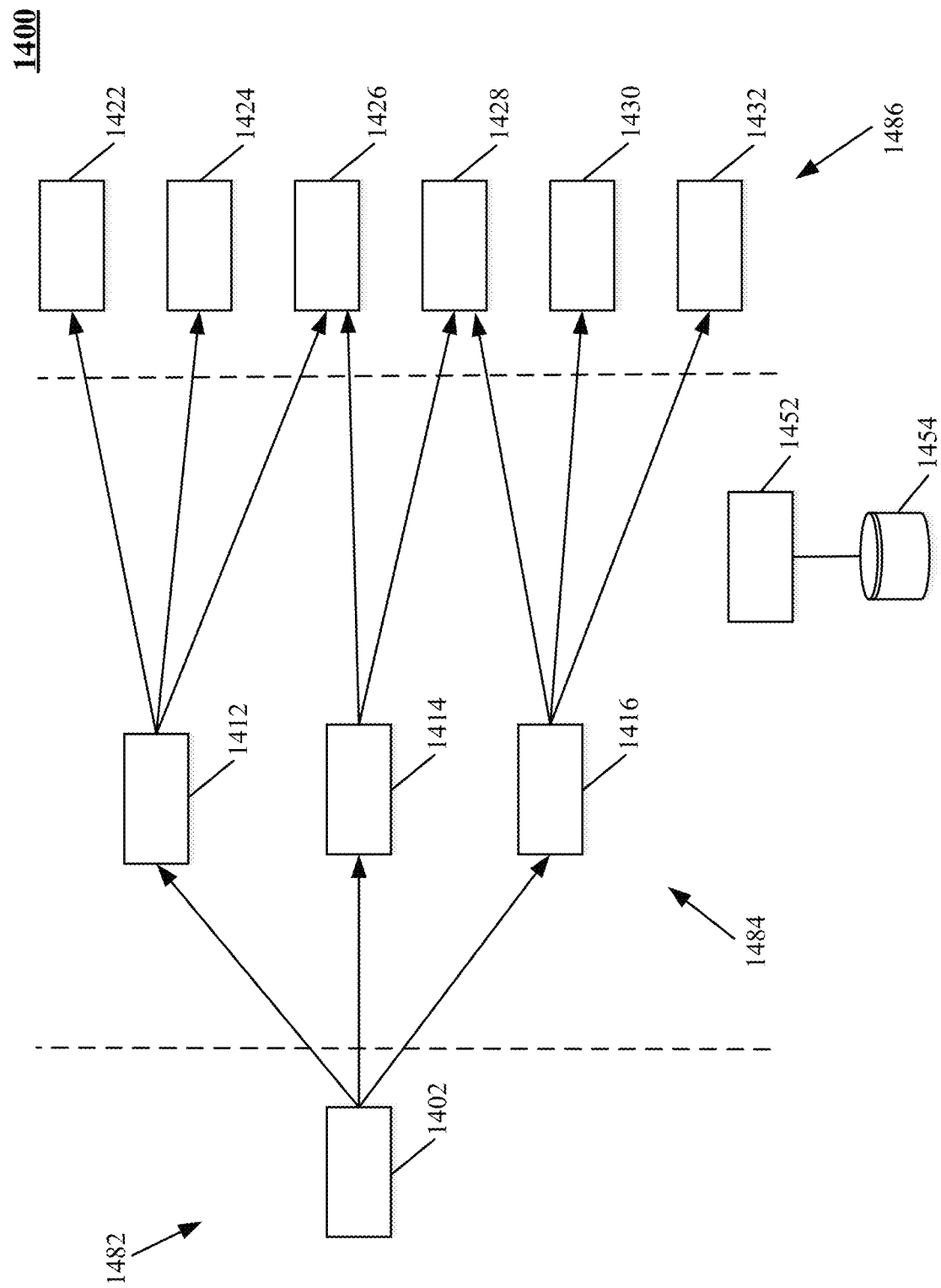
Figure 54:
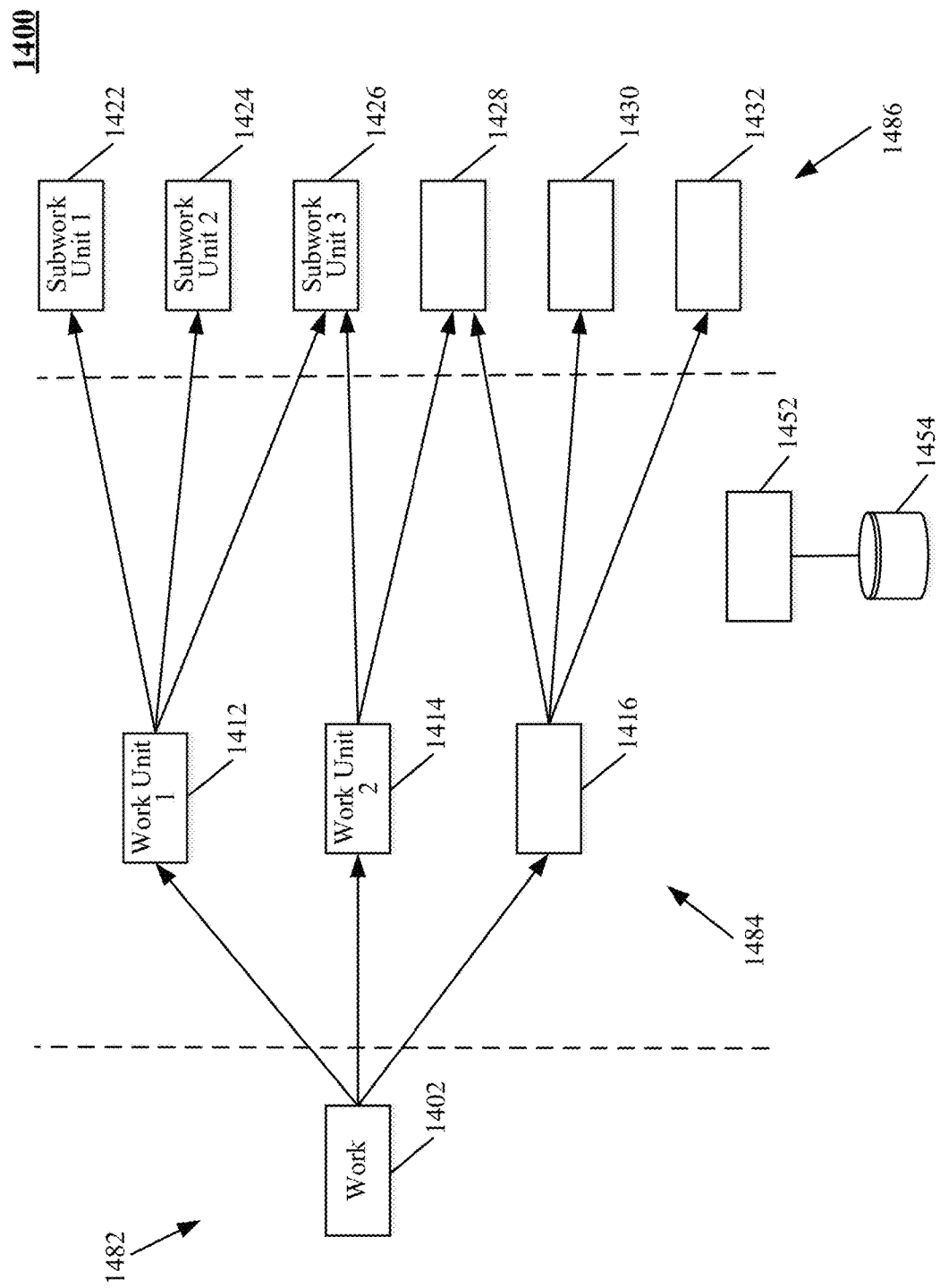
Figure 55:
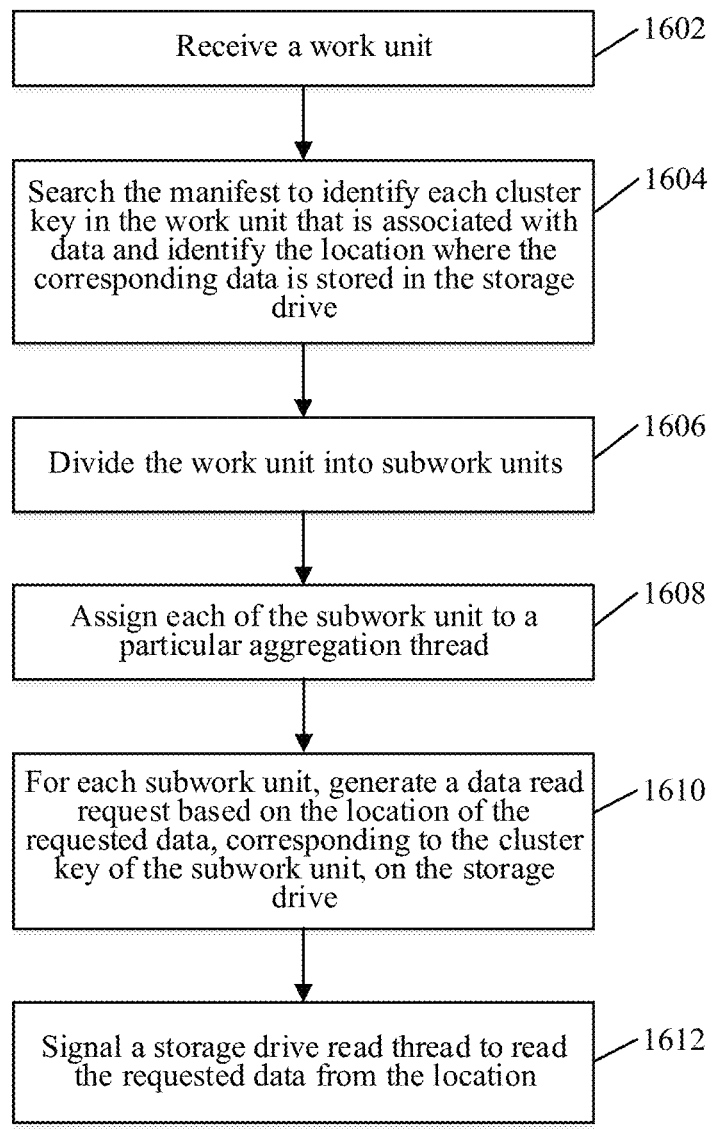
Figure 56:
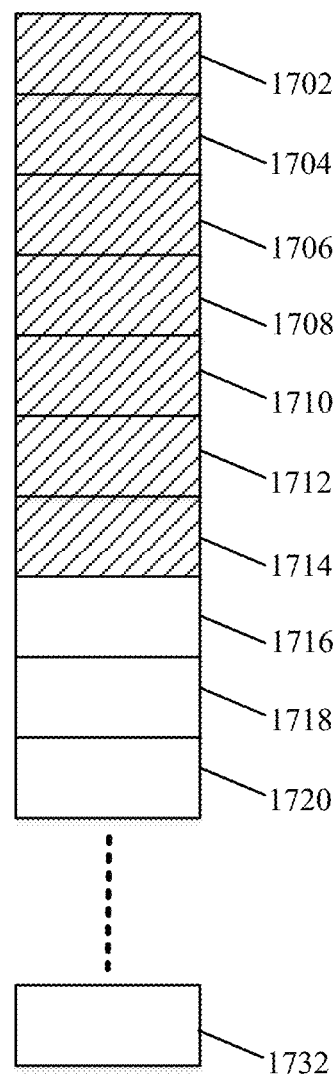
Figure 57:
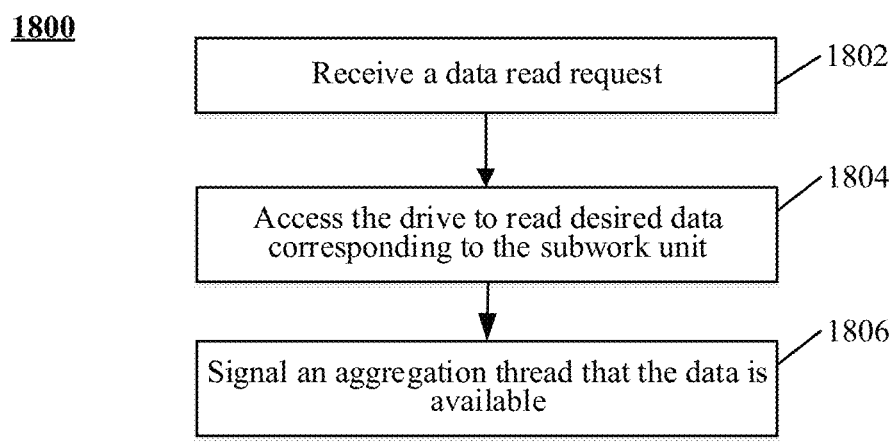
Figure 58:
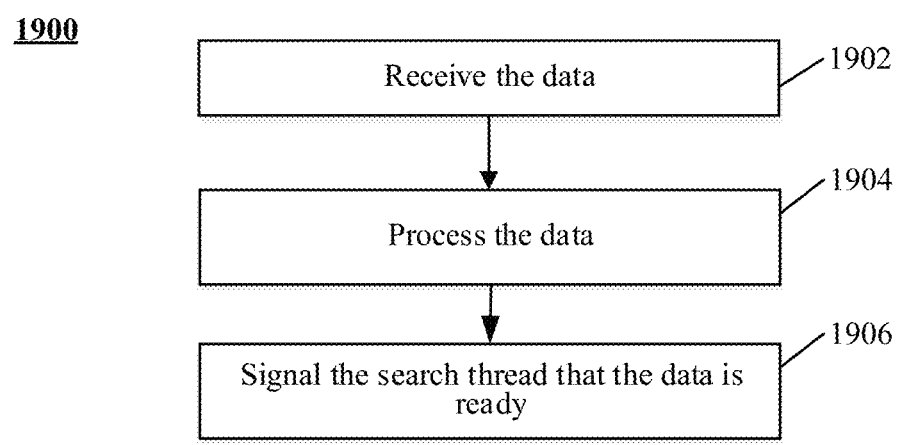
Figure 59:
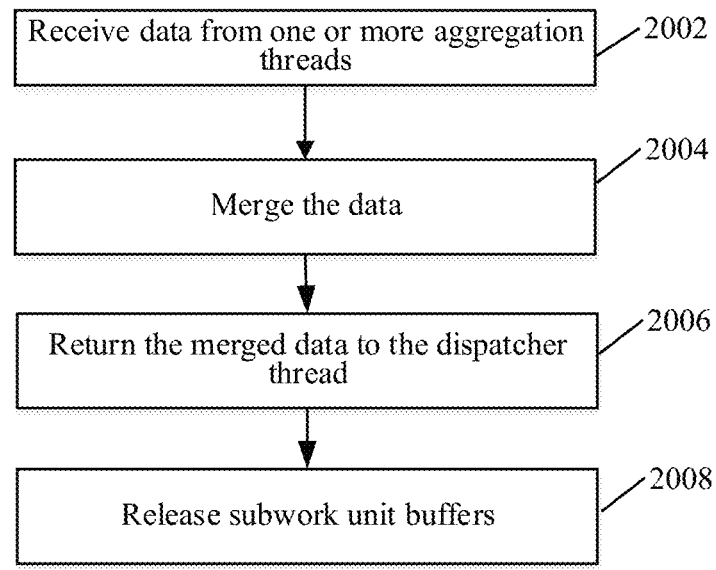
Figure 60:
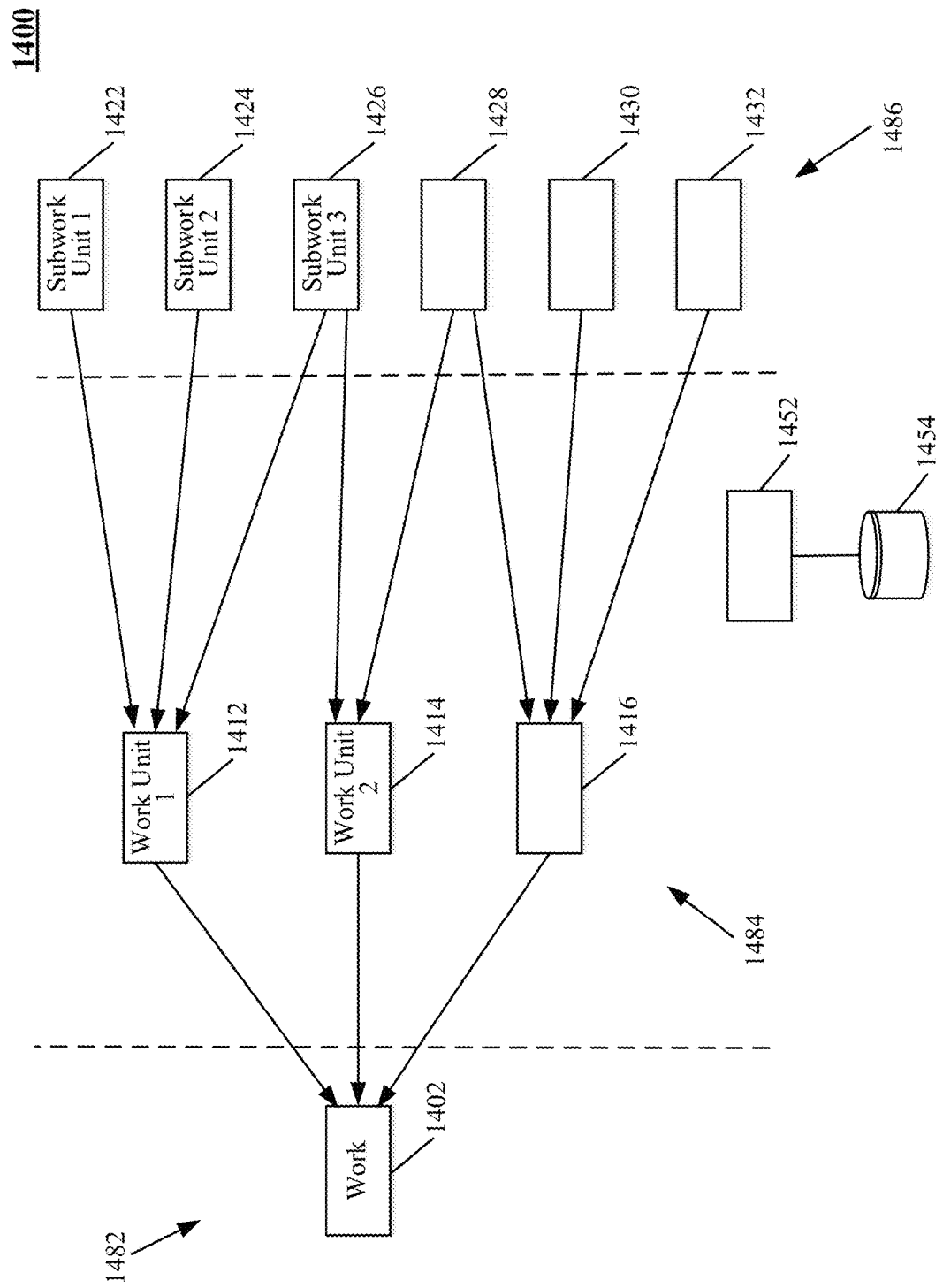
Figure 61:
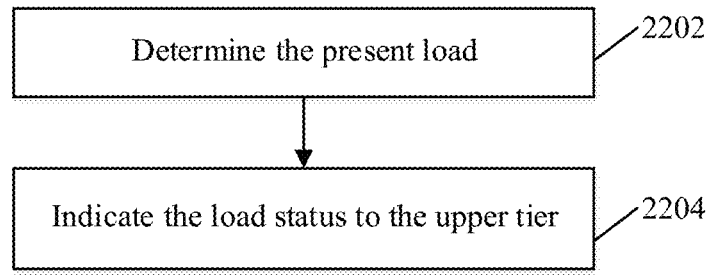
Figure 62:
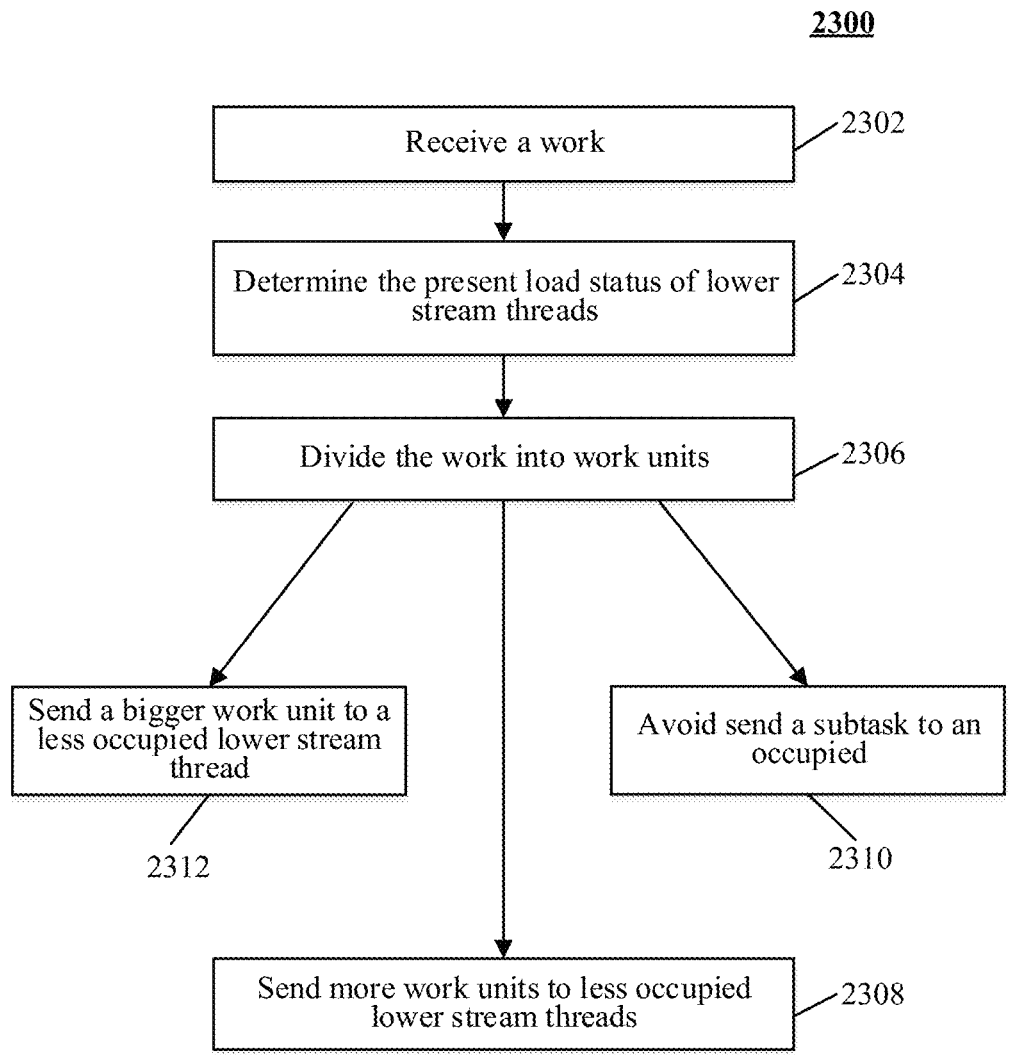
Figure 63:
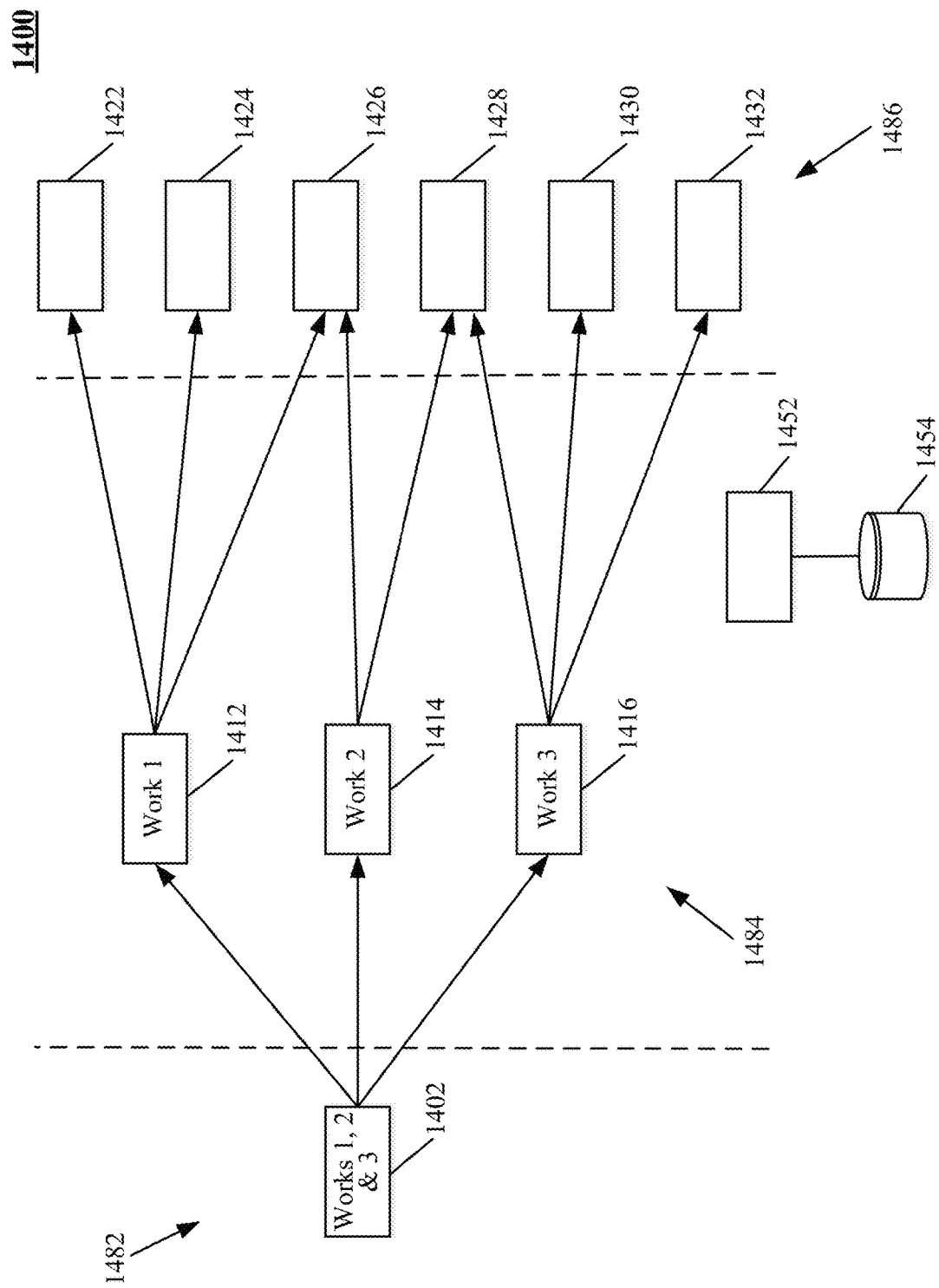
Figure 64:
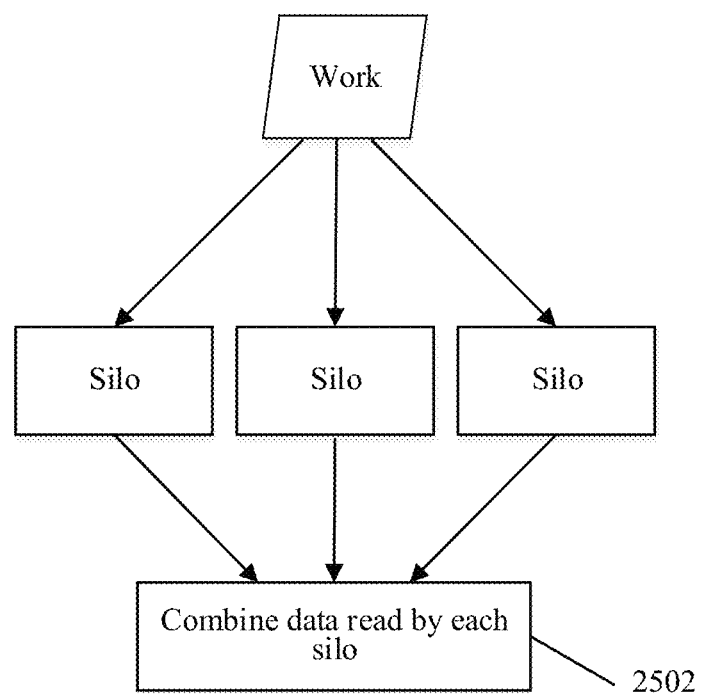

FIGS. 38C-D are schematic block diagrams of embodiments of thread processing order in accordance with the present invention;

FIG. 39 is a schematic block diagram of another embodiment of a node of a computing device in accordance with the present invention;

FIG. 40 is a schematic block diagram of another embodiment of a node of a computing device in accordance with the present invention;

FIGS. 41A, 41B and 41C are flowcharts illustrating processes by which a node implements a silo oriented highly efficient database management in accordance with the present invention;

FIG. 42 is a schematic block diagram of an embodiment of a segment with a manifest in accordance with the present invention;

Figure 43:
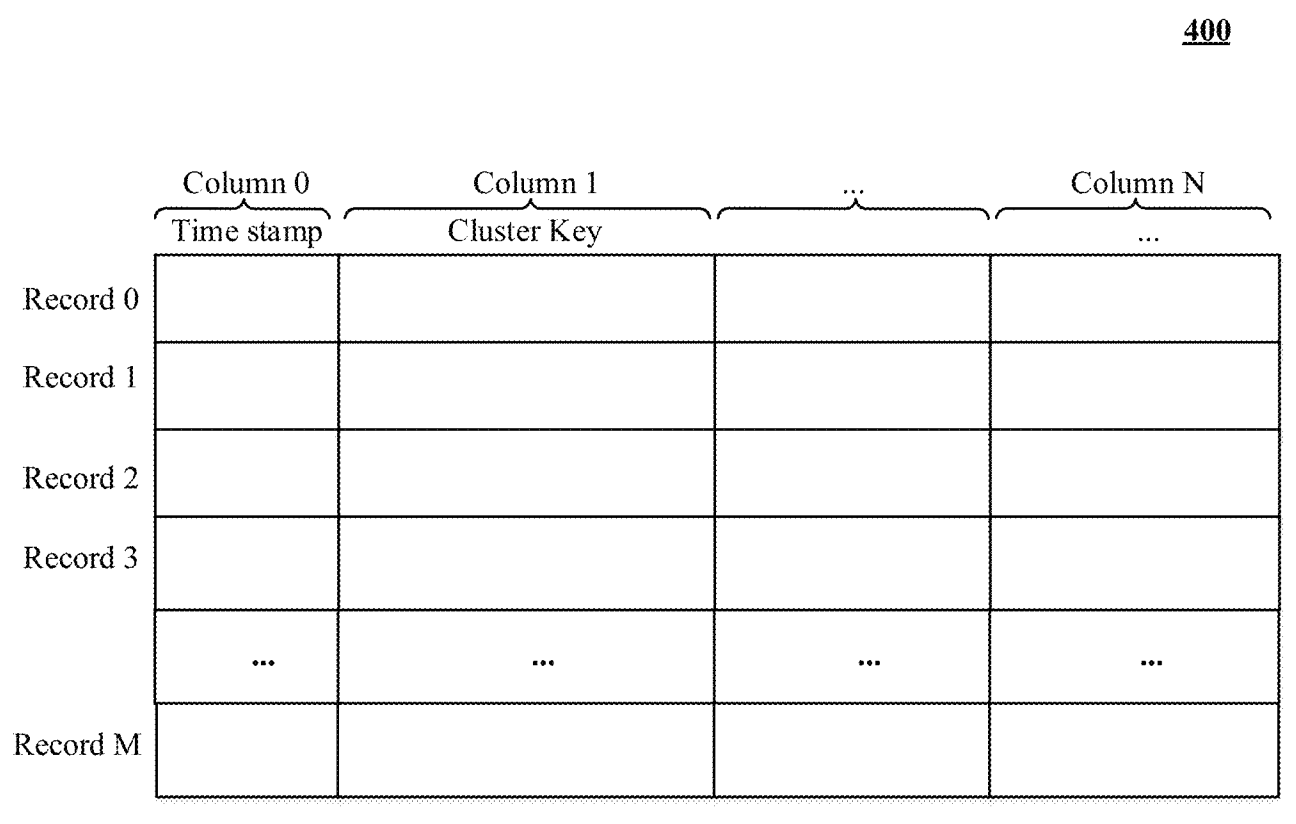

FIG. 43 is a schematic block diagram of an embodiment of a table illustrating time stamp based data in accordance with the present invention;

FIG. 44 is a schematic block diagram of an embodiment of a layout of records stored in a segment in accordance with the present invention;

FIG. 45 is a schematic block diagram of an embodiment of a storage cluster of time based data in accordance with the present invention;

FIG. 46 is a schematic block diagram of an embodiment of a logical representation of a manifest in accordance with the present invention;

FIG. 47 is a schematic block diagram of an embodiment of a memory structure of the manifest in accordance with the present invention;

FIG. 48 is a schematic block diagram of an embodiment of a data record in accordance with the present invention;

FIGS. 49A-B are flowcharts illustrating examples of a method of a node prioritizing analytical calculations in accordance with the present invention;

FIG. 50 is a schematic block diagram of an embodiment of a cluster of nodes in accordance with the present invention;

FIG. 51 is a schematic block diagram of an embodiment of a high speed hybrid indexing table in accordance with the present invention;

FIG. 52 is a flowchart illustrating an example of a method of a high speed data retrieval in accordance with the present invention;

FIG. 53 is a schematic block diagram of an embodiment of a three layer hierarchical data query and fetched data processing architecture in accordance with the present invention;

FIG. 54 is a schematic block diagram of an embodiment of dividing work into one or more work units that are processed in parallel in accordance with the present invention;

FIG. 55 is a flowchart illustrating a process by which a search thread processes a work unit in accordance with the present invention;

FIG. 56 is a schematic block diagram of an embodiment of a buffer list in accordance with the present invention;

FIG. 57 is a flowchart illustrating an example of a method of a thread handling data read requests in accordance with the present invention;

FIG. 58 is a flowchart illustrating an example of a method of an aggregation thread processing a data read in accordance with the present invention;

FIG. 59 is a flowchart illustrating an example of a method of a search thread receiving data from aggregation threads in accordance with the present invention;

FIG. 60 is a schematic block diagram of an embodiment of data flow of threads in accordance with the present invention;

FIG. 61 is a flowchart illustrating an example of a method of backward pressure communication in accordance with the present invention;

FIG. 62 is a flowchart illustrating an example of a method of an upper tier allocating tasks based on backwards pressure in accordance with the present invention;

FIG. 63 is a schematic block diagram of an embodiment of an example of a search thread processing a work unit in accordance with the present invention; and FIG. 64 is a schematic block diagram of an embodiment of concurrently processing work by more than one silo within a node.

DETAILED DESCRIPTION OF THE INVENTION

Figure 1:
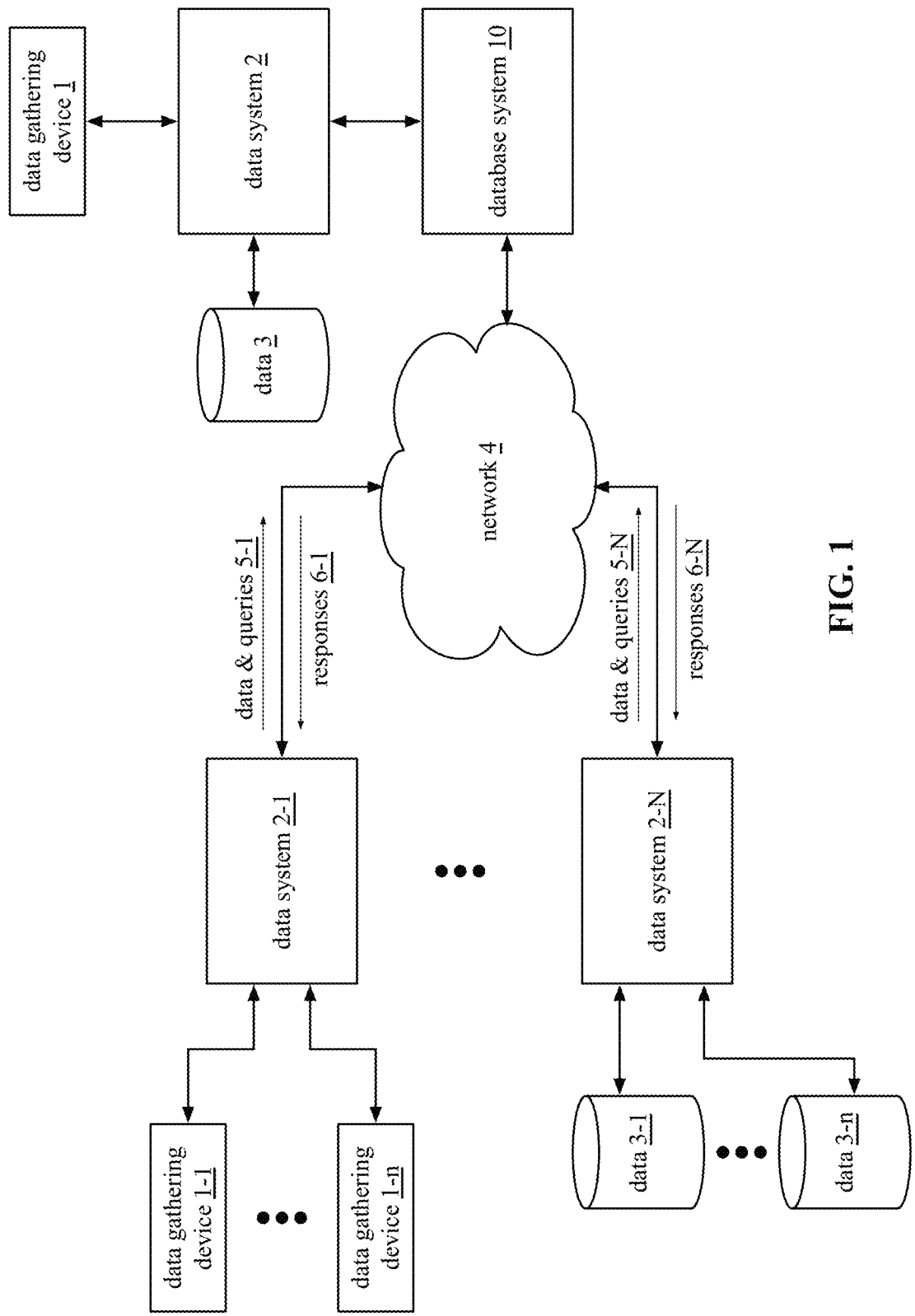
FIG. 1 is a schematic block diagram of an embodiment of a large scale data processing network that includes a database system in accordance with the present invention.

FIG. 1 is a schematic block diagram of an embodiment of a large-scale data processing network that includes data gathering device 1, data gathering devices 1-1 through 1-n, data system 2, data systems 2-1 through 2-N, data 3, data 3-1 through 3-n, a network 4, and a database system 10. The data systems 2-1 through 2-N provide, via the network 4, data and queries 5-1 through 5-N data to the database system 10. Alternatively, or in addition to, the data system 2 provides further data and queries directly to the database system 10. In response to the data and queries, the database system 10 issues, via the network 4, responses 6-1 through 6-N to the data systems 2-1 through 2-N. Alternatively, or in addition to, the database system 10 provides further responses directly to the data system 2. The data gathering devices 1, 1-1 through 1-n may be implemented utilizing sensors, monitors, handheld computing devices, etc. and/or a plurality of storage devices including hard drives, cloud storage, etc. The data gathering devices 1-1 through 1-n may provide real-time data to the data system 2-1 and/or any other data system and the data 3-1 through 3-n may provide stored data to the data system 2-N and/or any other data system.

Figure 1A:
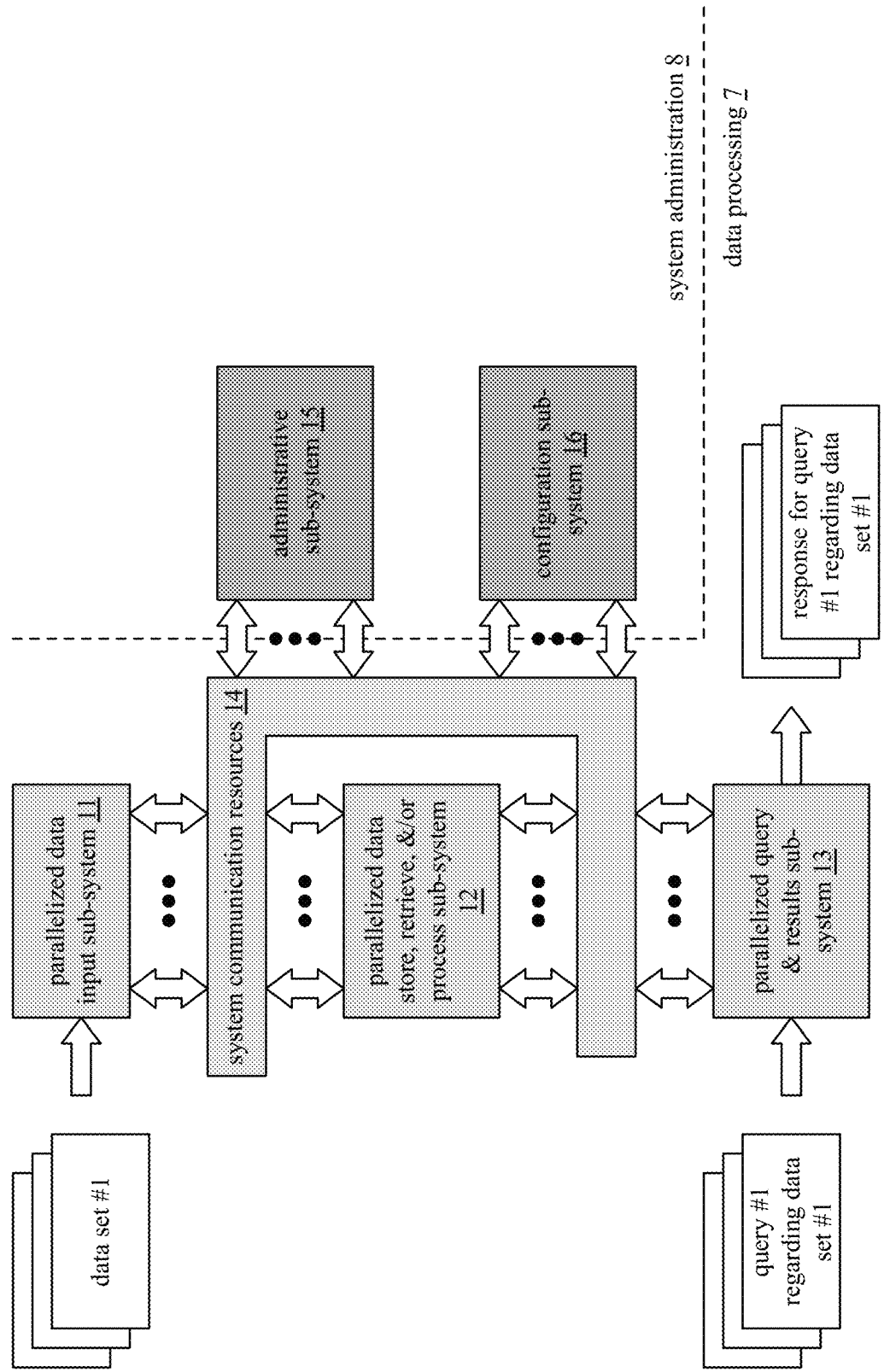
FIG. 1A is a schematic block diagram of an embodiment of a database system in accordance with the present invention.

FIG. 1A is a schematic block diagram of an embodiment of a database system 10 that includes data processing 7 and system administration 8. The data processing 7 includes a parallelized data input sub-system 11, a parallelized data store, retrieve, and/or process sub-system 12, a parallelized query and response sub-system 13, and system communication resources 14. The system administration 8 includes an administrative sub-system 15 and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together. Each of the sub-systems 11, 12, 13, 15, and 16 include a plurality of computing devices; an example of which is discussed with reference to one or more of FIGS. 7-9.

In an example of operation, the parallelized data input sub-system 11 receives tables of data from a data source. For example, a data set no. 1 is received when the data source includes one or more computers. As another example, the data source is a plurality of machines. As yet another example, the data source is a plurality of data mining algorithms operating on one or more computers. The data source organizes its data into a table that includes rows and columns. The columns represent fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data into a plurality of data partitions. For each data partition, the parallelized data input sub-system 11 determines a number of data segments based on a desired encoding scheme. As a specific example, when a 4 of 5 encoding scheme is used (meaning any 4 of 5 encoded data elements can be used to recover the data), the parallelized data input sub-system 11 divides a data partition into 5 segments. The parallelized data input sub-system 11 then divides a data segment into data slabs. Using one or more of the columns as a key, or keys, the parallelized data input sub-system 11 sorts the data slabs. The sorted data slabs are sent, via the system communication resources 14, to the parallelized data store, retrieve, and/or process sub-system 12 for storage.

The parallelized query and response sub-system 13 receives queries regarding tables and processes the queries prior to sending them to the parallelized data store, retrieve, and/or process sub-system 12 for processing. For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the sub-system 13 for subsequent processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.). Once the query plan is optimized, it is sent, via the system communication resources 14, to the parallelized data store, retrieve, and/or process sub-system 12 for processing.

Within the parallelized data store, retrieve, and/or process sub-system 12, a computing device is designated as a primary device for the query plan and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan. The primary device provides the resulting response to the assigned node of the parallelized query and response sub-system 13. The assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query.

Figure 2:
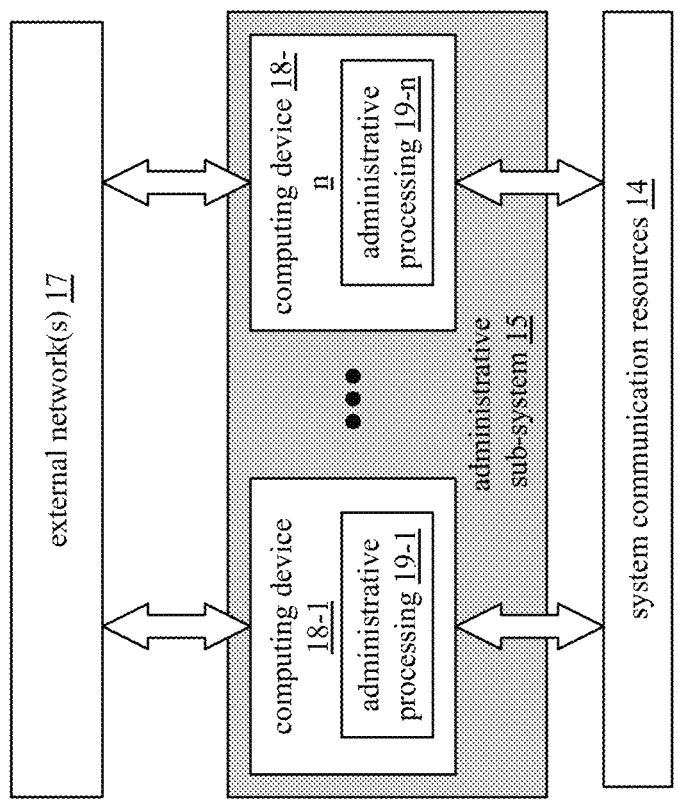
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

Figure 3:
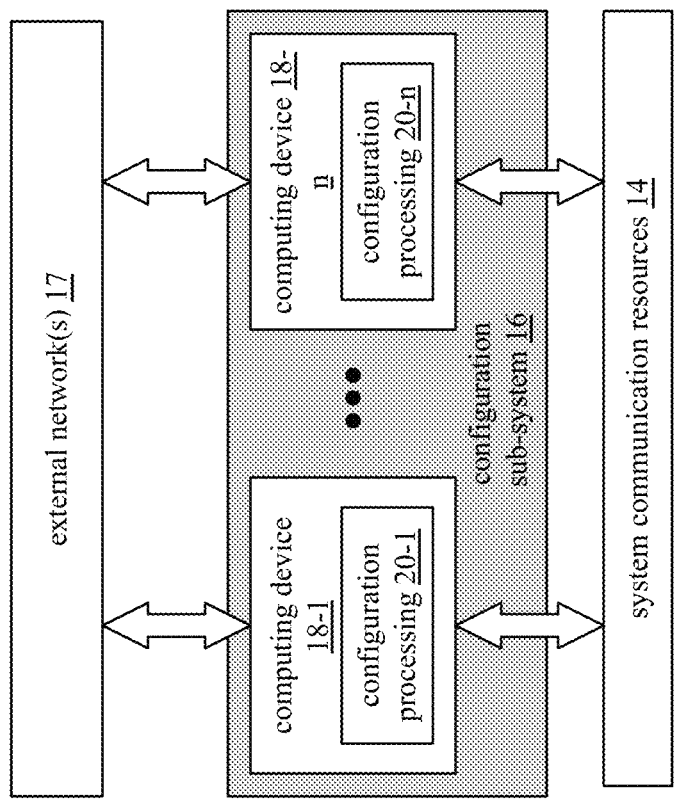
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function utilizing a corresponding configuration processing of configuration processing 20-1 through 20-n (which includes a plurality of configuration operations) that coordinates system level configurations of the database system. Each computing device is coupled to the external network 17 of FIG. 2, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of a configuration operation independently. This supports lock free and parallel execution of one or more configuration operations.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. The computing devices of the bulk data sub-system 23 execute a bulk data processing function to retrieve a table from a network storage system 21 (e.g., a server, a cloud storage service, etc.).

The parallelized ingress sub-system 24 includes a plurality of ingress data sub-systems 25-1 through 25-p that each include a local communication resource of local communication resources 26-1 through 26-p and a plurality of computing devices 18-1 through 18-n. Each of the computing devices of the parallelized ingress sub-system 24 execute an ingress data processing function utilizing an ingress data processing of ingress data processing 28-1 through 28-n of each ingress data sub-system 25-1 through 25-p that enables the computing device to stream data of a table (e.g., a data set 30-2 as segments 29-1-1 through 29-1-n and through 29-1-p through 29-n-p) into the database system 10 of FIG. 1A via a wide area network 22 (e.g., cellular network, Internet, telephone network, etc.). The streaming may further be via corresponding local communication resources 26-1 through 26-p and via the system communication resources 14 of FIG. 1A. With the plurality of ingress data sub-systems 25-1 through 25-p, data from a plurality of tables can be streamed into the database system 10 at one time (e.g., simultaneously utilizing two or more of the ingress data sub-systems 25-1 through 25-p in a parallel fashion).

Each of the bulk data processing function and the ingress data processing function generally function as described with reference to FIG. 1 for processing a table for storage. The bulk data processing function is geared towards retrieving data of a table in a bulk fashion (e.g., a data set 30-1 as the table is stored and retrieved, via the system communication resources 14 of FIG. 1A, from storage as segments 29-1 through 29-n). The ingress data processing function, however, is geared towards receiving streaming data from one or more data sources. For example, the ingress data processing function is geared towards receiving data from a plurality of machines in a factory in a periodic or continual manner as the machines create the data.

As will be described in greater detail with reference to one or more subsequent figures, a computing device includes a plurality of nodes and each node includes a plurality of processing core resources. Each processing core resource is capable of executing at least a portion of the bulk data processing function or the ingress data processing function. In an embodiment, a plurality of processing core resources of one or more nodes executes the bulk data processing function or the ingress data processing function to produce the storage format for the data of a table.

Figure 5:
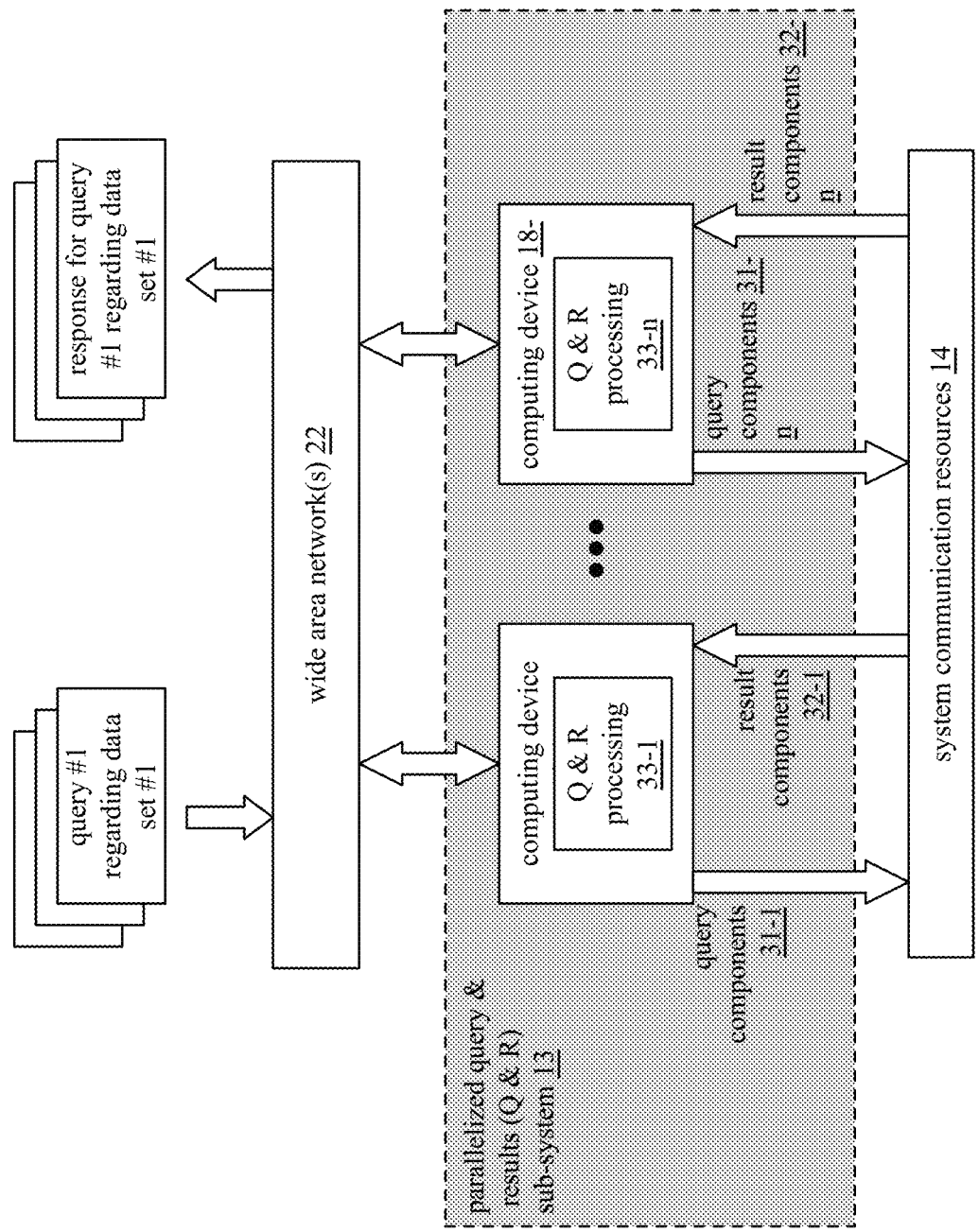
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) function utilizing a corresponding Q & R processing of Q & R processing 33-1 through 33-n. The computing devices are coupled to the wide area network 22 of FIG. 4 to receive queries (e.g., query no. 1 regarding data set no. 1) regarding tables and to provide responses to the queries (e.g., response for query no. 1 regarding the data set no. 1). For example, the plurality of computing devices 18-1 through 18-$n$ receives a query, via the wide area network 22, issues, via the system communication resources 14 of FIG. 1A, query components 31-1 through 31-$n$ to the parallelized data store, retrieve, &/or process sub-system 12 of FIG. 1A, receives, via the system communication resources 14, results components 32-1 through 32-$n$, and issues, via the wide area network 22, a response to the query.

The Q & R function enables the computing devices to processing queries and create responses as discussed with reference to FIG. 1. As will be described in greater detail with reference to one or more subsequent figures, a computing device includes a plurality of nodes and each node includes a plurality of processing core resources. Each processing core resource is capable of executing at least a portion of the Q & R function. In an embodiment, a plurality of processing core resources of one or more nodes executes the Q & R function to produce a response to a query.

Figure 6:
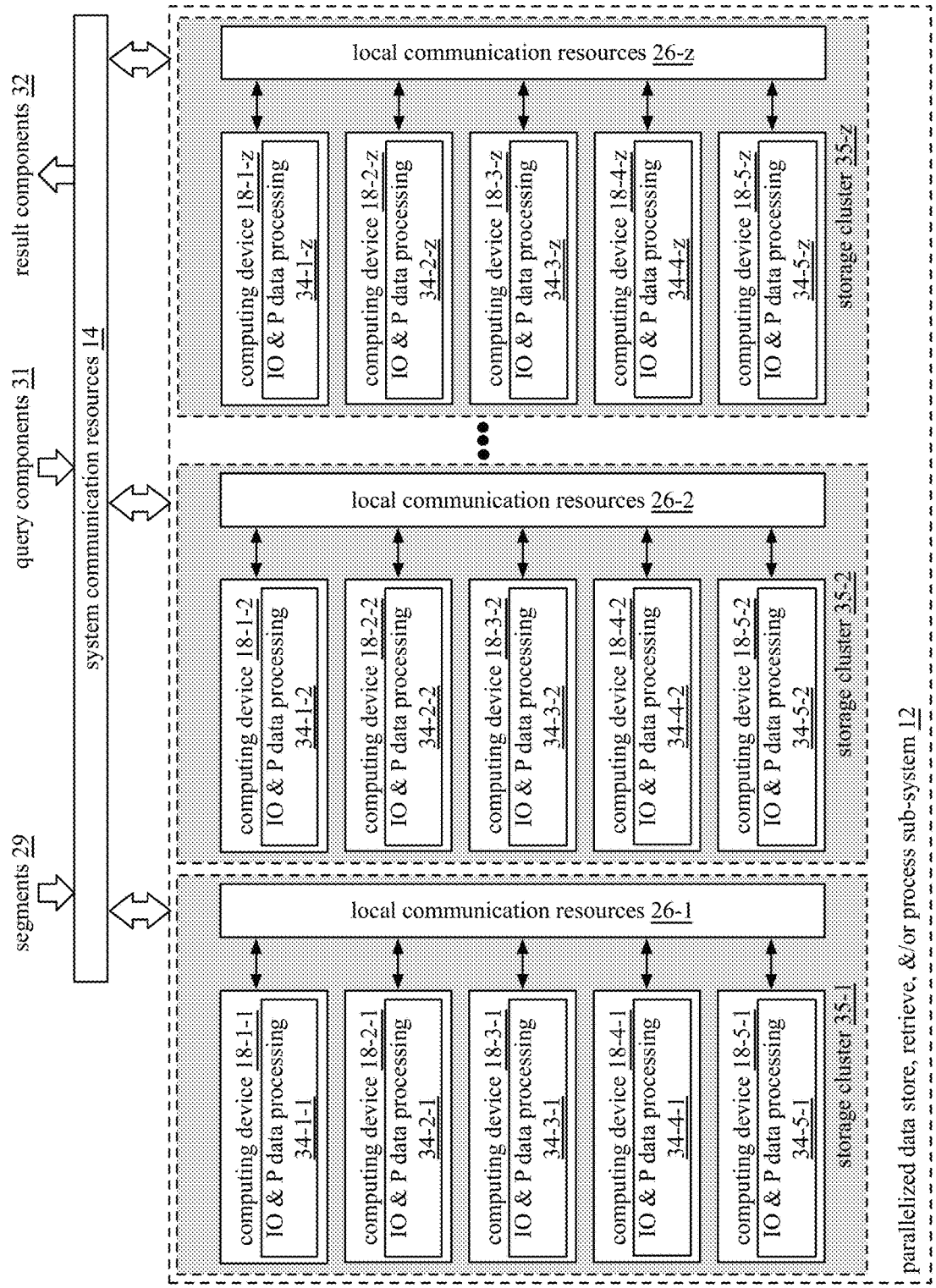
FIG. 6 is a schematic block diagram of an embodiment of a parallelized data store, retrieve, and/or process (IO & P) sub-system in accordance with the present invention.

FIG. 6 is a schematic block diagram of an embodiment of a parallelized data store, retrieve, and/or process sub-system 12 that includes a plurality of storage clusters 35-1 through 35-$z$. Each storage cluster includes a corresponding local communication resource of a plurality of local communication resources 26-1 through 26-$z$ and includes a plurality of computing devices 18-1 through 18-5 and each computing device executes an input, output, and processing (IO &P) function utilizing a corresponding IO &P function of IO &P functions 34-1 through 34-5 to produce at least a portion of a resulting response. Each local communication resource may be implemented with a local communication resource of the local communication resources 26-1 through 26$p$ of FIG. 4. The number of computing devices in a cluster corresponds to the number of segments in which a data partitioned is divided. For example, if a data partition is divided into five segments, a storage cluster includes five computing devices. Each computing device then stores one of the segments. As an example of operation, segments 29 are received, via the system communication resources 14 of FIG. 1A and via the local communication resources 26-1, for storage by computing device 18-4-1. Subsequent to storage, query components 31 (e.g., a query) are received, via the system communication resources 14 and the local communication resources 26-1, by the computing device 18-4-1 for processing by the IO & P data processing 34-4-1 to produce result components 32 (e.g., query response). The computing device 18-4-1 facilitates sending, via the local communication resources 26-1 and the system communication resources 14, the result components 32 to a result receiving entity.

As will be described in greater detail with reference to one or more subsequent figures, a computing device includes a plurality of nodes and each node includes a plurality of processing core resources. Each processing core resource is capable of executing at least a portion of the IO & P function. In an embodiment, a plurality of processing core resources of one or more nodes executes the IO & P function to produce at least a portion of the resulting response as discussed in FIG. 1.

Figure 7:
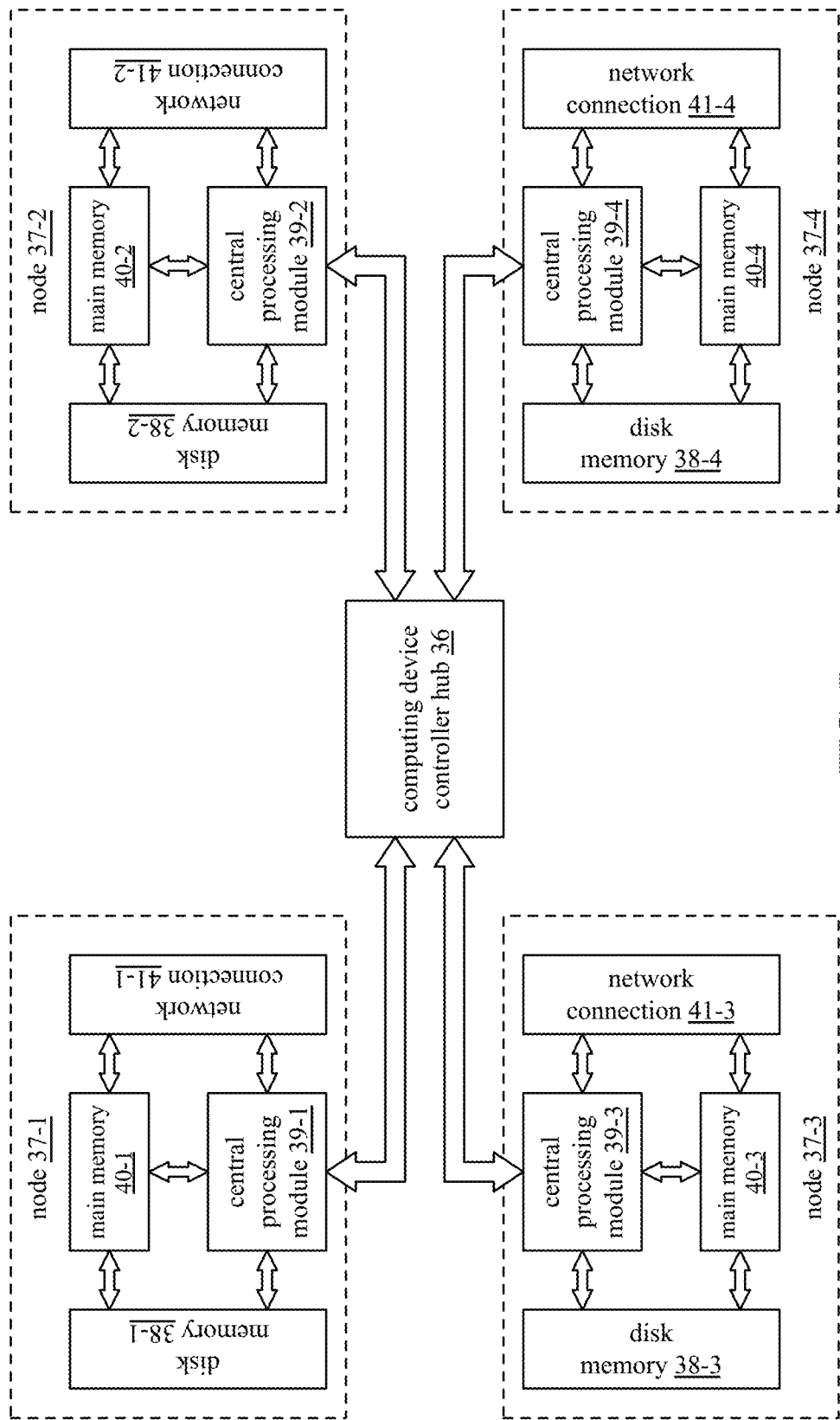
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module of central processing modules 39-1 through 39-4, a main memory of main memories 40-1 through 40-4, a disk memory of disk memories 38-1 through 38-4, and a network connection of network connections 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
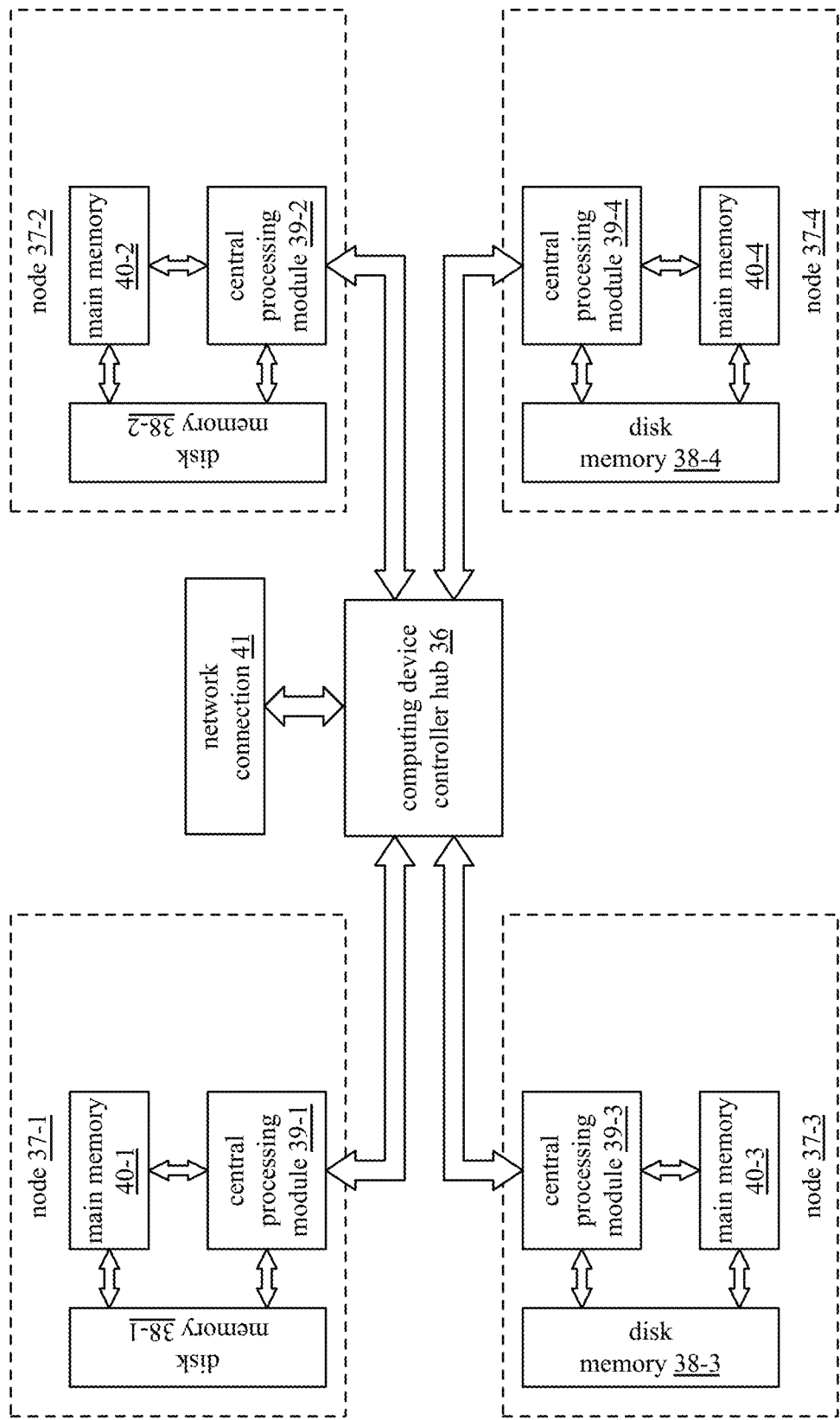
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
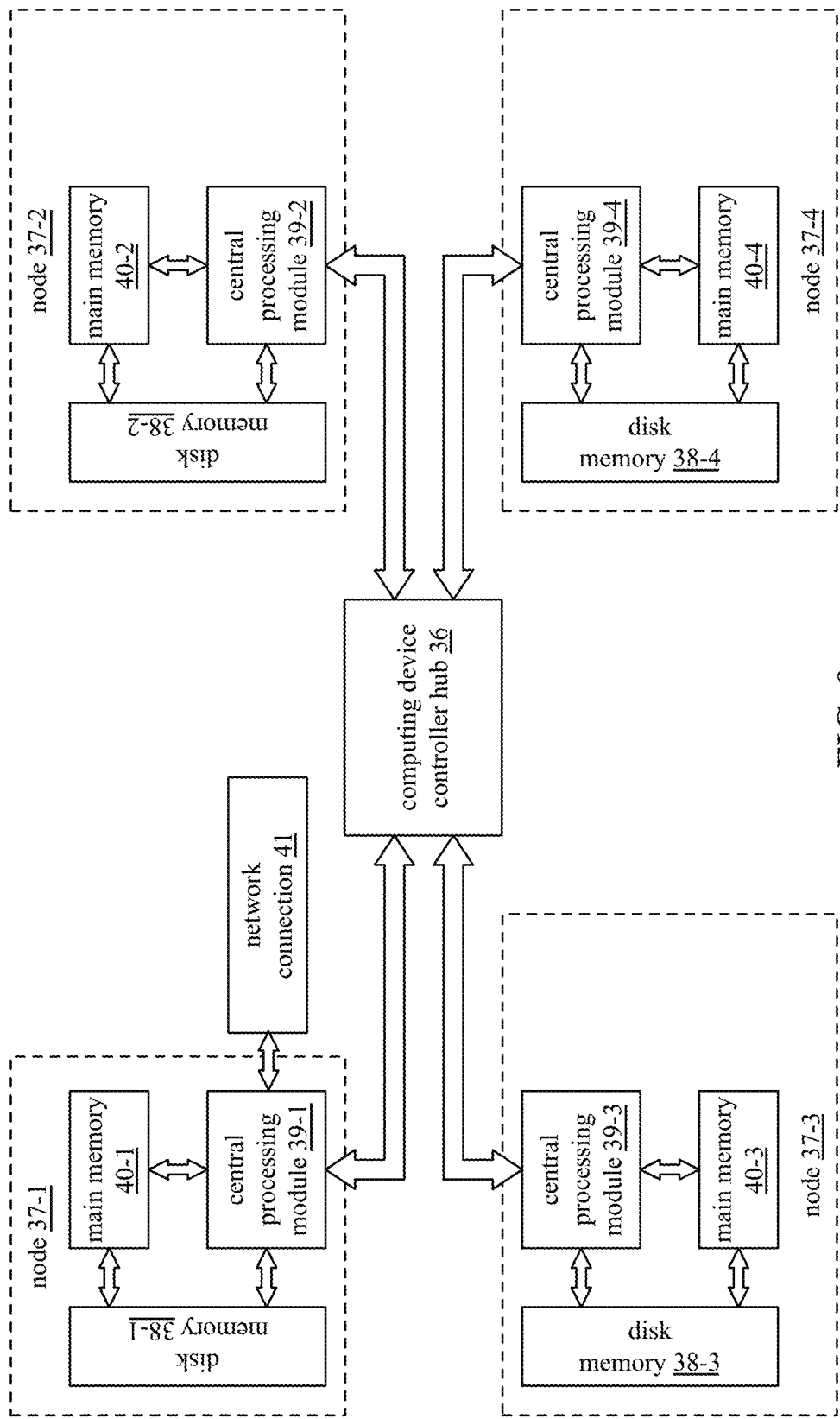
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
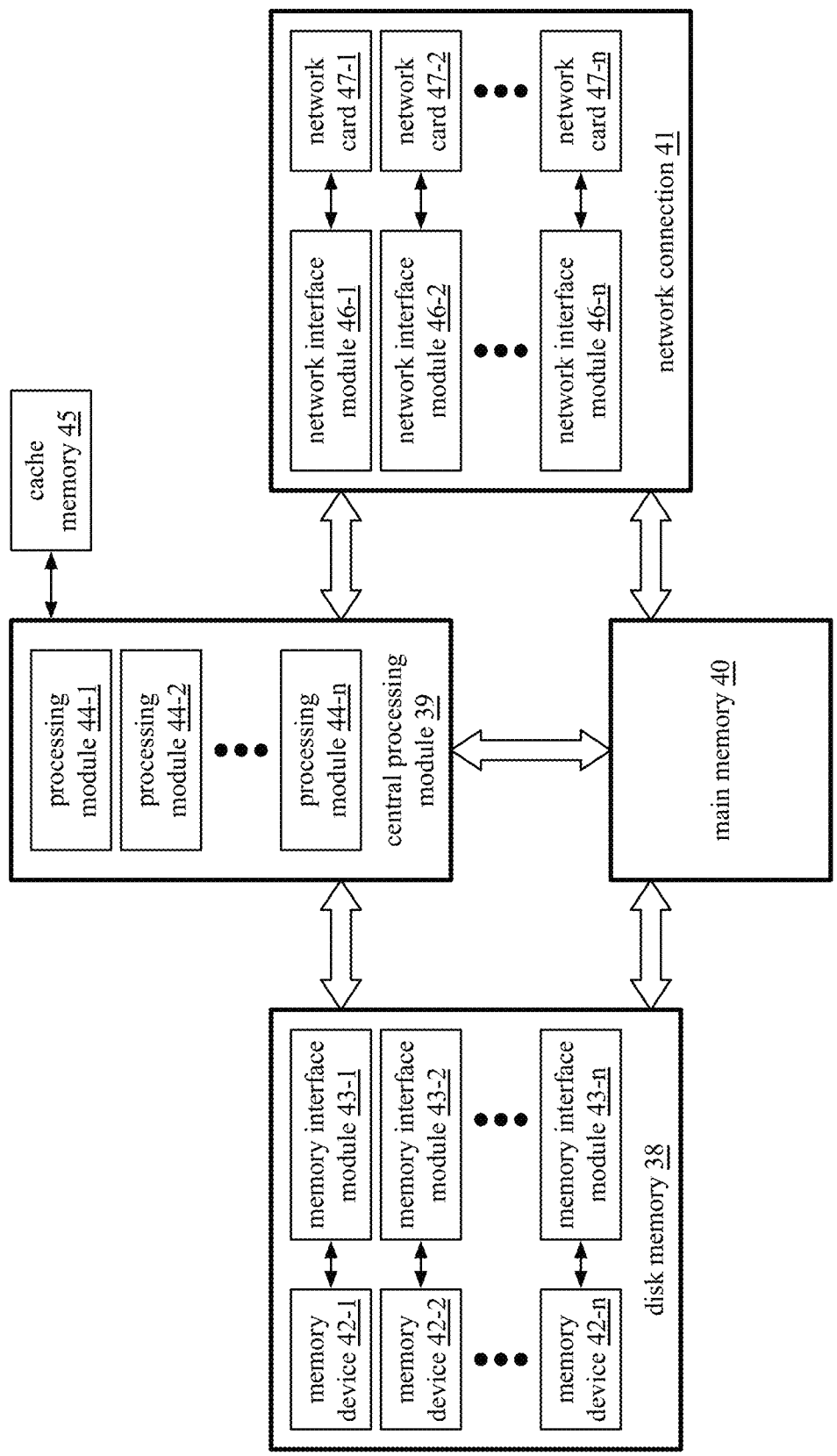
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-$n$ and an associated one or more cache memory 45. A processing module is as defined at the end of the detailed description.

The disk memory 38 includes a plurality of memory interface modules 43-1 through 43-$n$ and a plurality of memory devices 42-1 through 42-$n$. The memory devices 42-1 through 42-$n$ include, but are not limited to, solid state memory, disk drive memory, cloud storage memory, and other non-volatile memory. For each type of memory device, a different memory interface module 43-1 through 43-$n$ is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-$n$ and a plurality of network cards 47-1 through 47-$n$. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-$n$ include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
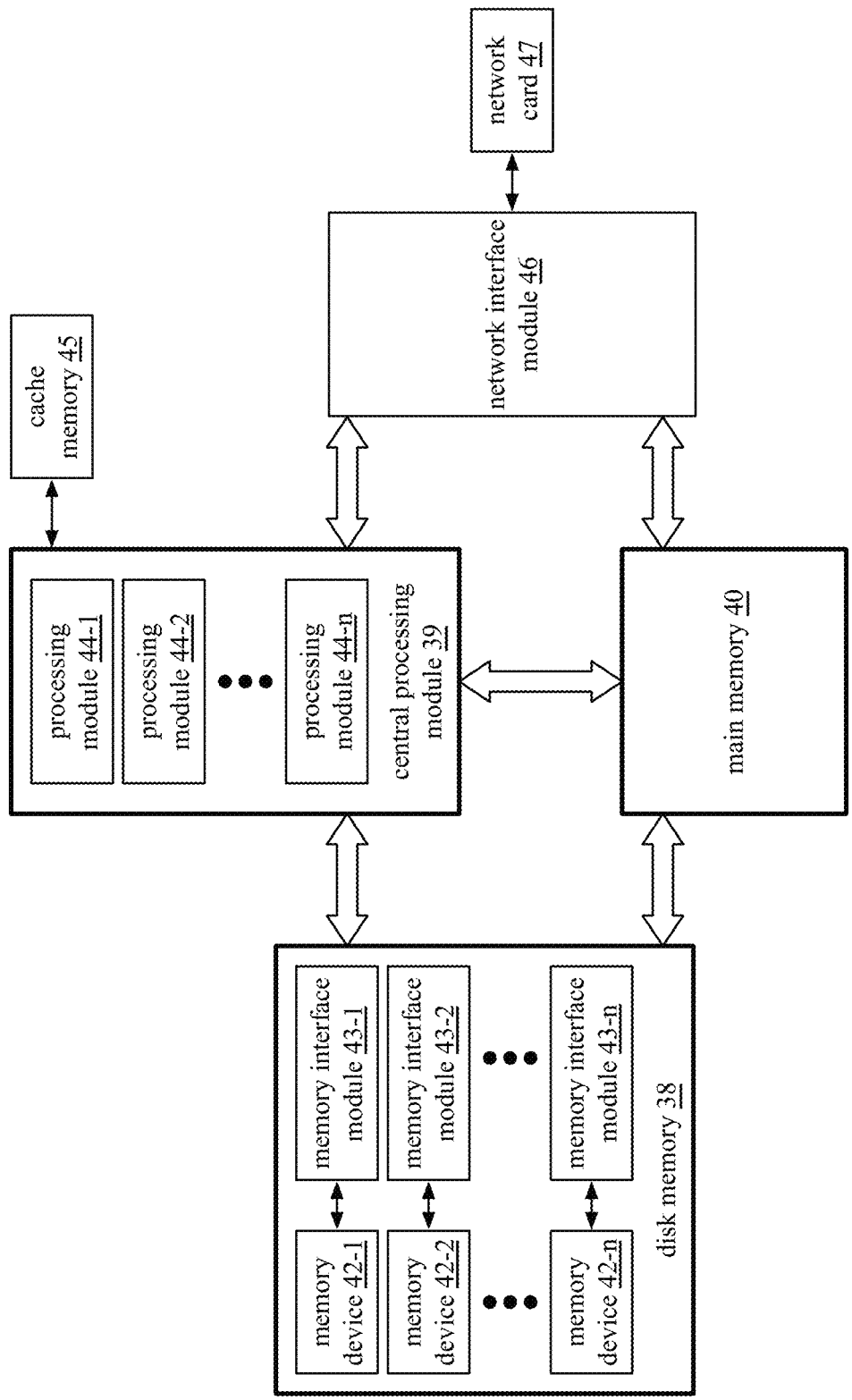
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and corresponding network card 47 configuration.

Figure 12:
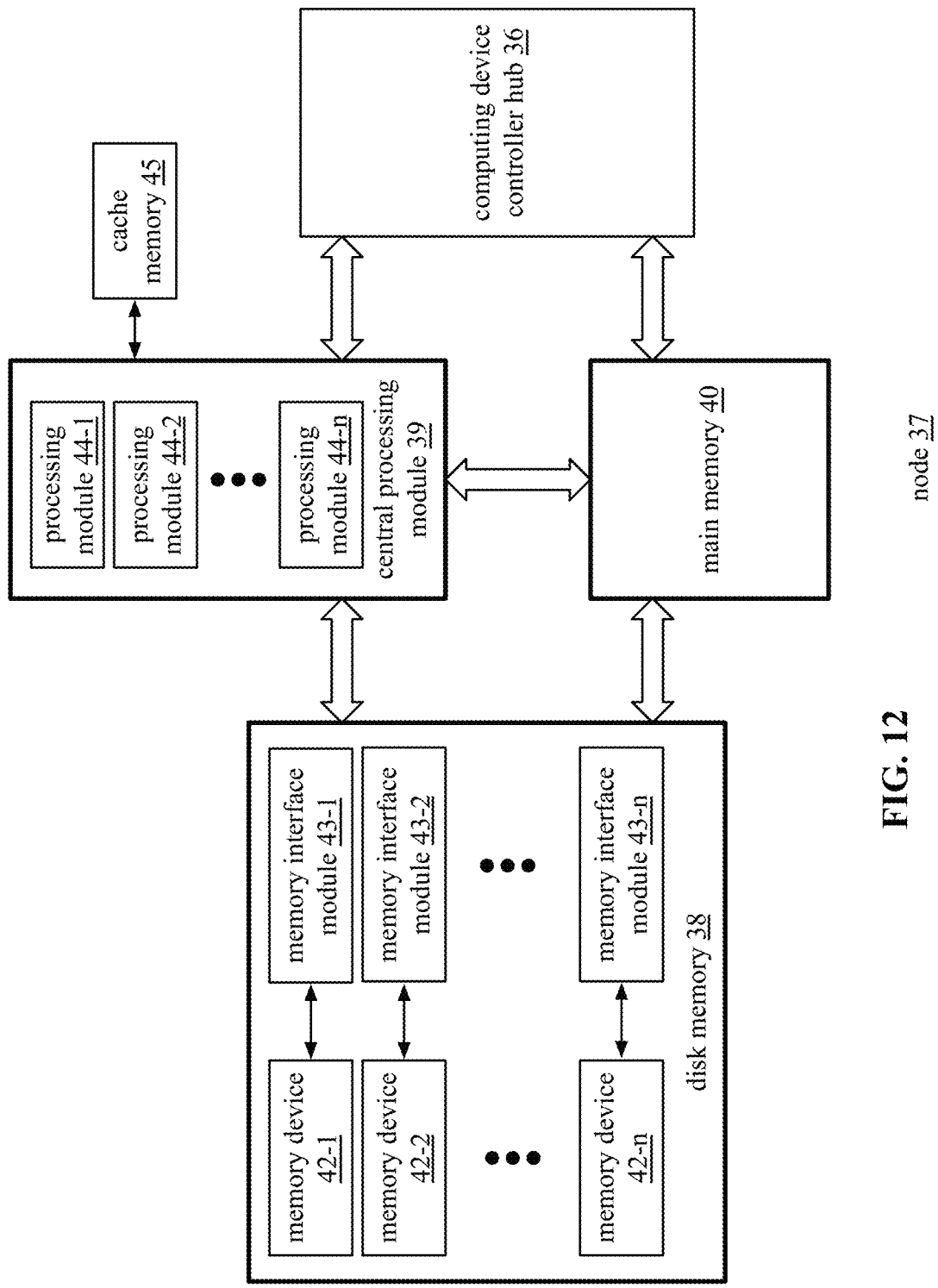
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
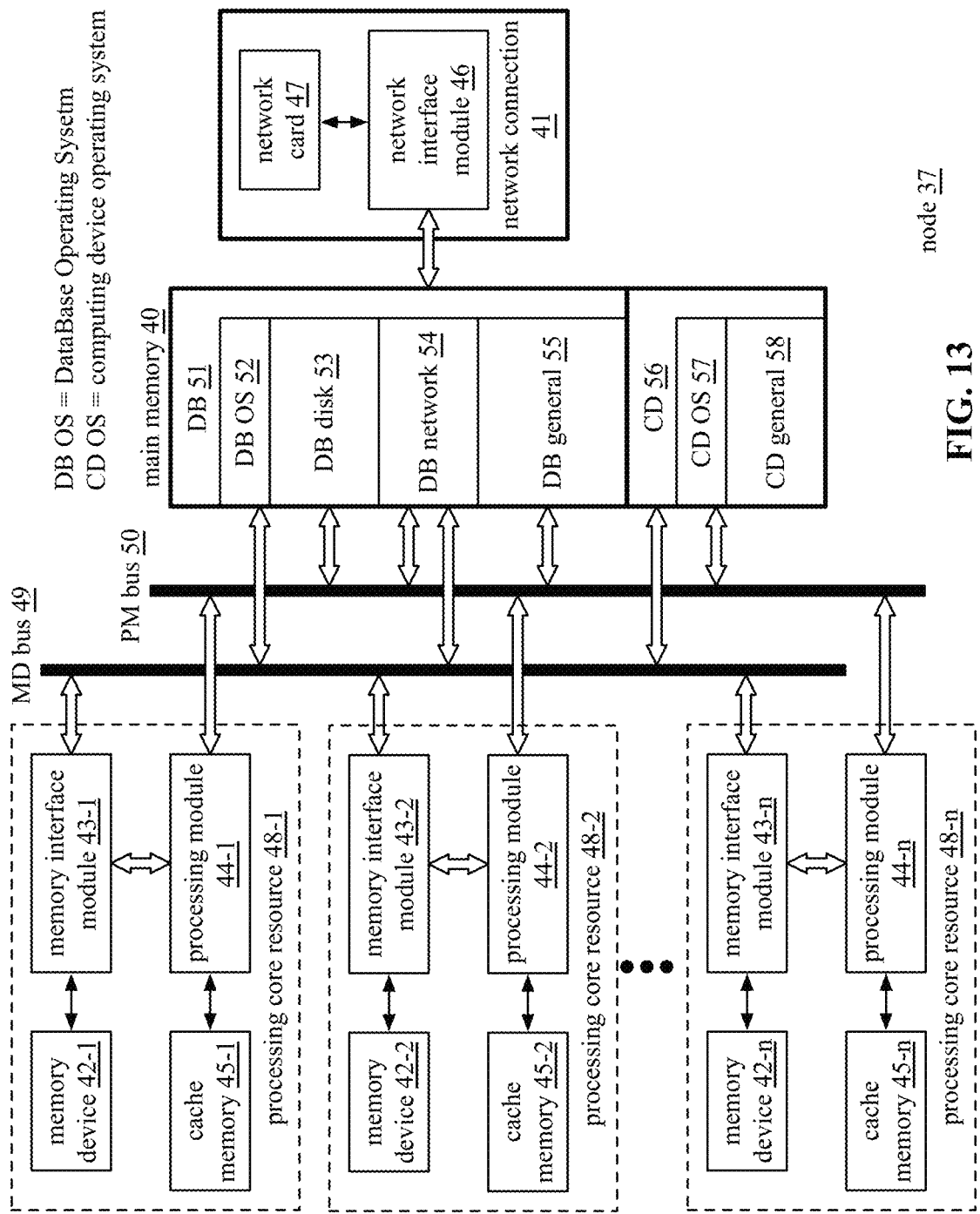
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource includes a corresponding processing module of processing modules 44-1 through 44-*n*, a corresponding memory interface module of memory interface modules 43-1 through 43-*n*, a corresponding memory device of memory devices 42-1 through 42-*n*, and a corresponding cache memory of cache memories 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
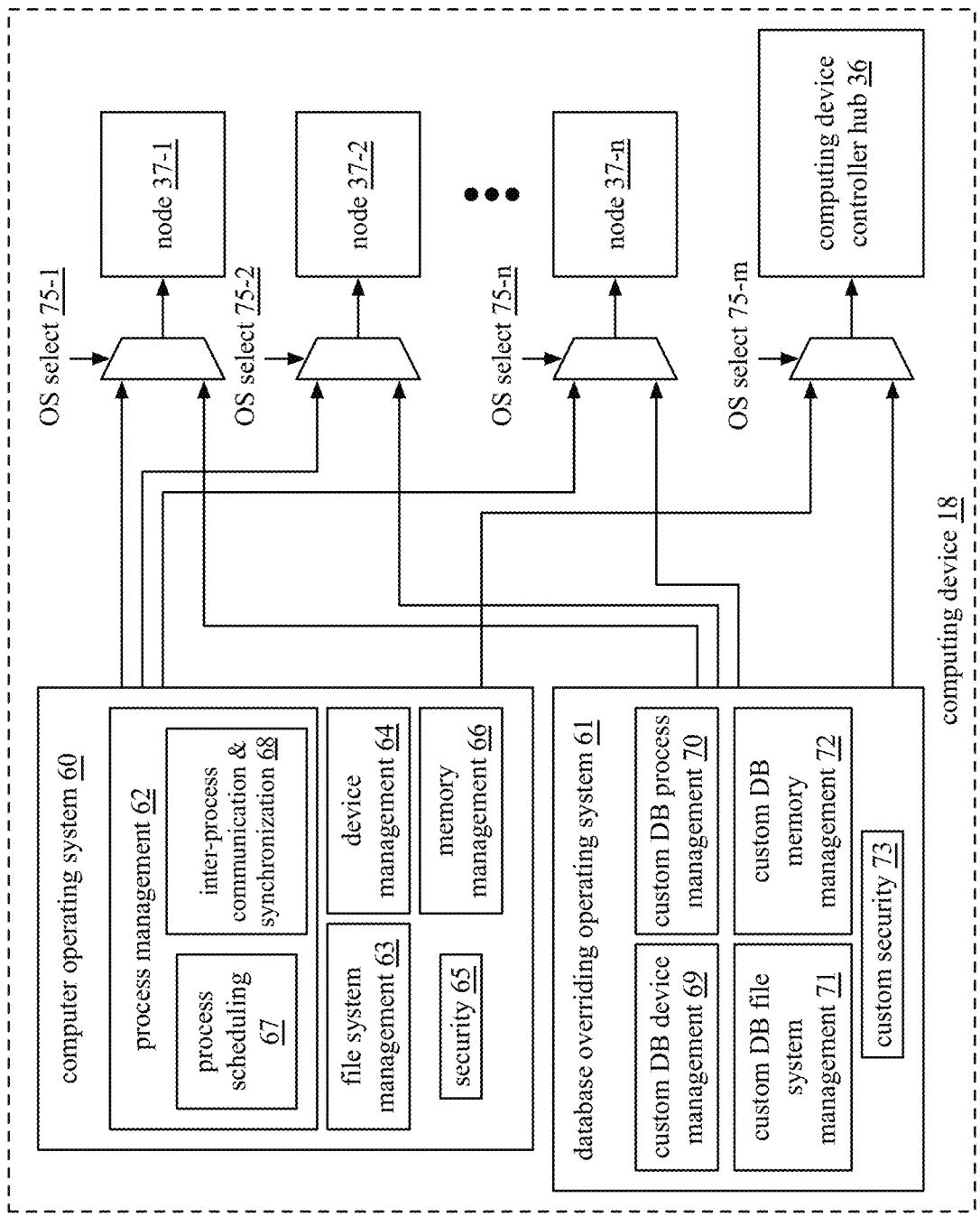
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
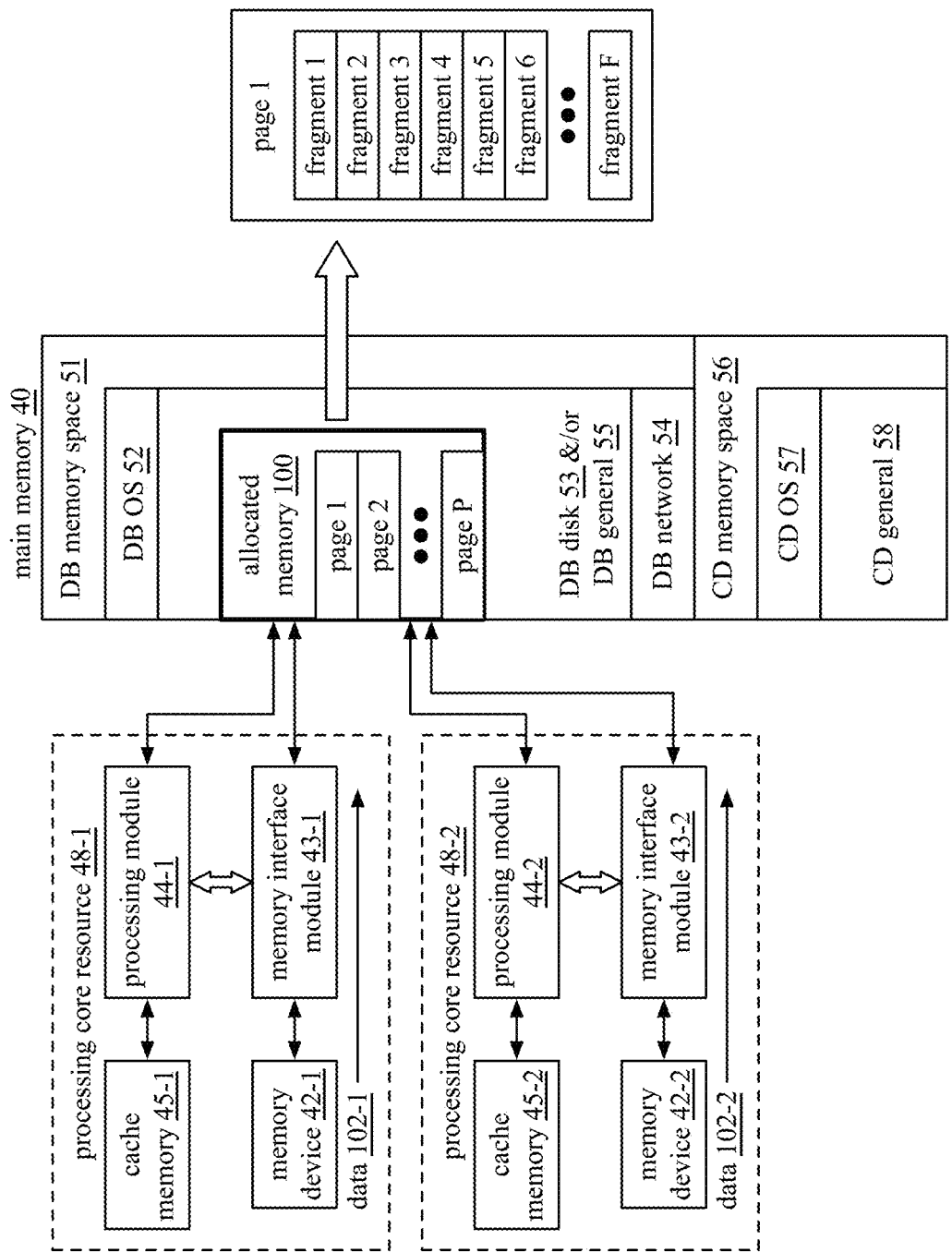
FIG. 15 is a schematic block diagram of an example of allocated memory of main memory being allocated to read data from processing core resources in accordance with the present invention.

FIG. 15 is a schematic block diagram of an example of allocated memory 100 of main memory 40, as discussed with reference to FIGS. 7 and 13, being allocated to read data 102-1 and data 102-2 from respective processing core resources 48-1 and 48-2. The processing core resources respectively includes processing modules 44-1 and 44-2, cache memories 45-1 and 45-2, memory interface modules 43-1 and 43-2, and memory devices 42-1 and 42-2 as previously discussed. The data 102-1 and data 102-2 is stored in the allocated memory 100 in pages 1-P of data blocks. For example, a page is of a selectable size (e.g., 4 KB to 2 GB). In an embodiment, a page size is selected to be 1 or 2 G bytes. When data is read from the memory device 42-1 and written into the allocated memory 100 of the main memory 40, it is desirable to have it done with efficiency in use of memory space and stored in a manner for ease of access for subsequent operations.

In this example, a portion of the DB (database) disk 53 and/or DB general 55 is allocated for storing data 102-1 and 102-2 read from the memory devices 42-1 and 42-2 of the processing core resources 48-1 and 48-2. The allocated memory 100 is of sufficient size to store a plurality of pages of data. To facilitate efficient storage and ease of use, each page is divided into fragments 1-F (e.g., 4 fragments per page or another number of fragments per page). In addition, it is desirable to avoid deadlocks with the data being stored in the allocated memory 100. To accomplish deadlock avoidance, efficiency of storage, and/or ease of use, single producer single consumer (SPSC) buffers are used between each virtual machine (VM, which is a processing core resource 48, a portion thereof, and/or multiple processing core resources).

Figure 16:
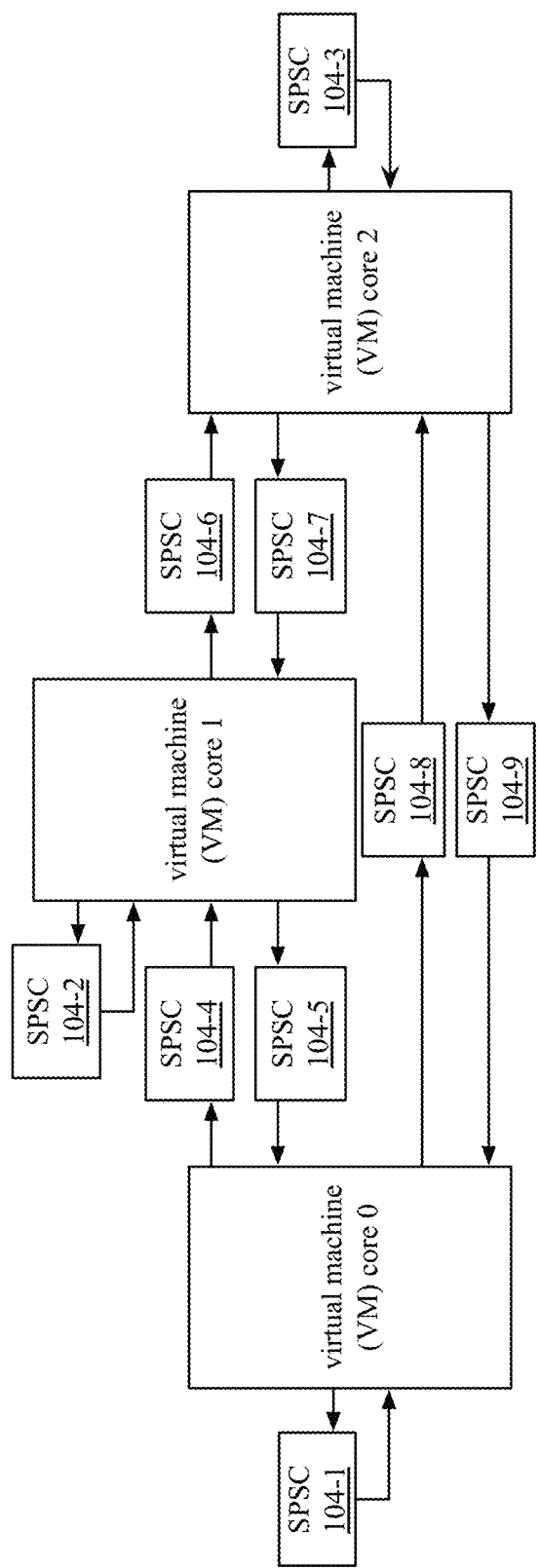
FIG. 16 is a schematic block diagram of an example of allocated memory of main memory including Single Producer Single Consumer (SPSC) buffers between virtual machines of one or more processing core resources in accordance with the present invention.

FIG. 16 is a schematic block diagram of an example of allocated memory of main memory including Single Producer Single Consumer (SPSC) buffers 104-1 through 104-9 between virtual machines 0-2 of one or more processing core resources. An SPSC buffer is a one-way buffer, meaning the producer puts data in the SPSC buffer and only the consumer can take that data out of the buffer. As shown, there are two SPSC buffers between each virtual machine core: one in each direction. In addition, each virtual machine (VM) core has its own SPSC buffer, where the VM core is the producer and the consumer.

The VM cores uses the SPSC buffers to store pointers to the data, not the data itself such that the SPSC buffers are very small in comparison to the data they reference. Use of the SPSC buffers allows the VM cores to execute multiple threads that access the same data and/or permutations of the data. In addition, the VM cores use the same contract terms to help avoid a deadlock. The contract terms include (a) once a VM places data in allocated memory of the DB memory space of the main memory and/or places information in an SPSC buffer, it cannot access that data until it is released by a consumer; and (b) it won't place data in the allocated memory and/or an SPSC unless it knows it can advance the operational sequence of a query.

Figure 17:
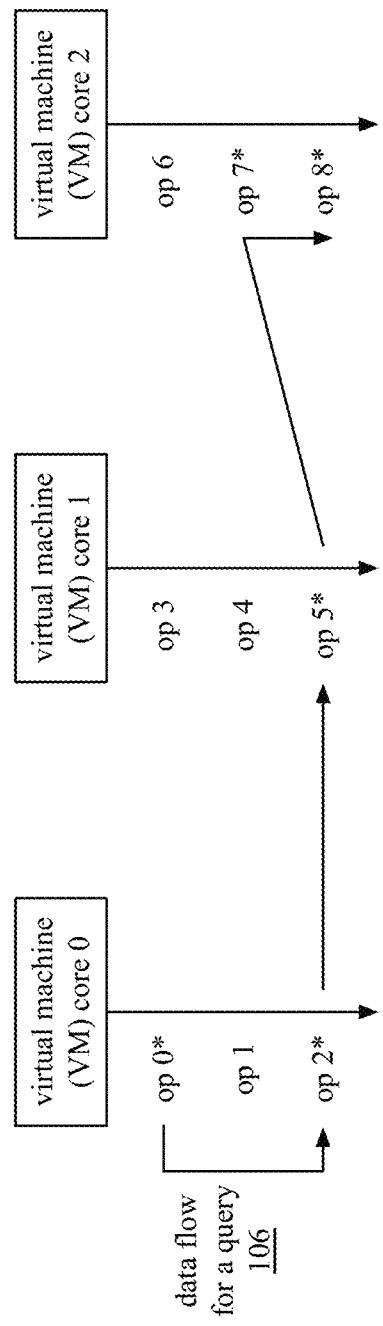
FIG. 17 is a schematic block diagram of an example of data flow via operations being executed by virtual machines of one or more processing core resources in accordance with the present invention.

FIG. 17 is a schematic block diagram of an example of data flow for a query 106 via operations being executed by virtual machines 0-2 of one or more processing core resources. In this example, VM core 0 is responsible for executing operation 0 (op 0), op 1, and op 2; VM core 1 is responsible for executing op 3, op 4, and op 5; and VM core 2 is response for executing op 6, op 7, and op 8. For this example, the operation may be any of the operations of the database instruction set and the suffix number is used to indicate that the operations are separate operations. Operations 0, 2, 5, 7, and 8 are related for a query and represent data flow for execution of these operations for the given data flow for a query 106.

Figure 18:
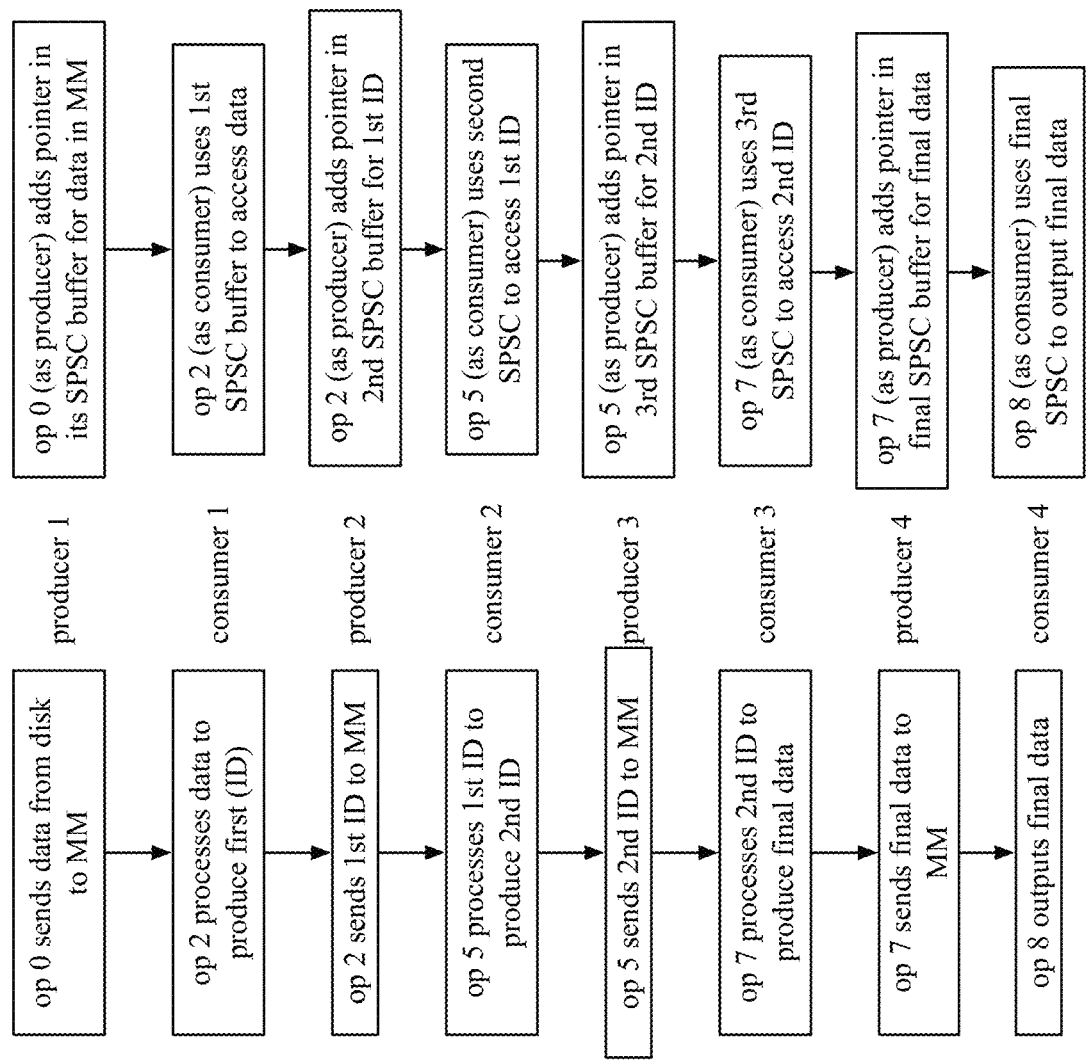
FIG. 18 is a logic diagram of an example of data flow of FIG. 90 between virtual machines of one or more processing core resources using the SPSC buffers in accordance with the present invention.

FIG. 18 is a logic diagram of an example of data flow of FIG. 17 between virtual machines of one or more processing core resources using the SPSC buffers. As shown in FIG. 18, the operational flow of data is from op 0 to op 2, to op 5, to op 7, and then to op 8. Starting with op 0 of the left flow diagram, assume that it is a read request to read data from a memory device and place it in allocated memory of the main memory. The VM core 0, which is executing op 0, performs the operation of reading the requested data from a memory device and placing it into the allocated memory. In addition, as a producer, it adds a pointer into its own SPCS buffer, since it also performs the next operation in the sequence.

As the consumer, VM core 0 accesses the SPSC buffer to retrieve the pointer for the data stored in the allocated memory of the main memory. VM core 0 then accesses the data from the allocated memory and performs op 2 on the data to produce a first intermediate data (ID). The VM core 0 then writes the first ID into the allocated memory of the main memory. As a producer, VM core 0 writes a pointer to the first ID on the allocated memory into a SPSC with VM core 1, which is responsible for the next operation (e.g., op 5).

As the consumer, VM core 1 accesses the SPSC buffer to retrieve the pointer for the first ID stored in the allocated memory of the main memory. VM core 1 then accesses the first ID from the allocated memory and performs op 5 on the data to produce a second intermediate data (ID). The VM core 1 then writes the second ID into the allocated memory of the main memory. As a producer, VM core 1 writes a pointer to the second ID on the allocated memory into a SPSC with VM core 2, which is responsible for the next operation (e.g., op 7).

As the consumer, VM core 2 accesses the SPSC buffer to retrieve the pointer for the second ID stored in the allocated memory of the main memory. VM core 2 then accesses the second ID from the allocated memory and performs op 8 on the data to produce a final data for this operation sequence. The VM core 2 then writes the final data into the allocated memory of the main memory. As a producer, VM core 2 writes a pointer to the final data on the allocated memory into a SPSC with another VM core that is responsible for outputting the final data. Alternatively, VM core 2 outputs the final data without updating an SPSC buffer.

Figure 19:
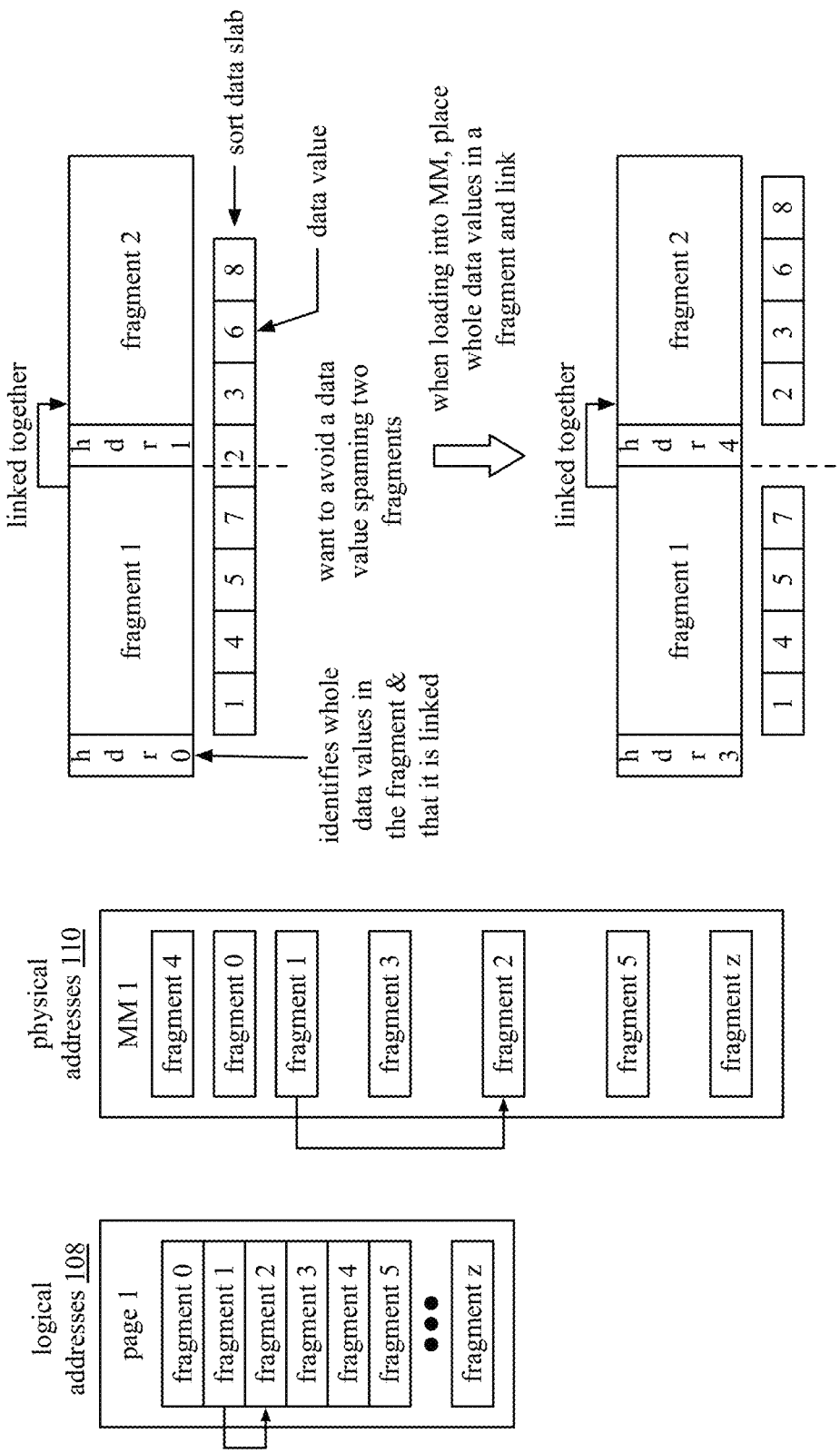
FIG. 19 is a schematic block diagram of an example of linking fragments in separate physical memory spaces based on fragments of a page in logical address space in accordance with the present invention.

FIG. 19 is a schematic block diagram of an example of linking fragments in separate physical memory addresses 110 (spaces) based on fragments of a page in logical addresses 108 (spaces). In this example, the fragments of a page (0-z) are sequential in logical address space. In physical address space, however, the fragments are not sequential and very often not contiguous.

Each fragment includes a header section 0-1 or 3-4 that includes a count of the number of whole data values in the fragment and information as to whether it is linked to one or more other fragments. Fragments are linked together for temporary storage in allocated memory of the DB memory space of the main memory when a data value spans two fragments. The size of data values ranges from a byte to 1 M Byte or more.

In the example, data value "2" spans the first and second fragments (e.g., as depicted with headers 1 and 2). Accordingly, the fragments 1 and 2 are linked together when a page, or a relevant portion thereof, is to be written to the allocated memory. With fragments 1 and 2 linked together, when they are written into the allocated memory, they will be contiguous (e.g., as depicted with headers 3 and 4). Thus, data value "2" is contiguous in the allocated memory.

Figure 20:
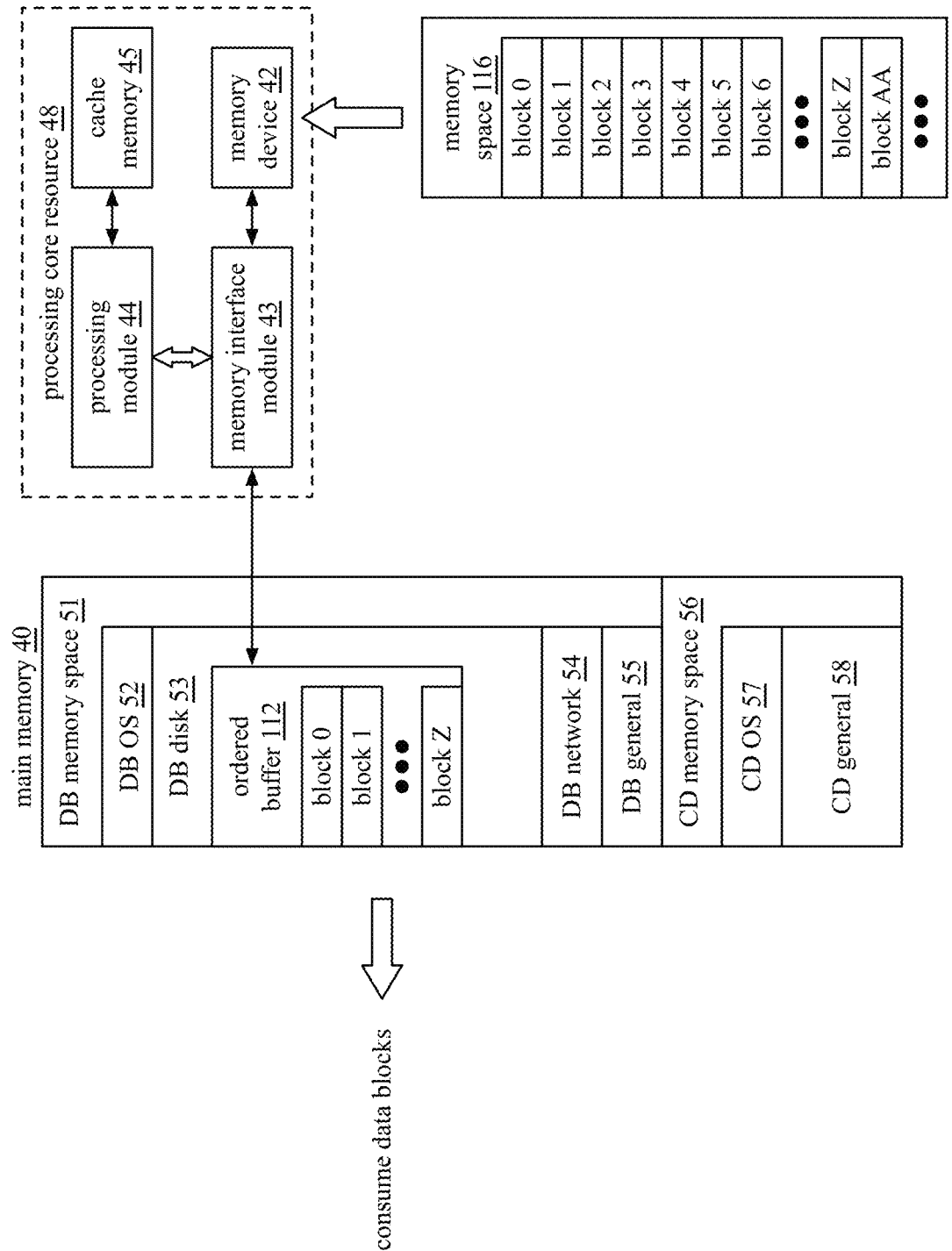
FIG. 20 is a schematic block diagram of an example of a read operation to read data from memory space of a non-volatile memory device into an allocated buffer of main memory in accordance with the present invention.

FIG. 20 is a schematic block diagram of an example of a processing core resource 48 executing a read operation to read data from memory space 116 of a (non-volatile) memory device 42 into an ordered buffer 112 of main memory 40. The processing core resource 48 includes a processing module 44, cache memory 45, a memory interface module 43, and memory device(s) 42 as previously discussed. The memory device 42 stores data in a memory space 116 in data blocks. Each data block is of a fixed size (e.g., logical blocks having a size of 4 K Bytes). When data is read from the memory device 42 and subsequently written into the ordered buffer 112 of the main memory 40, it is desirable to so with as minimal amount of reads as possible and to maintain the order of the data in the ordered buffer 112.

In an example, data of interest is stored as data blocks 0-Z, which may be data from a segment of a segment group of a partition of a table in the memory device(s) 42. In general, the data blocks are stored in an order; block 0 being the first and block Z being the last. When read operations for the data blocks are made, they are made in order; read operation for block 0 is first and read operation for block Z is last. The read operations are sent to the non-volatile memory in the order created, however, the non-volatile memory does not respond to the read operations in the order sent due to the general operations of non-volatile memories.

The ordering of the data blocks is important for processing of them (i.e., consumption of the data block). As such, it is desirable to store the data blocks in the buffer of main memory 40 in the desired order and not in the order the non-volatile memory responded to the read operations.

Figure 21:
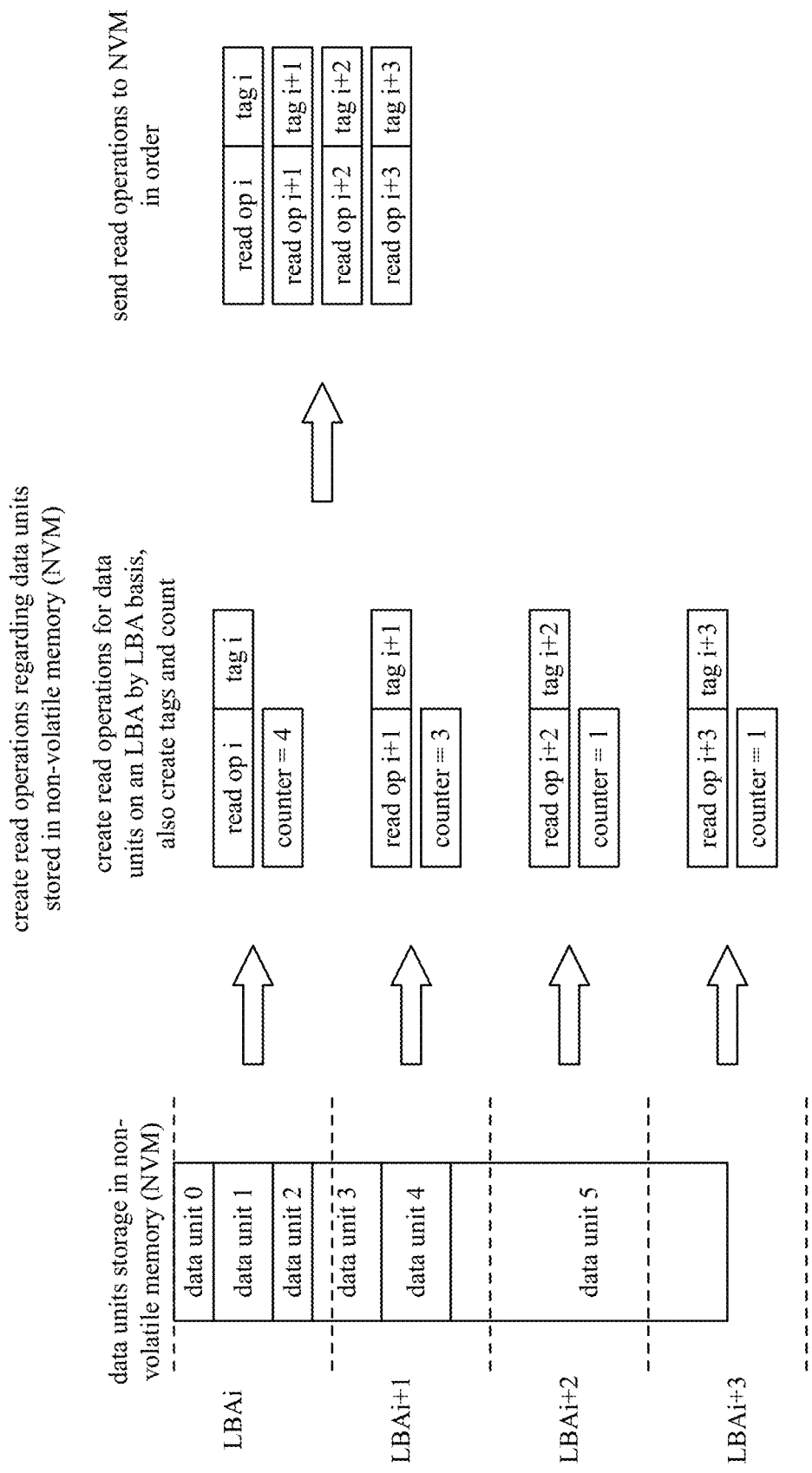
FIG. 21 is a schematic block diagram of another example of a read operation to read data from memory space of a non-volatile memory device into an allocated buffer of main memory based on logical block addresses (LBA) in accordance with the present invention.

FIG. 21 is a schematic block diagram of another example of a processing entity (e.g., one or more processing core resources of a computing device, one or more nodes of the computing device, one or more processing core resources of another computing device, and/or one or more nodes of the other computing device) executing a read operation to read data from non-volatile memory device (e.g., memory space 116) for data units 0-5. Data units 0-5, which are generally not of a fixed size, are stored in logic blocks LBAi, LBAi+1, LBAi+2, LBAi+3, which are of a fixed size. Read operations are created to read data units 0-5, but on a logic block level.

For example, a read operation is created for logic block LBAi, which contains all of data units 0-2 and part of data unit 3. While creating the read operation for LBAi, the processing entity also creates a unique tag value for the read operation and creates a counter value. The unique tag value uniquely identifies LBAi for this read operation and is used to identify the response from the non-volatile memory. The counter value reflects the number of data units that are fully contained in the data block and that are partially contained in the data block. For this example, LBAi has three full data units (0-2) and one partial data unit (3), thus the counter value is 4.

The processing entity also creates read operations for logic blocks LBAi+1, LBAi+2, LBAi+3, which includes corresponding unique tag values and counter values. For example, the processing entity creates a read operation for logic block LBAi+1, which includes unique tag ID (tag i+1) and a counter value of 3 for the data units (3-5) at least partially contained in the logic block. As another example, the processing entity creates a read operation for logic block LBAi+2, which includes unique tag ID (tag i+2) and a counter value of 1 for data unit 5, which spans the entire logic block. As yet another example, the processing entity creates a read operation for logic block LBAi+3, which includes unique tag ID (tag i+3) and a counter value of 1 for data unit 5, which spans a portion of the logic block. The processing entity sends the read operations and their corresponding tags to the non-volatile memory.

Figure 21A:
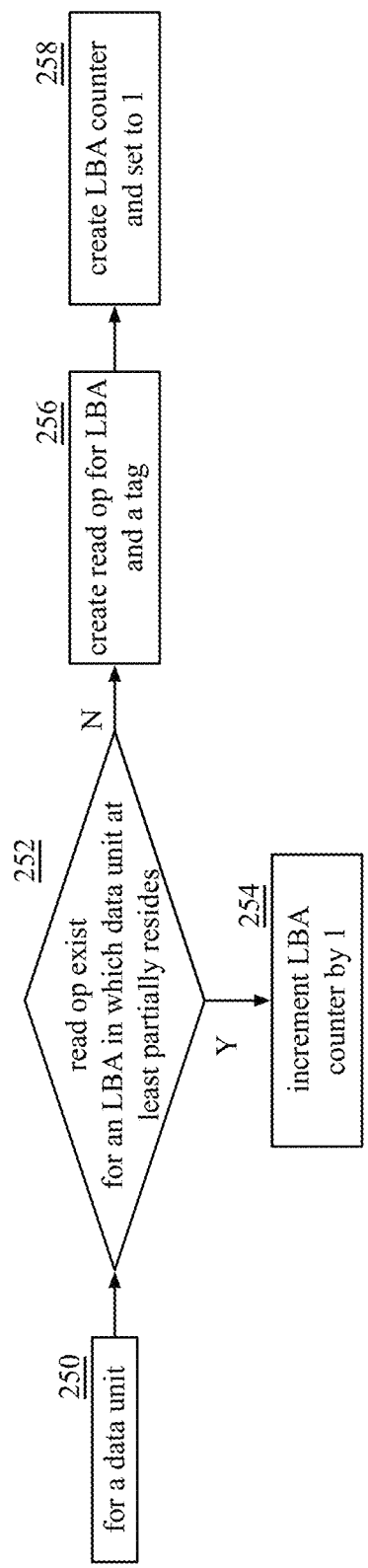
FIG. 21A is a logic diagram of an example of a method for creating a tagged read operation in accordance with the present invention.

FIG. 21A is a logic diagram of an example of a method for creating a tagged read operation by a processing entity. The method begins at step 250 where the processing entity identifies a data unit that is to be read from non-volatile memory. The method continues at step 252 where the processing entity determines whether a read operation exists for the logic block of the non-volatile memory in which the data unit is stored. If yes, the method continues at step 254 where the processing entity increments the counter value for the logic block. The method then repeats for the next data unit to be read or ends when all data units that are to be read have been processed in this manner.

When a read operation does not exist for the data unit, the method continues at step 256 where the processing entity creates a read operation for the logic block and creates a unique tag value for the logic block. The method continues to step 258 where the processing entity creates a counter value for the logic block and sets it to 1 (for the data unit). The method then repeats for the next data unit to be read or ends when all data units that are to be read have been processed in this manner.

Figure 21B:
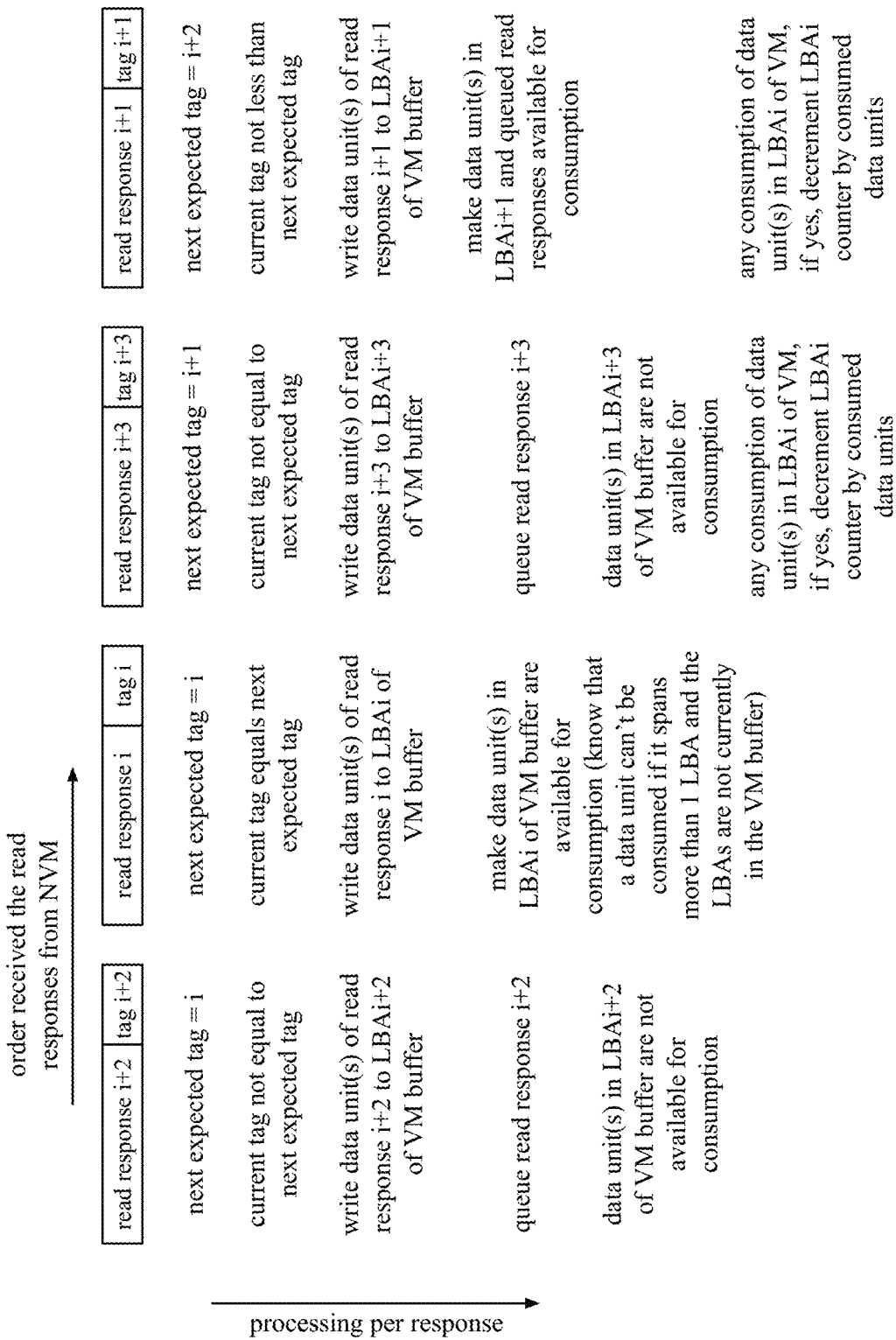
FIG. 21B is a diagram of an example of a processing tagged read operations in accordance with the present invention.

FIG. 21B is a diagram of an example of processing tagged read operations of FIG. 21 by a processing entity. As discussed above, the processing entity sends the tagged read operations in the order corresponding to the order of the logic blocks: LBAi read operation first, LBAi+1 read operation second, and so on. The non-volatile memory, however, does not typically process read operations in the order they were sent, but in a more random order. For this example, the non-volatile memory responded to the read operation for LBAi+2 first, then to the read operation for LBAi, then to the read operation for LBAi+3, and finally to the read operation for LBAi+1.

After sending the read operations to the non-volatile memory, the processing entity sets a flag for the next expected tag. The next expected tag corresponds to the next logic block in the order of logic blocks that have been received. In the first column of the example, the next expected tag is set to "i", which is the tag for the read operation for logic block LBAi (the first logic block in the order).

The non-volatile memory, however, provides a read response i+2 (which includes tag i+2) to the read operation for logic block BLAi+2. In this instance, the process entity keeps the next expected tag set to "i", since it has not yet received the response to the read operation for logic block LBAi. Since the current tag is not equal to the next expected tag, the processing entity writes the data unit(s) of the current data block (e.g., LBAi+2) into LBAi+2 position of a virtual machine (VM) buffer (i.e., the ordered buffer 112 of FIG. 20). In addition, the processing entity queues the tag i+2. Note that data units of LBAi+2 are not made available for consumption at this time.

The next response from the non-volatile memory is read response i (with tag i) for the read operation for logic block LBAi. In this instance, the read response tag matches the next expected tag of i. As such, the processing entity writes the content of read response i (i.e., the data unit(s) stored in LBAi) into position LBAi of the VM buffer and makes the whole data units available of consumption. The processing entity adjusts the next expected tag to i+1 and checks to see if the next expected tag has been queued. In this case, it hasn't. Note that a partial data unit of a logic block is not made available for consumption until it is fully stored in order in the VM buffer. Further note that the data units of LBAi+2 are still not available for consumption.

The non-volatile memory next provides read response i+3 (with tag i+3) for read operation for logic block LBAi+3. Since the next expected tag is i+1, the tags do not match. Thus, the processing entity stores the content of the read response for the LBAi+3 in the LBAi+3 position of the VM buffer, but does not make the content (i.e., the data unit, or units) available for consumption. In addition, the processing entity queues the tag i+3. During this time, data units stored in the LBAi section of the VM buffer may have been consumed (e.g., retrieved for processing). If so, the counter value is decremented by the number of data units that have been consumed. When the counter value reaches zero, the logic block position of the VM buffer is released.

This example continues with the non-volatile memory providing read response i+1 (with tag i+1) to read operation LBAi+1. Since this tag matches the next expected tag, the processing entity stores the content read response i+1 in LBAi+1 position of the VM buffer and makes the content (e.g., the hole data units of LBAi) available for consumption. The processing entity then updates the next expected tag to i+2 and checks the queue for i+2. Since the queue includes i+2, the processing entity makes the contents of LBAi+2 available for consumption, updates the next expected tag to i+3, and checks the queue.

Since the queue includes i+3, the processing entity makes the contents of LBAi+3 available for consumption. At this point, all of the data units are available for consumption. As the data units are consumed from the logic blocks, the counters of the logic blocks are decremented. When a logic block counter reaches zero, the logic block location in the VM buffer is released. This allows for ordering to be maintained despite out of order responses by the non-volatile memory, which increases efficiency and parallelism of processing data for a query.

FIGS. 22 and 22A are a logic diagram of an example of a method for creating tagged read operations and processing responses thereto by a processing entity. The method begins at step 260 of FIG. 22 where the processing entity identifies data units to read from non-volatile memory and to write them into ordered buffers of volatile memory. The volatile memory includes random access memory and the non-volatile memory including one or more of a solid-state memory device and a disk memory device. The data units have a variety of data sizes and are stored in "n" number of logical data blocks of the non-volatile memory, wherein "n" is an integer greater than or equal to two. In this example, at least one data unit is stored in two or more logical data blocks (e.g., data unit 3 of FIG. 21). Also, in this example, the logical data blocks storing the data units are contiguous (e.g., have logical addresses that are contiguous), yet the physical memory locations of logic blocks in the disk memory are not contiguous.

In one example, the processing entity identifies the data units by receiving an operation that includes reading the data units from the disk memory and writing the plurality of data units into the ordered buffer. In another example, the processing entity accessing metadata regarding the plurality of data units to read to determine the logic blocks to read from the disk memory. The processing entity uses the number of logic blocks to read to create an ordered buffer in the volatile main memory. Note that, in an embodiment, creating the ordered buffer is done in accordance with a process specific operating system of the computing device and that the process specific operating system overrides, with respect to the volatile main memory, a general operating system of the computing device.

The method continues at step 262 where the processing entity generates "n" number of read operations regarding the plurality of data units (i.e., one for each logic block to be read). In addition, the processing entity determines a unique data unit count value (e.g., counter value) for each read operation. The unique data unit count value indicates a number of data units that are at least partially stored within a corresponding logical data block (e.g., logic block). The counter value is used to determine when the logic block in the volatile main memory can be released. For instance, the processing entity tracks when a data unit of a logic block of the volatile main memory is consumed. When a data unit is consumed, the counter value is decremented. When the counter value reaches zero, the logic block position of the ordered buffer is released.

The method continues at step 264 where the processing entity tags each read operation with a unique ordered tag value. As an example, a first read operation is regarding a first logical data block of the "n" number of logical data blocks of the non-volatile memory and is tagged with a first ordered tag value. The processing entity sends the read operations with their corresponding tags to the non-volatile memory.

The method continues at step 266 where the processing entity receives read responses to the read operations from the non-volatile memory. For example, a first read response is received in response to the first read operation and includes the first ordered tag value.

The method continues at step 268 where the processing entity writes data units contained in the read responses into the ordered buffers in accordance with the ordered tag values. This step will be further described with reference to FIG. 22A. The method continues at step 270 where the processing entity tracks consumption of the data units from the ordered buffers using the counter values.

FIG. 22A expands on the method of FIG. 22 and begins at step 280 where the processing entity compares an order tag value of a current received read response of the read responses with a next expected tag value. The method branches at step 282 based on whether the comparison of step 280 was favorable or not. When the comparison was not favorable, the method continues at step 284 where the processing entity queues the tag of the read response and stores the contents of the logic block in its appropriate place in the ordered buffer, but the contents are not made available for consumption.

When the comparison is favorable, the method continues at step 286 where the processing entity writes the one or more partial data units contained in the current received read response to one of the ordered buffers based on the ordered data tag. The method continues at step 288 where the processing entity increments the next expected tag value. An example of processing the read responses in view of tags and queued tags was provided with reference to FIG. 21B.

Figure 23:
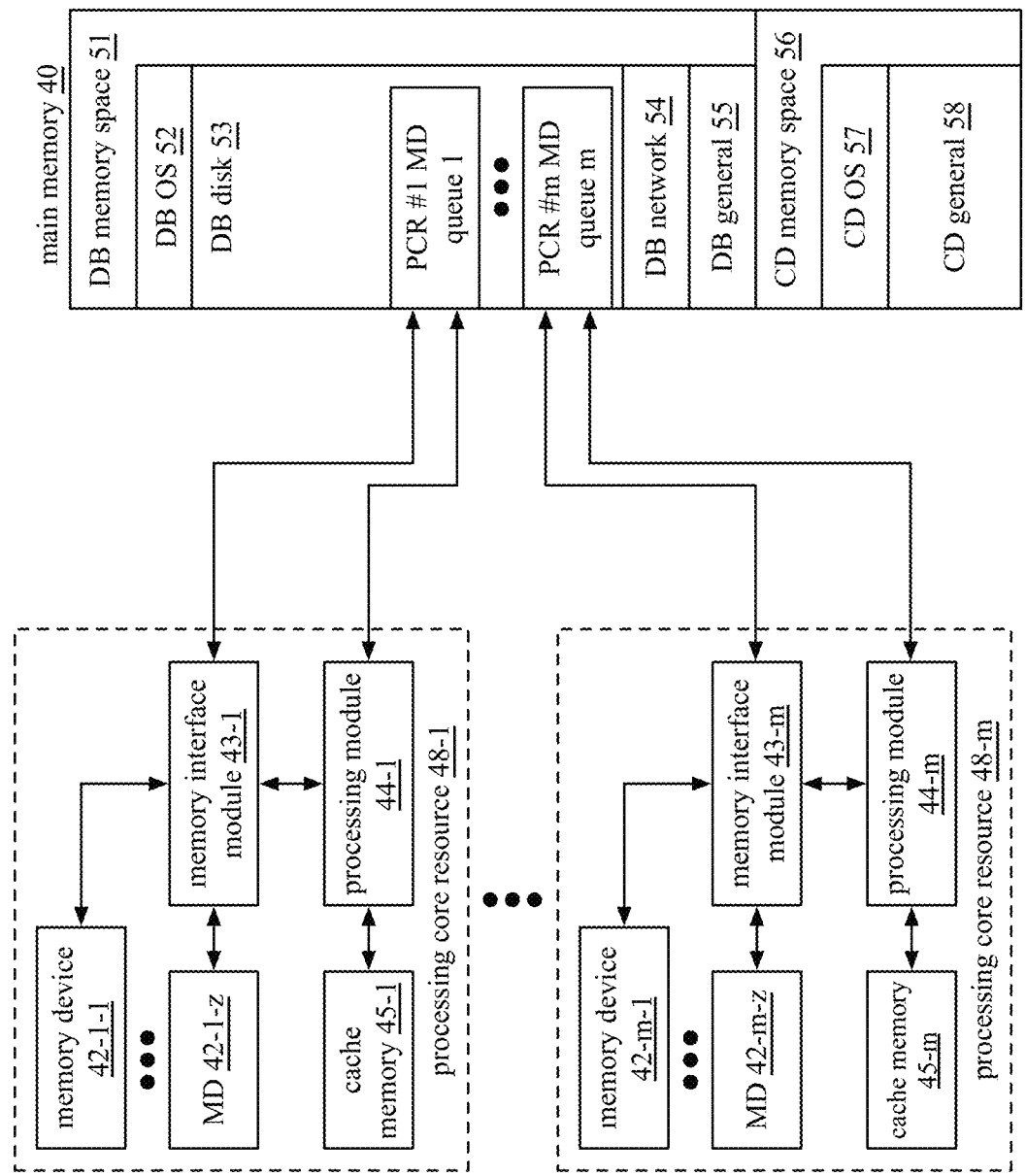
FIG. 23 is a schematic block diagram of an example of memory device (MD) buffer queues being allocated to memory devices of processing core resources of a node of a computing device in accordance with the present invention.

FIG. 23 is a schematic block diagram of an example of memory device (MD) buffer queues 1-$m$ being allocated to memory devices 42 of processing core resources 48 of a node of a computing device. Under the control of the database operating system, the main memory 40 of a computing device is divided into a database (DB) memory space 51 and a computing device (CD) memory space 56. The DB memory space 51 is generally and dynamically divided into a DB disk section 53, a DB network section 54, and/or a DB general section 55 as previously discussed. Each of the sections may be further dynamically divided into buffers, queues, or other forms of temporary data storage containers. For the purposes of this figure, dynamically divided means that, in accordance with the DB operating system, a portion of the DB memory space is allocated to a node, a processing core resource (PCR), operation, and/or thread on an as needed basis.

In this example, queues are allocated to the memory devices of the processing core resources (PCR) of a node. As a specific example, the memory device (which includes one or more solid state non-volatile memory devices) of PCR 48-1 is allocated a queue called PCR #1 MD queue 1. The processing module of PCR 48-1 can write data into and read data from PCR #1 MD queue 1. The processing modules 44 of the other processing core resources can read data from PCR #1 MD queue. In an embodiment, processing module 44-$m$ of processing core resource 48-$n$ can write data to the PCR #1 MD queue 1.

As a specific example, the memory device 42-$m$-1 (which includes one or more solid state non-volatile memory devices) of PRC 48-$m$ is allocated a queue called PCR #m MD queue m. The processing module 44-$m$ of PCR 48-$m$ can write data into and read data from PCR #m MD queue m. The processing modules 44 of the other processing core resources can read data from PCR #m MD queue m. In an embodiment, processing module 44-1 of processing core resource 48-1 can write data to PCR #m MD queue m.

Data is written into and read from the PCR memory device (MD) queues in a format and/or data word size that corresponds to the format and/or data word size of the memory devices. For example, data is stored as pages (i.e., a contiguous block of physical memory) in the memory devices. Accordingly, data is stored in the MD queues in the same sized pages (e.g., 4 Kbytes). By using the same size, the memory interface modules of the processing core resources can directly access the PCR MD queues. In this manner, the queues are pinned memory and improves read and write efficiencies between the memory devices of the processing core resources and main memory by eliminating reads and writes having to be processed by the processing module of the processing core resources. Such processing typically included a format change (e.g., a data size change from one data size to another).

Figure 24:
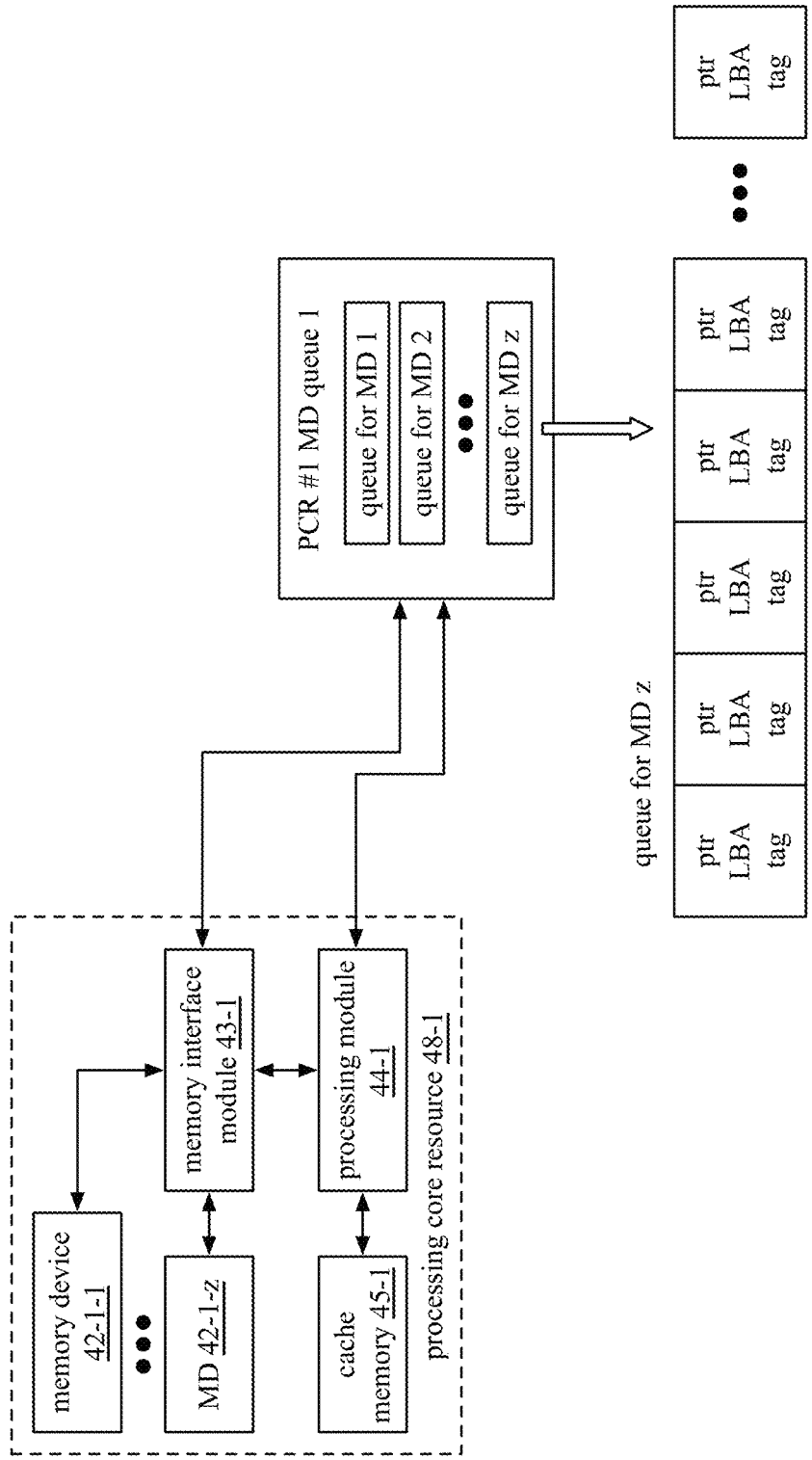
FIG. 24 is a schematic block diagram of an example of a memory device (MD) buffer queue having separate queues for each memory device of a processing core resource of a node of a computing device and the formatting of the separate queues in accordance with the present invention.

FIG. 24 is a schematic block diagram of an example of a memory device (MD) buffer queue having separate queues 1-z for each memory device of a processing core resource 48 of a node 37 of a computing device 18 and the formatting of the separate queues. This example is a continuation of the example of FIG. 23, which includes processing core resource 48-1 and PCR #1 MD queue 1. The queue is divided into separate queues for each physical memory device (1-z) of the processing core resource 48-1. Each individual memory device queue (e.g., queue for MD #z) is divided into fields. Each field of a queue includes a pointer (ptr), a logical block address (LBA), and a tag. The pointer points to a physical memory space in the particular memory device (e.g., memory device z) and the LBA is the logical block address for the data of where it is stored in virtual memory space. The tag is a tracking number that corresponds to when an input or output request was made for the data at the LBA.

Entry into a memory device queue is separate and asynchronous from executing an operation regarding the data identified in the field of the queue. For example, when a read request is received for data at LBA xxx, it is tagged with a number, the physical address is determined, and the information is entered into a field of the queue. That completes this process and the operation requesting the read cannot now delete the information from the queue. At some later time, the read request will be processed, and the queue cleared.

The physical processing of a read requests is typically not done in the same order as the read requests were received. The read request order, however, is important to ensure that operations flow in a desired order and deadlocks are avoided. The present queue processing allows for out of order read processing while maintain read request ordering. An example of this is provided with reference to FIGS. 25-29.

Figure 25:
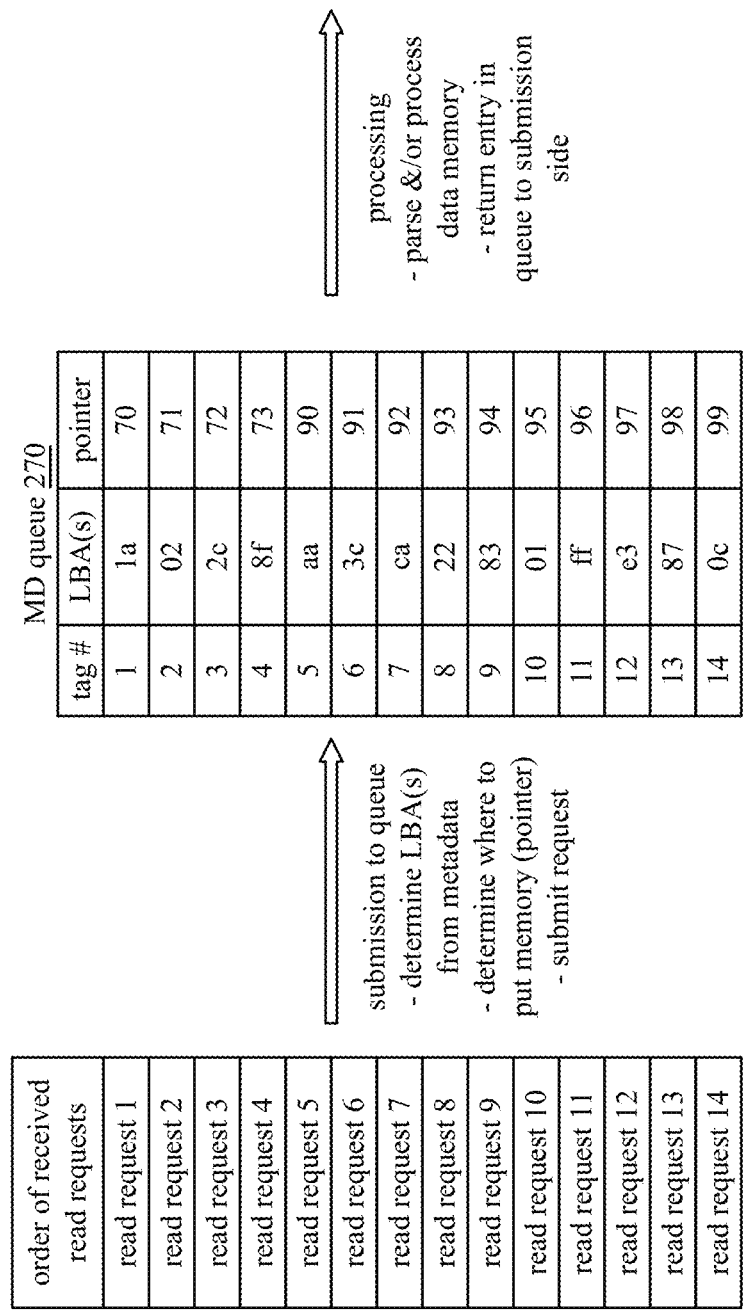
FIG. 25 is a schematic block diagram of an example of read requests being received in an order for a memory device and information regarding the read requests being entered into memory device's queue in accordance with the present invention.

FIG. 25 is a schematic block diagram of an example of read requests being received in an order for a memory device of a processing core resource and information regarding the read requests being entered into memory device's queue 270. In this example, 14 read requests have been received in a short time frame (too short to individually process the read request before the next one comes in). Each read request is added to the MD queue. For example, read request 1 is tagged with tag #1, its LBA is added to the LBA portion of the first field, and the pointer to the physical memory is added in its portion of the field. The other read requests are similarly added to the MD queue.

The read requests may be from the same processing core resource, from different processing core resources of the same node, and/or from processing core resources of different nodes of a computing device. As the read requests are entered (i.e., submitted) into the queue, processing of them begins. The processing includes parsing and/or process data memory, return an entry in the queue to the submission side.

Figure 26:
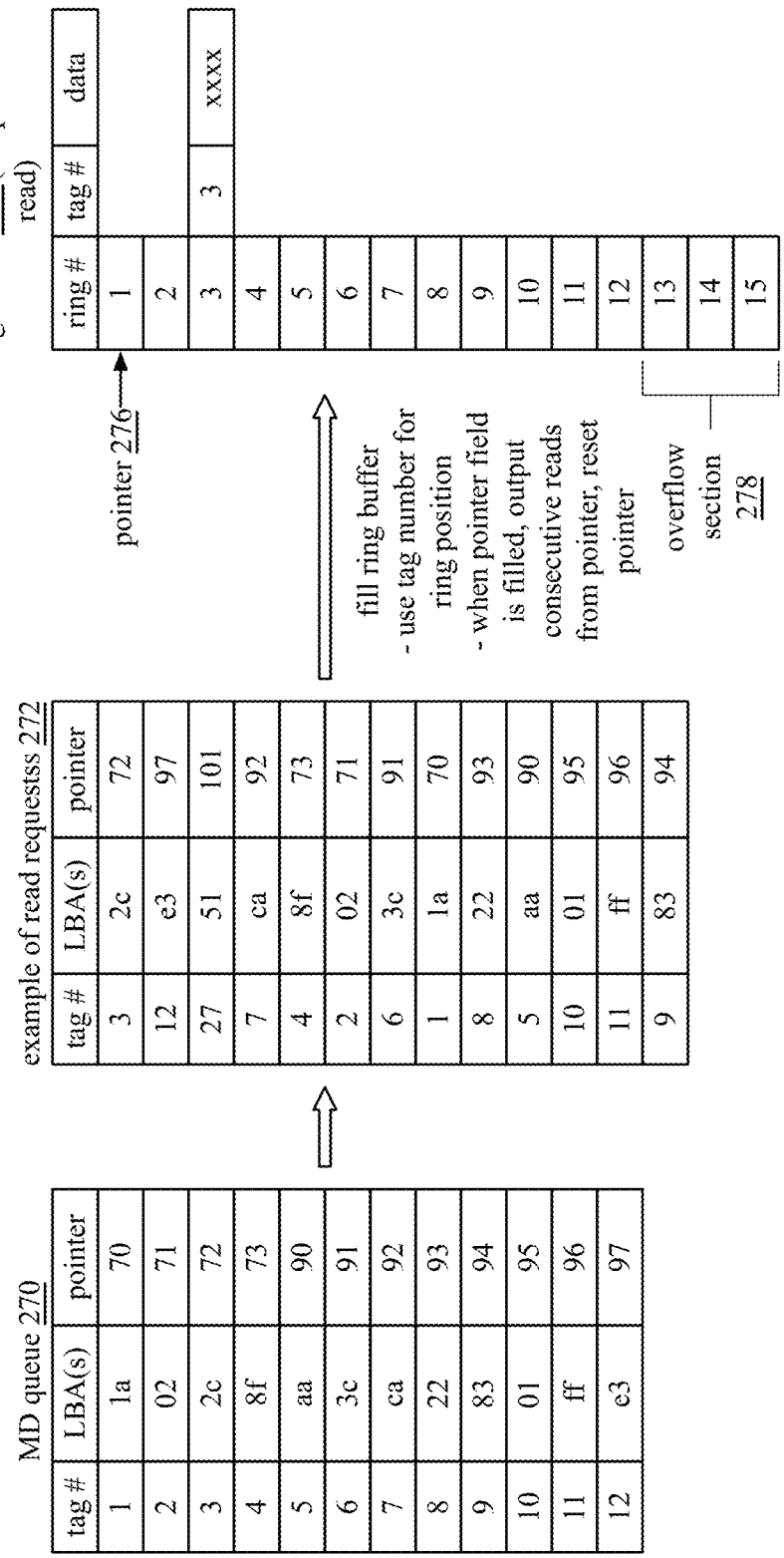
FIG. 26 is a schematic block diagram of an example of read requests being processed out of the order in which they were received, the corresponding information in the memory device queue being entered into a ring buffer as the requested are being processed, and positioned in the ring buffer based on tags in accordance with the present invention.

FIG. 26 is a schematic block diagram of an example of read requests 272 being processed out of the order in which they were received, the corresponding information in the memory device queue 270 being entered into a ring buffer 274 as the requests are being processed, and positioned in the ring buffer based on tags. In this example, the order in which the read requests are actually processed is shown in the middle table (example processed reads). In this example, read request #3 is the first to be processed and added to a ring buffer in position #3.

The ring buffer is pre-sized to temporarily hold read requests until at least a partial ordered portion of the read requests have been processed. The ring buffer further includes an overflow section 278 to temporarily hold processed read requests that are processed fairly significantly out of the order in which they were requested.

The ring buffer 274 includes a pointer 276 that points to the ring buffer location corresponding to the first read request in the MD queue (e.g., with the tag of #1). In the ring buffer, as long as the first space is empty, a consecutive order of completed read requests. Thus, at this stage of processing read requests, nothing is outputted.

Figure 27:
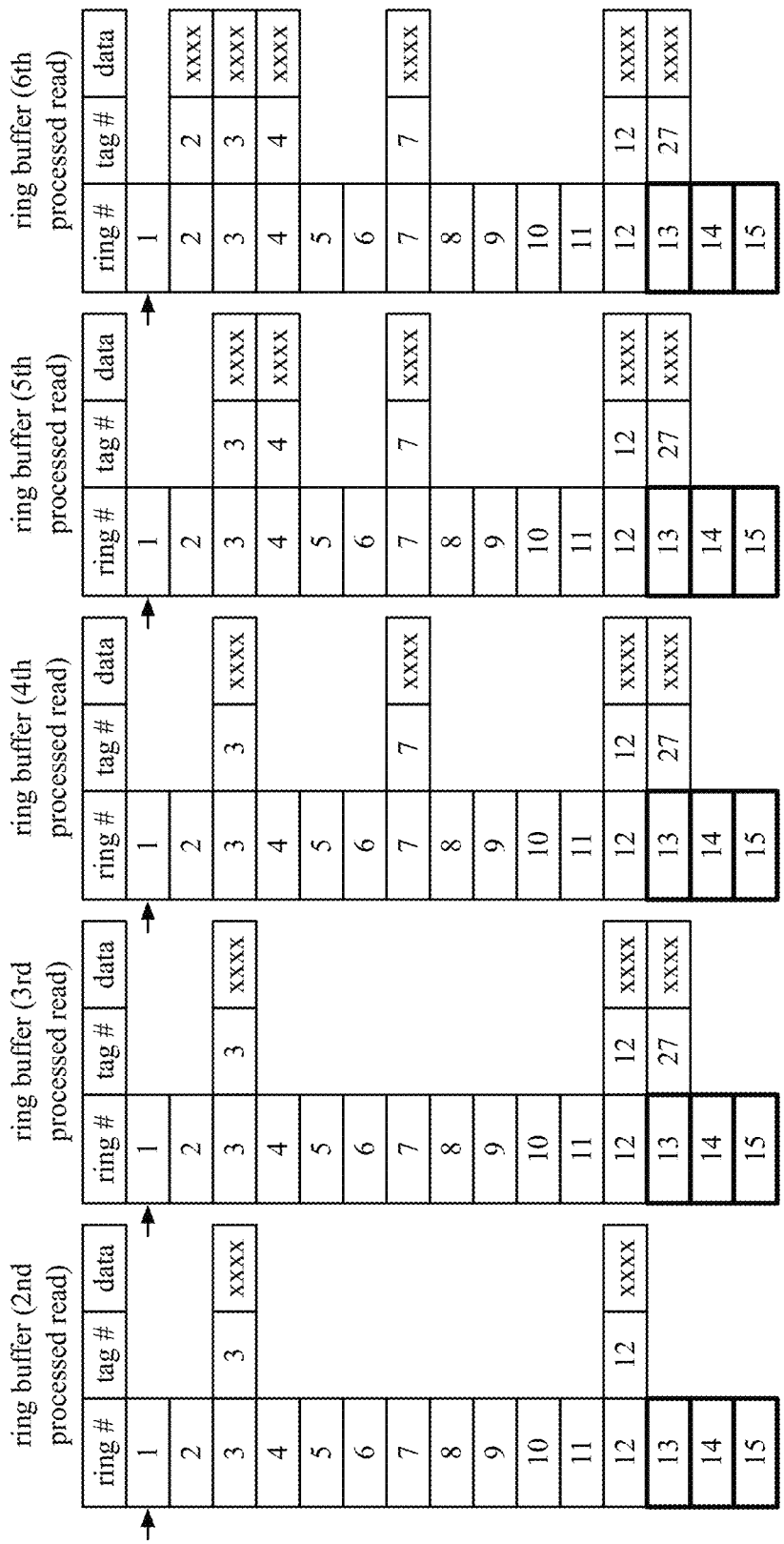
FIGS. 27-29 are schematic block diagrams of an example of filling up the ring buffer of FIG. 26 and outputting read data in a sequenced order in accordance with the present invention.

FIG. 27 illustrates the processing of the next five completed read requests. The second processed read request is for the received read request #12. The processed read request is added to position 12 in the ring buffer. The pointer stays pointing a ring #1. The third processed read request is for the received read request #27. Since this read request is significantly out of order for a ring buffer having 12 entries, it is placed in the overflow section. In particular, it is placed in position 13 of the ring buffer.

The fourth processed read request is for the received read request #7. The processed read request is added to position 7 in the ring buffer. The fifth processed read request is for the received read request #4. The processed read request is added to position 4 in the ring buffer. The sixth processed read request is for the received read request 12. The processed read request is added to position 2 in the ring buffer. At this point in time, position 1 is still empty and the pointer continues to point to it.

Figure 28:
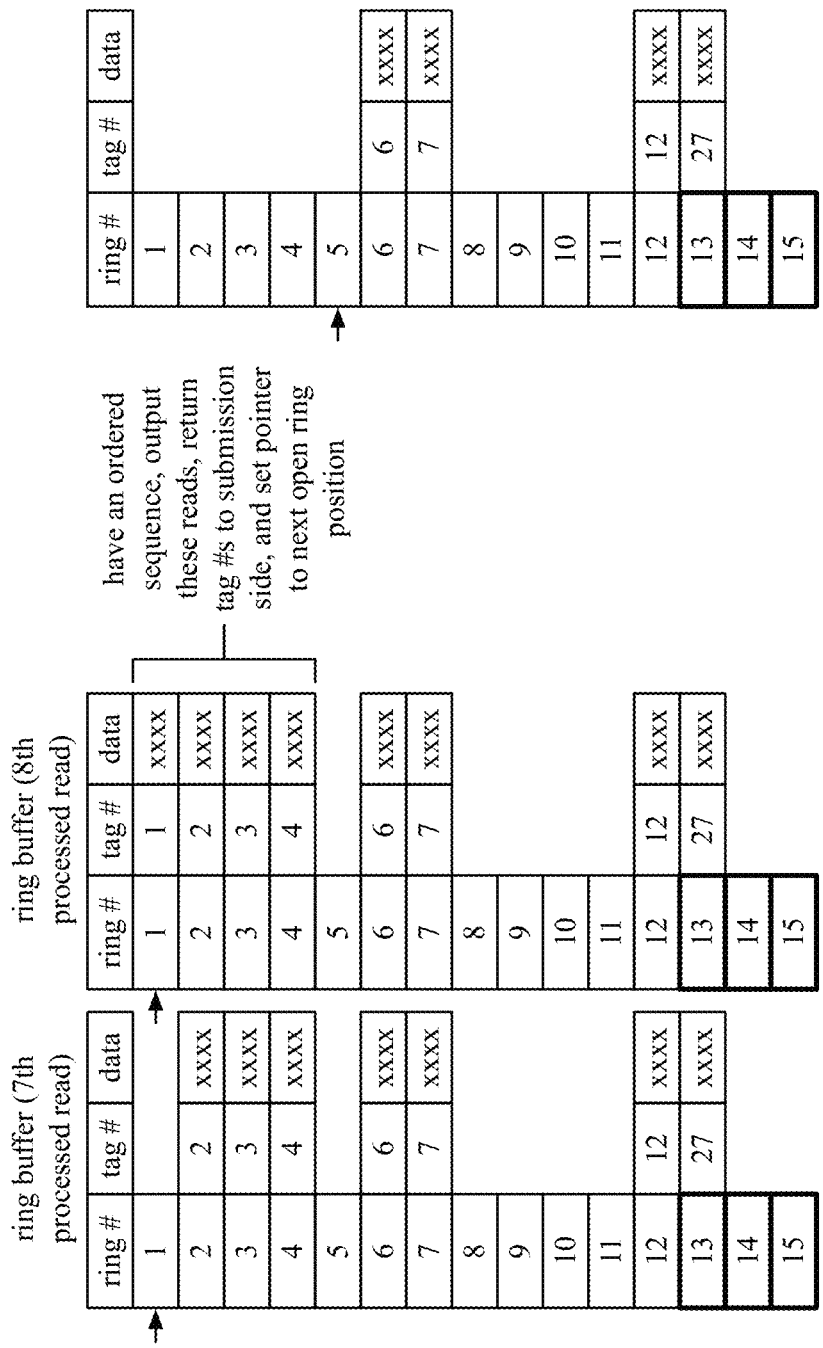

FIG. 28 illustrates the processing of the next two completed read requests. The seventh processed read request is for the received read request #6. The processed read request is added to position 6 in the ring buffer. The pointer stays pointing at ring #1. The eighth processed read request is for the received read request #1. The processed read request is added to position 1 in the ring buffer. At this point in time, the pointer is now pointing to a non-empty field. With the pointer pointing to a non-empty field, the pointer field and every consecutive field that is not empty has the corresponding read operation completed.

In this example, the first four entries in the ring buffer are not empty. So, the read requests having tag numbers 1-4 are outputted. Once the data is outputted (i.e., read by the requesting entity), the pointer is moved to the next empty location. Position 5 in this example. In addition, positions 1-4 are released and are now at the end of the ring buffer.

Figure 29:
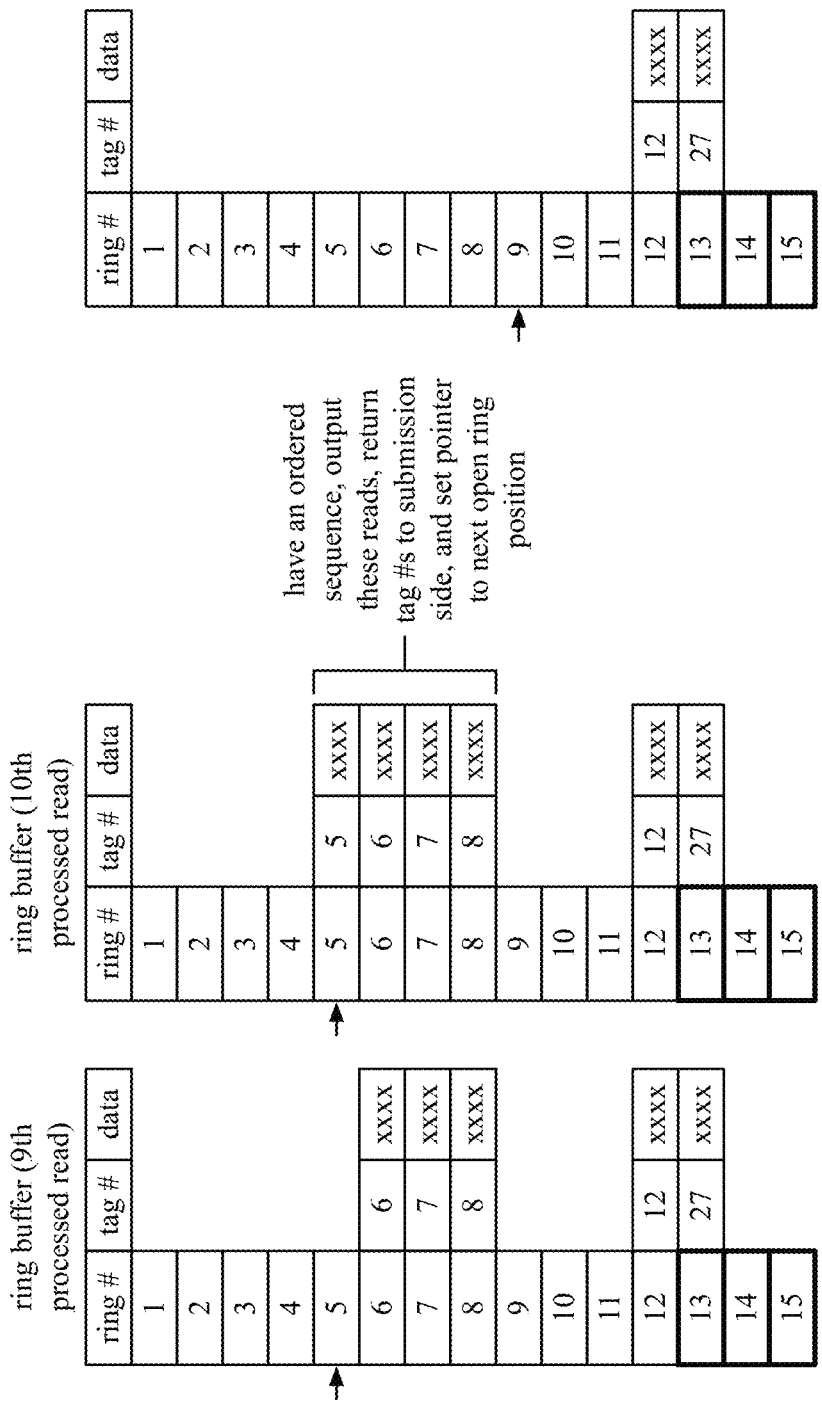

FIG. 29 illustrates the processing of the next two completed read requests. The ninth processed read request is for the received read request #8. The processed read request is added to position 9 in the ring buffer. The pointer stays pointing a ring #5. The tenth processed read request is for the received read request #5. The processed read request is added to position 5 in the ring buffer. At this point in time, the pointer is now pointing to a non-empty field. With the pointer pointing to a non-empty field, the pointer field and every consecutive field that is not empty has the corresponding read operation completed.

In this example, the four entries in the ring buffer of 5-8 are not empty. So, the read requests having tag numbers 5-8 are outputted. Once the data is outputted (i.e., read by the requesting entity), the pointer is moved to the next empty location. Position 9 in this example. In addition, positions 5-8 of are released and are now at the end of the ring buffer.

Figure 30:
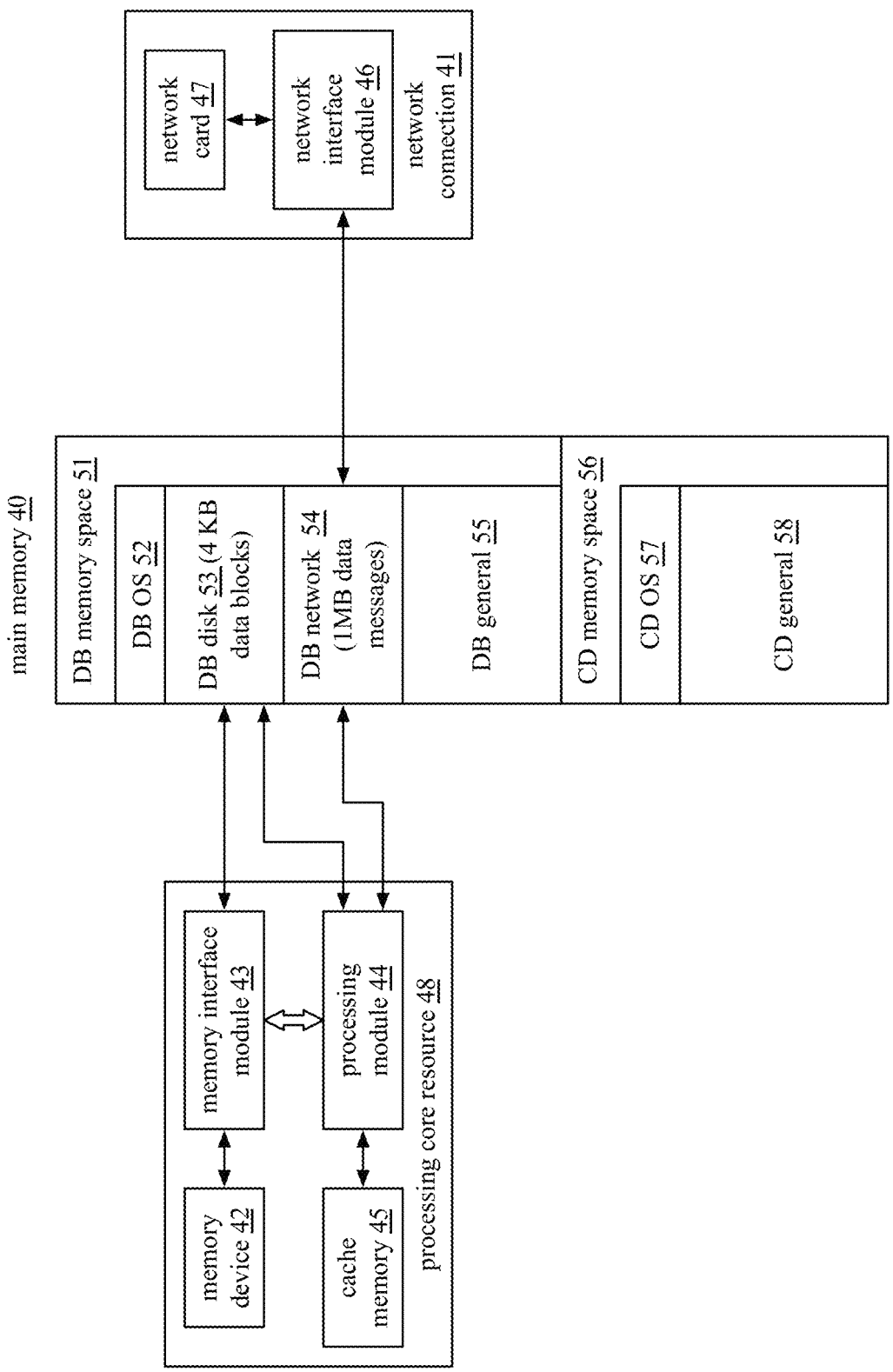
FIG. 30 is a schematic block diagram of an example of direct memory access for a processing core resource and/or for a network connection in accordance with the present invention.

FIG. 30 is a schematic block diagram of an example of direct memory access for a processing core resource 48 and/or for a network connection 41 as previously discussed.

Within a computing device, the main memory 40 is logically partitioned into a database section (e.g., database memory space 51) and a computing device section (e.g., CD memory space 56 as previously discussed). In an embodiment, the main memory 40 is logically shared among the processing cores of the nodes of a computing device under the control of the database operating system. In another embodiment, the main memory 40 is further logically divided by the database operating system such that a processing core resource of a node of the computing device is allocated its own main memory.

The database memory space 51 is logically and dynamically divided into a database operating system (DB OS) 52 section, a DB disk section 53, a DB network 54 section, and a DB general 55 section. The database operating system determines the size of the disk section, the network section, and the general section based on memory requirements for various operations being performed by the processing core resources, the nodes, and/or the computing device. As such, as the processing changes within a computing device, the size of the disk section, the network section, and the general section will most likely vary based on memory requirements for the changing processing.

Within the computing device, data stored on the memory devices is done in accordance with a data block format (e.g., 4 K byte block size). As such, data written to and read from the memory devices via the disk section of the main memory is done so in 4 K byte portions (e.g., one or more 4 K byte blocks). Conversely, network messages use a different format and are typically of a different size (e.g., 1 M byte messages).

To facilitate lock free and efficient data transfers, the disk section of the main memory is formatted in accordance with the data formatting of the memory devices (e.g., 4 K byte data blocks) and the network section of the main memory is formatted in accordance with network messaging formats (e.g., 1 M byte messages). Thus, when the processing module 44 is processing disk access requests, it uses the DB disk section 53 of the main memory 40 in a format corresponding to the memory device 42. Similarly, when the processing module 44 is processing network communication requests, it uses the DB network 54 section of the main memory 40 in a format corresponding to network messaging format(s).

In this manner, accessing memory devices is a separate and independent function of processing network communication requests. As such, the memory interface module 43 can directly access the DB disk 53 section of the main memory 40 with little to no intervention of the processing module 44. Similarly, the network interface module 46 can directly access the DB network section 54 of the main memory 40 with little to no intervention of the processing module 44. This substantially reduces interruptions of the processing module 44 to process network communication requests and memory device access requests. This also allows for lock free operation of memory device access requests and network communication requests with increased parallel operation of such requests.

Figure 31:
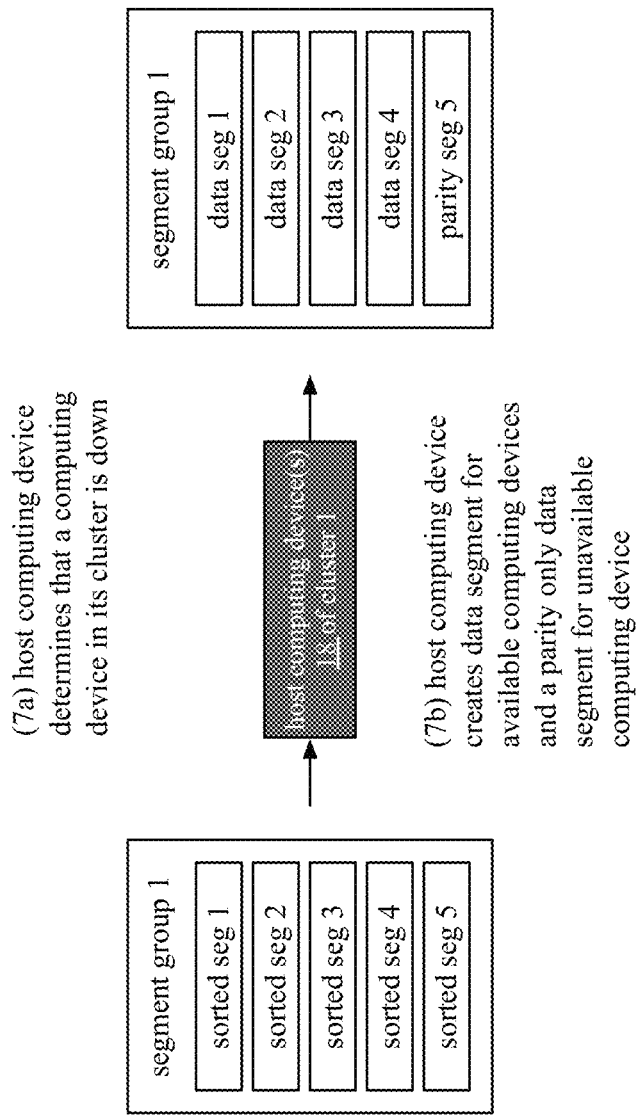
FIGS. 31-32 are schematic block diagrams of an example of processing a received data and distributed the processed table for storage in the database system when a computing device in a storage cluster is unavailable in accordance with the present invention.
Figure 32:
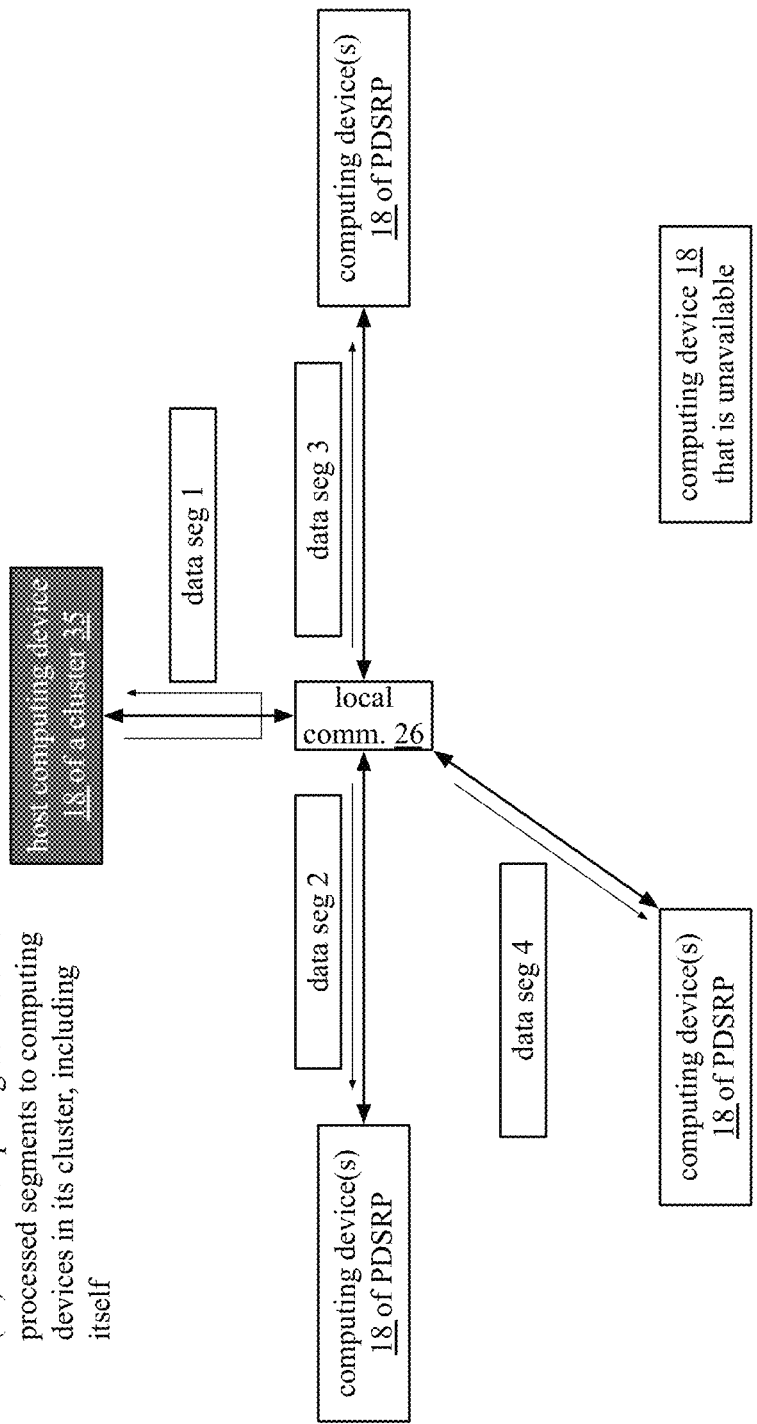

FIGS. 31-32 are schematic block diagrams of an example of processing received data and distributing the processed table for storage in the database system when a computing device 18 in a storage cluster 1 is unavailable. When this occurs, the host computing device 18 (e.g., L2 computing device of a storage cluster or L1 computing device) reorganizes a segment group or creates a different type of a segment group. In either case, the resulting segment group (assuming 5 segments in the group) has four segments that include data and a fifth segment that only includes parity data.

FIG. 32 illustrates the host computing device 18 sending, via local communications 26, the four data segments to the four active computing devices 18 in the cluster 35 and holds the parity segment for the unavailable computing device. When the unavailable computing device becomes available, the host computing device sends it the parity segment.

Figure 33:
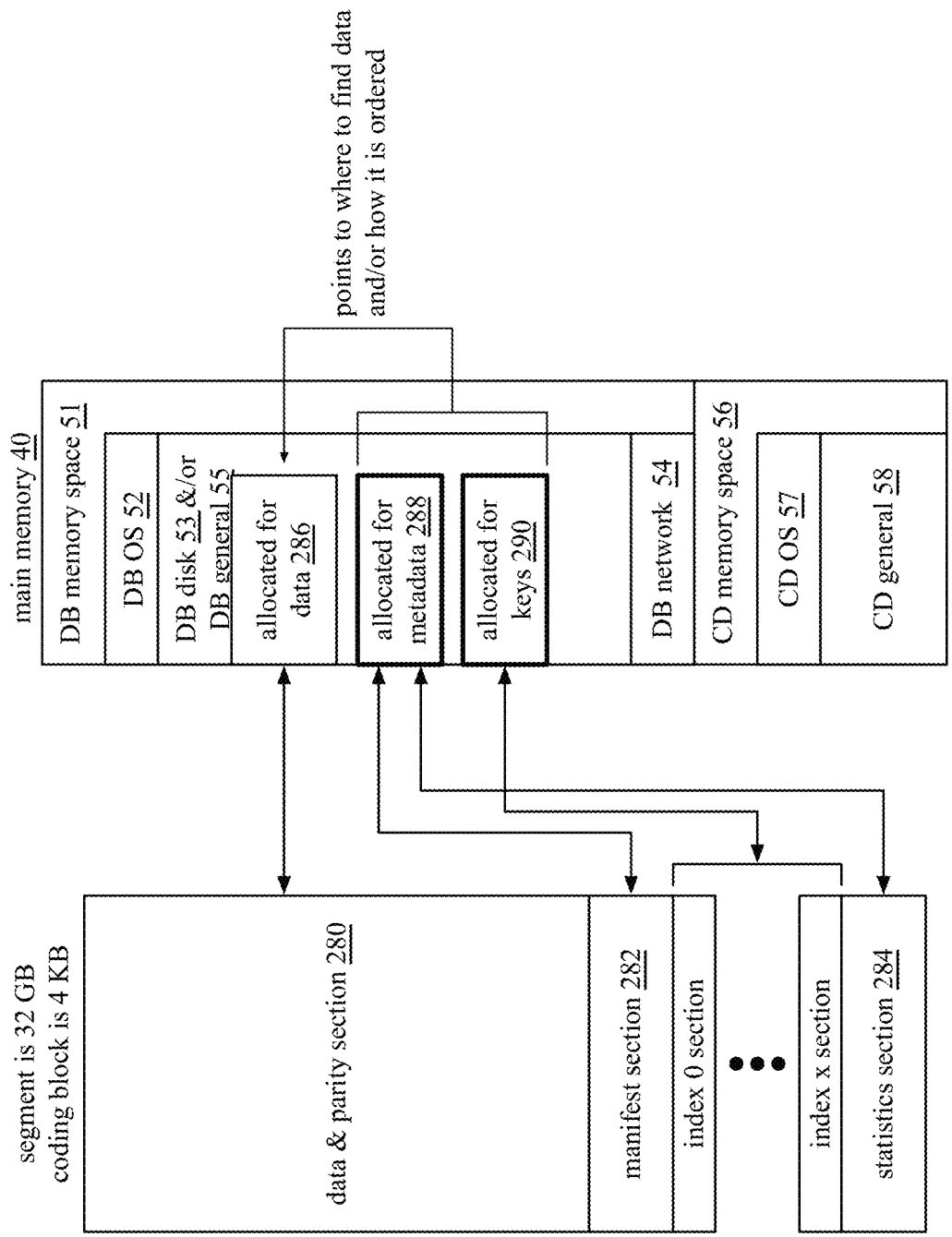
FIG. 33 is a schematic block diagram of an example of allocated memory of main memory for manifest data and/or index data of a segment associated with a processing core resource in accordance with the present invention.

FIG. 33 is a schematic block diagram of an example of using allocated memory of main memory 40 for manifest data and/or index data of a data segment associated with a processing core resource. Data segments, such as the data segment depicted on FIG. 33 are the fundamental building block for data storage, where the segment (in this example 32 GB) is divided into coding blocks of, for example 4 KB. Each data segment includes a data & parity section 280, a manifest (or metadata) section 282, and multiple index sections 0 through x, along with a statistics section 284 where appropriate.

Main memory 40, as discussed previously, can be random access memory (RAM) or any other suitable cache memory structure, is associated with each node, or can alternatively be associated with a plurality of nodes and is shown as an allocated memory resource. Specifically, the main memory 40 may be allocated to provide defined space for the example elements of a database system, including memory space allocated for data 286, memory space allocated for metadata 288, and memory space allocated for keys 290.

When the main memory 40 is not large enough to store all the metadata and key data for the associated data and parity of a data segment the metadata allocation and key data allocation in main memory can be used to point to the location of the data (along with the data ordering methodology) in a given data segment. The allocated memory illustrated for manifest data and/or index data of a data segment can be incorporated at a processing core resource, as shown, and/or at a computing device level and/or node level.

Figure 34:
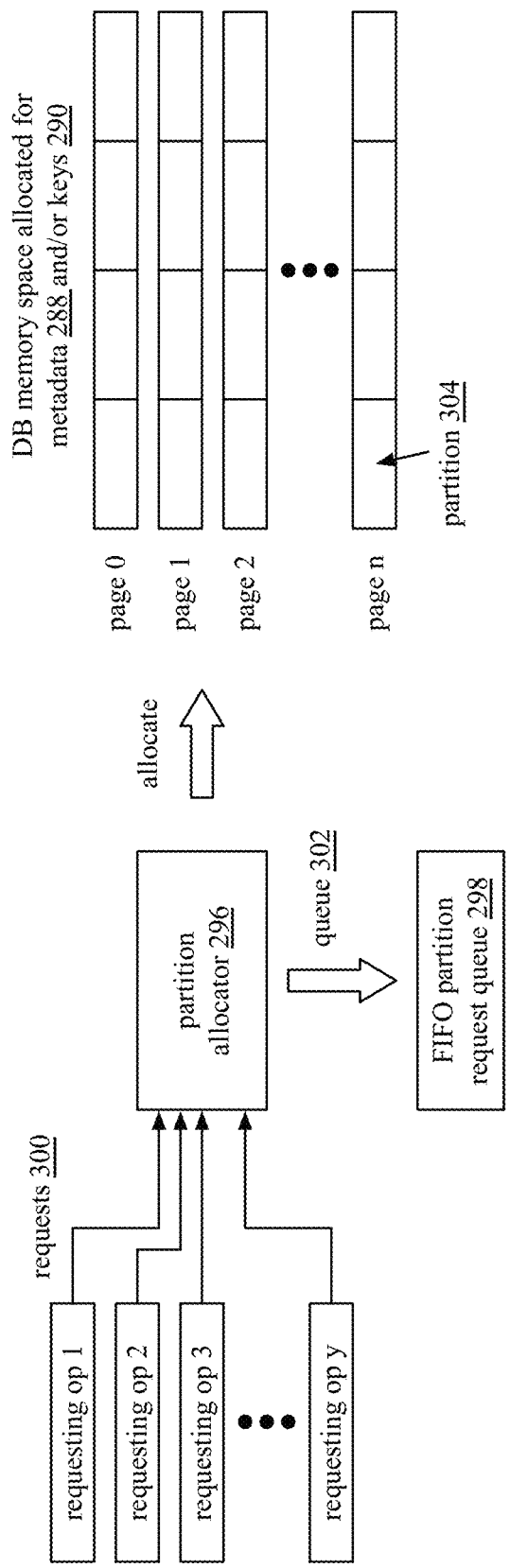
FIG. 34 is a schematic block diagram of an example of a partition allocator allocating partitions of the allocated memory of main memory to requesting operations in accordance with the present invention.

FIG. 34 provides a schematic block diagram of an example of a partition allocator 296 allocating partitions of the allocated memory of main memory to requesting operations (e.g., requests 300). Operations running on processing cores and or nodes (shown as requesting op 1 through requesting op y) execute the requests 300 over the network to one or computing devices associated with the database system. The computing devices include one more modules adapted as a partition allocator for the database memory, in order to process the requests in an ordered fashion. The partition allocator 296 is further adapted to create a queue 302 for the requests. The example shown illustrates a FIFO partition request queue 298; other alternatives include any queue that can be used to order the execution of requests from requesting entities.

Once the queue is created database memory space is allocated for the metadata 288 and/or keys 290 as discussed with regard to FIG. 33 above. In the example shown the database memory is divided into a plurality of pages (shown as pages 0 through page n). In an example there are a variable number of partitions defined for each page. For example, a page could be defined as a 1 gigabyte (GB) memory space with a partition size of 256-megabyte (MB) to render four (4) partitions per page. In an example page size can be selectable within any practical limit, and the number of partitions in each page can be selectable in a like manner.

Figure 35:
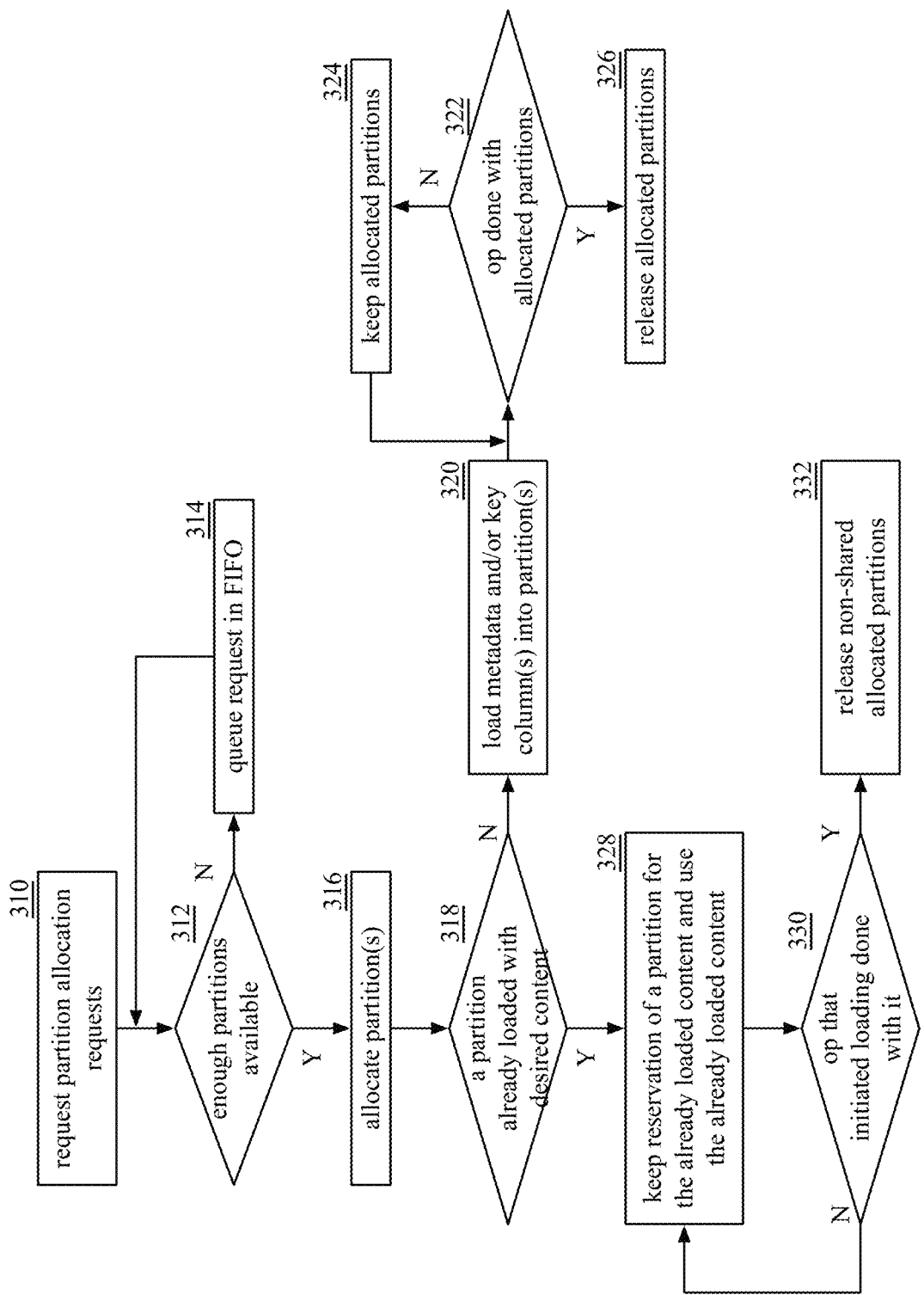
FIG. 35 is a logic diagram of an example of a method of allocating partitions of the allocated memory of main memory to requesting operations in accordance with the present invention.

FIG. 35 is a logic diagram of an example of a method of allocating partitions of the allocated memory of main memory to requesting operations. In an example, the partition allocator of FIG. 34 receives, at step 310, partition allocation requests based on operations running on processing cores and or nodes. The requests can be in response to a query initiated by the computing device receiving the request, or they may be initiated based on the operations themselves. Each operation responsible for a request will know how many partitions will be required based on the size of the metadata and/or keys it is retrieving from the database. Considering a single request received at the computing device, once the request is received at a next step the computing device determines whether enough partitions are available. At step 312, the computing device can determine whether the partitions are available based on prior knowledge and/or based on whether any requests are currently held in a partition queue, such as a FIFO queue. For example, if a FIFO queue has been created and already includes a previous request the computing device will determine that sufficient partitions are not available to service the request. In this case, at step 314, the request is queued in the FIFO queue in a step where the request is cycled through to the previous step 312.

If enough partitions are available the computing device allocates partitions at step 316, and at the next step 318, determines whether a partition has already been loaded with the desired content, where the content is the metadata for an associated data segment and/or a portion of the key column(s) for the associated data segment. If a partition has not already been loaded with the desired content the metadata and/or key column(s) are loaded into the identified partitions at next step 320. At step 322 the computing device determines whether the operation is done executing with the allocated partitions, and when it is, at step 326, the computing device releases the allocated partitions for use by another operation. When the operation is not executed with the allocated partitions, at step 324, the computing device ensures that the allocated partitions are maintained until the operation is executed or times out. Each operation requesting a partition is required to guarantee that the associated request can be either executed or that progress can be made toward execution so that the partition will not be deadlocked.

Additionally, a duty cycle can be established whereby on a regular interval each operation with one or more partitions that have been allocated are released and the operation associated with the request will initiate new partition requests for the same content. In such a case already allocated data can remain in main memory. The duty cycle can be based on a "deadlock avoidance" contract that all operations follow in order to ensure that nonperforming operations release allocated partitions on a regular interval in order to avoid locking up memory partitions and thereby decreasing performance of database operations.

When a partition has already been loaded with the desired content the method continues at step 328, where the computing device retains the partition(s) for already loaded content and the content is used for execution by the associated requestor(s). At step 330, the computing device determines whether the operation that initiated the partition allocation has been executed and when the operation has been executed the computing device releases the allocated partitions in main memory at step 332, as long as the partitions are not shared with another request and/or operation. When the computing device determines that the operation has not completed execution associated with the underlying request the computing device retains the allocated partition until the execution is complete by looping back to step 328.

Figure 36:
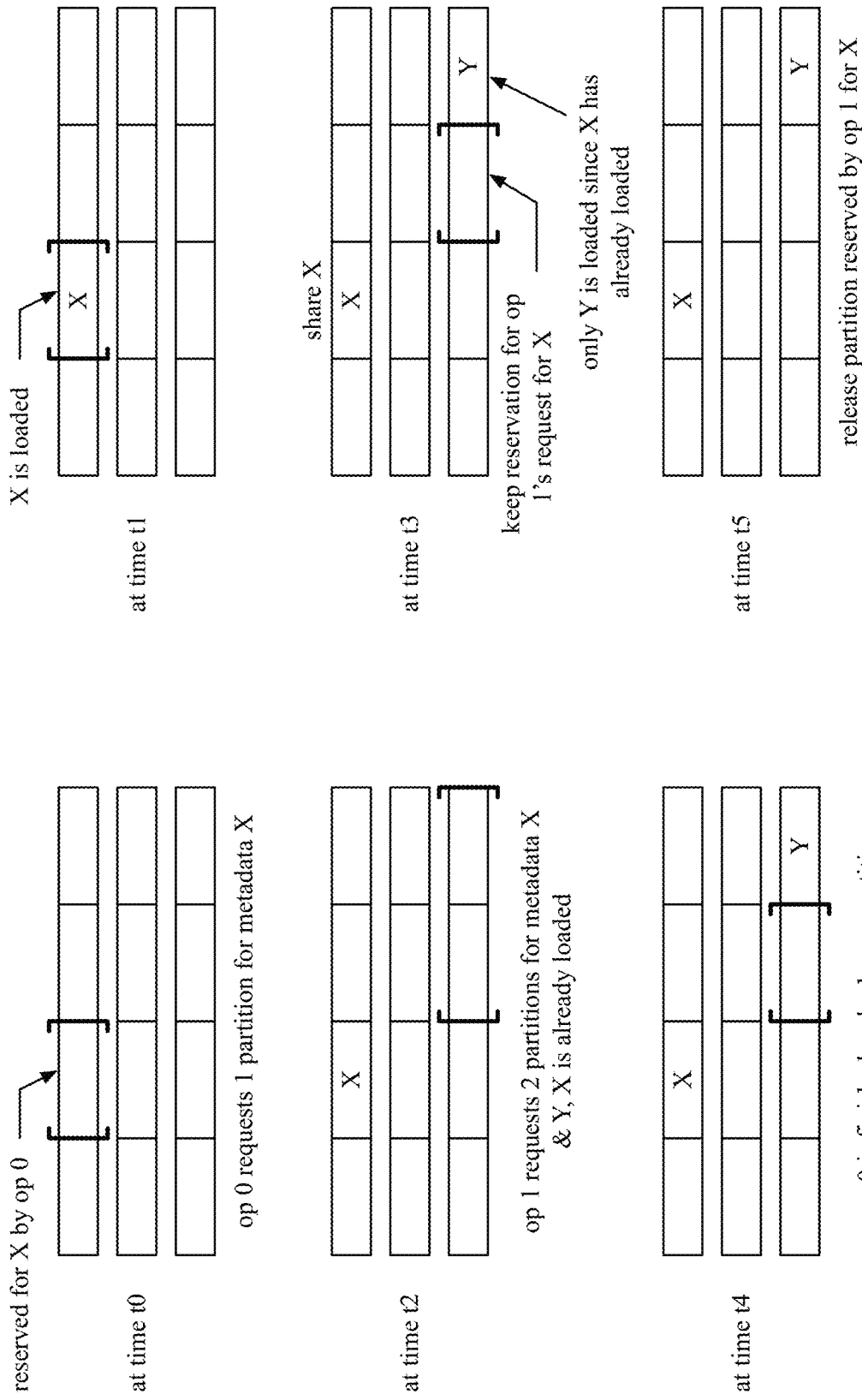
FIG. 36 is a schematic block diagram of another example of a partition allocator allocating partitions of the allocated memory of main memory to requesting operations in accordance with the present invention.

FIG. 36 is a schematic block diagram of another example of a partition allocator allocating partitions of the allocated memory of main memory to requesting operations. In an example at time t0 a single partition is reserved by an operation (op 0) for particular content, in this case metadata X. At time t1 metadata X has been loaded in main memory for the requesting operation. At time t2 another operation (op 1) requests two (2) partitions to be allocated for each of metadata X, which has already been loaded and metadata Y. At time t3 op 0 and op 1 share the already loaded metadata X and metadata Y is loaded (metadata X is not loaded again, since it has already been loaded) and the reservation for op 1 request for metadata X is maintained.

At time t4 op 0 has completed execution of the operation for which metadata x was loaded and releases the allocated partition for metadata X, but metadata X is not released, because op 1 may still be using it. At time t5 both op 0 and op 1 are complete, so the partition reserved by op 1 for X is released.

FIG. 37 is a schematic block diagram of another example of a computing device 360 that includes a plurality of nodes 365-1 through 365-*n*, a bus 350, a controller hub 373, a disk memory 376, and a main memory 370. The controller hub 373 includes a memory access control 374 and a disk access control 375. Each node 365 of the plurality of nodes 365 includes a set of processing core resources 378. For example, the first node 365-1 includes a first set of processing core resources 378-1-1 through 378-1-*k*, the second node 365-2 includes a second set of processing core resources 378-2-1 through 378-2-*k*, etc. In one example, a processing core resource (PCR) 378 is implemented by a processing core resource 48 with reference to one or more preceding Figures. In another example, the processing core resource 378 includes one or more of a network interface module, a memory interface module, a processing module, and a cache memory. In yet another example, a node 365 is implemented by a node 37 with reference to one or more preceding Figures.

The main memory 370 is logically divided into a custom operation system (OS) section 371 and a computing device OS section 372. In general, the custom OS 371 allocates main memory for custom operations (e.g., database operations) and the computing device OS 372 allocates main memory for general functions and operations of the computing device (e.g., accessing disk memory 376). In one embodiment, the custom OS is a database operating system.

In an example of operation, a first node (e.g., node 365-1) operates in accordance with a computing device operation system (OS) and remaining nodes (e.g., nodes 365-2 through 365-*n*) of the plurality of nodes operates in accordance with a custom OS. The first node includes a set of processing core resources (PCRs). The remaining nodes include a plurality of sets of processing core resources (e.g., PCR set 378-2 through PCR set 378-*n*). The plurality of sets of PCRs operate to process a plurality of sets of threads of an application. Each PCR of the plurality of PCRs is operable to execute one or more threads of the plurality of sets of threads. In an embodiment, the application is one of a bulk load application, a data storage application and query response application. In an example, the data storage application includes partitioning, segmenting, encoding, and other functions.

A plurality of portions of the custom memory section is logically allocated as a plurality of buffers. For example, a first portion of the plurality of portions is logically allocated as a first buffer and a second portion of the plurality of portions is logically allocated as a second buffer. In some examples, the first portion is the same size as the second portion. In other examples, the first portion is a different size (e.g., less than, greater than) the second portion. A thread of the plurality of sets of threads is assigned a buffer of the plurality of buffers. For example, a first thread of the plurality of sets of threads is assigned a first buffer and a second thread of the plurality of sets of threads is assigned a second buffer.

The memory access control module 374 operates in a variety of ways to coordinate access (e.g., read, write, etc) to the plurality of buffers by at least some of the plurality of sets of threads in accordance with the custom OS. In one example, the main memory access control module 374 operates to coordinate access to the plurality of buffers by utilizing a thread-safe cross core lock free data flow function as described with reference to one or more of FIGS. 15-19. In another example, the main memory access control module 374 operates to coordinate access to the plurality of buffers by utilizing an ordered buffer reuse function as described with reference to one or more of FIG. 20-22. In yet another example, the main memory access control module 374 operates to coordinate access to the plurality of buffers by utilizing an out of order input-output re-ordering function as described with reference to one or more of FIGS. 23-29. In a further example, the main memory access control module 374 operates to coordinate access to the plurality of buffers by utilizing a deadlock free partitioning function as described with reference to one or more of FIGS. 33-36.

The memory access control module 374 also coordinates access to the computing device section of the main memory in accordance with the computing device OS. The memory access control module 374 further coordinates between the accessing of the computing device section and the accessing of the plurality of buffers. In one example, the memory access control module gives preference (e.g., priority) to the custom OS section 371. In an embodiment, the memory access control includes a database OS thread control module and a computing device OS thread control module that operate to coordinate access of threads to the main memory 370.

The disk memory access control module 375 operates to coordinate access to the disk memory 376 in accordance with the computing device OS. The disk memory 376 includes one or more of solid state memory, disk drive memory and non-volatile flash memory.

FIG. 38A is a schematic block diagram of an embodiment of a controller hub 373 and a main memory 370 of a computing device. The controller hub includes a memory access control 374 and a disk access control 375. The main memory 370 is divided into a custom operation system (OS) section 371 and a computing device OS section 372. One or more portions of the custom OS section 371 are allocated as a plurality of buffers 1-n 380.

In operation, the memory access control coordinates access of a plurality of threads to the main memory 370. In an embodiment, the plurality of threads include database (DB) threads and computing device (CD) threads. The database threads execute in accordance with the custom OS and utilize the custom OS section 371 of main memory 370. The computing device threads execute in accordance with the computing device OS and utilize the computing device OS section 372 of main memory 370.

As a specific example, the memory access control 374 receives thread requests 1-5 during a particular time period (e.g., 10 ns). Threads 1-3 and 5 are database threads and thread 4 is a computing device thread. For example, threads 1-3 are regarding a data storage application, thread 5 is regarding a query response application, and thread 4 is regarding a disk memory access.

The memory access control 374 assigns a thread of the threads 1-5 to a buffer of the plurality of buffers 1-n 380 as illustrated in FIG. 38B. For example, thread 1 is assigned to buffer 1, thread 2 is assigned to buffer 2, thread 3 is assigned to buffer 4, and thread 5 is assigned to buffer 3. In this example, the computing device thread (e.g., thread 4) is not assigned to a buffer 380 as the computing device thread utilizes the computing device OS section 372 of the main memory 370.

The memory access control determines a processing order (e.g., schedules) for processing the threads 1-5 by one or more of a variety of approaches. As a first approach, the memory access control determines the processing order by determining to process a threshold number of database threads before processing a computing device thread. As a second approach, the memory access control determines the processing order based on an optimization factor (e.g., size, estimated computing time, type (e.g., write, read), etc.). As a third approach, the memory access control determines the processing order in accordance with a protocol (e.g., in the order the threads were received (First-Come-First-Served (FCFS)), First-Ready FCFS, etc.). The threads execute in accordance with the processing order and return thread responses (e.g., to the processing core resource that sent a corresponding thread request). The processing order is discussed in further detail with reference to FIGS. 38C-D.

FIG. 38C illustrates an example of processing each thread sequentially in accordance with a processing order. For example, the processing order indicates to process database thread 5, and once complete, process database thread 1 and so on processing database thread 2, computing device thread 4 and database thread 3.

FIG. 38D illustrates an example of processing each thread non-sequentially sequentially in accordance with a processing order. For example, the processing order indicates to process a first portion of database thread 5 (DBT 5), then process database thread 1, then process a second portion of DBT 5, and so on processing database thread 2, a first portion of computing device thread (CDT) 4, DBT 3 and a second portion of CDT 4.

FIG. 39 is a schematic block diagram of an embodiment of an example of a node 37 of a computing device operably connected to a network connection 41 via a network connection (NC) bus 392, non-volatile memory 390 via a disk memory (DM) bus 394, and a main memory via a main memory (MM) bus 396 and a processing module (PM) bus 398. The node 37 includes a set of processing core resources 1-n 378. Each processing core resource includes a network interface module 46, a memory interface 395, a cache memory 45, and a main memory interface module 43, operably coupled to a processing module 44. In this configuration, the memory interface 395, the main memory interface module 43 and the network interface module 46 of a processing core resource 378 can operate more independently of the processing module 44. This further supports increased parallel operation of database functions to further reduce execution time.

FIG. 40 is a simplified block diagram of a node 99 within a cluster of a highly parallel database management system. The database storage node 99 includes two sockets 105 and 107, each of which includes one or more processing units (also interchangeably referred to herein as cores and central processing units). The node 99 also includes a memory (such as 32 GB of DRAM) 109, a storage disk drive 114, and a networking interface ("MC") 121 that are operatively coupled to the socket 105. An operating system (such as Linux operating system) 122 runs on the processing units of the socket 10. The operating system 122, the memory 109, the socket 105, the NIC 121 and the disk drive 114 are collectively referred to herein as a silo 101. The silo system 101 includes all processing units within the socket 105 and all the disk drives (such as the disk drive 114) operatively coupled to the socket 105. The node 99 further includes a memory 113, two storage disk drives 115 and 117, and a NIC 120 that are operatively coupled to the socket 107. The operating system 122, the memory 113, the storage disk drives 115 and 117, and the NIC 120 are collectively referred to herein as a silo 103.

A specialized computer software 126 for managing data runs on the operating system 122 within the silos 101 and 103 respectively. In one implementation, the operating system 122 is a single instance running on the sockets 105-107 of the node 99. In one implementation, the specialized computer software 126 programs each silo to perform a part of a task. The specialized computer software 126 can also program one silo (such as the silo 101) to perform one task, and another silo (such as the silo 103) to perform a different task.

The disk drives 115-117 are storage devices for storing data, and can be, for example, Non-volatile Random-Access Memory ("NVRAM"), Serial Advanced Technology Attachment ("SATA") Solid State Drives ("SSDs"), or Non-volatile Memory Express ("NVMe"). As used herein, drives, storage drives, disk drives and storage disk drives are interchangeably used to refer to any types of data storage devices, such as NVRAM, SATA, SATA SSDs and NVMe. Each of the disk drives (such as the drives 115-117) has one or more segments. For ease of illustration, each of the disk drives 115-117 is said to include only one segment and interchangeably referred to as a segment herein. Segments within a cluster form a segment group.

The processing units within the socket 105 directly access the memory 109, the NIC 121 and the disk drive 114 over electrical interfaces, such as Peripheral Component Interconnect Express ("PCIe"). For example, the socket 105 directly accesses these physical devices via a PCIe bus, a memory control, etc. Similarly, the socket 107 directly access the memory 113, the NIC 120 and the disk drives 115-117.

In contrast, the processing unit(s) within the socket 107 accesses the memory 109, the disk drive 114 and the NIC 121 via an interconnection interface 152. Similarly, the processing unit(s) within the socket 105 accesses the NIC 120, the disk drives 115-117 and the memory 113 via the same interconnection interface 152. The access over the interconnect interface 152 between the sockets 105 and 107 is referred to herein as an indirection connection. In other words, a socket within each silo directly accesses physical devices within the same silo, and indirectly accesses physical devices within a different silo. Physical devices within one silo are said to be local to the silo and remote to a different silo.

In one implementation, the interface 152 is a QuickPath Interconnect ("QPI") interface or an UltraPath Interconnect ("UPI") interface. The indirect access between the silos 101-103 incurs a performance penalty due to latency inherent in indirect access. Furthermore, the interconnect interface 152 becomes a bottleneck in indirect access. In addition, the interconnect interface 152 has a bandwidth limitation. Accordingly, accessing remote devices over the interconnect interface 152 is less desirable. To overcome the performance issues imposed by the indirect access, the present teachings provide the specialized database management system software 126 to implement a silo oriented database system.

In the silo based data management system, the instance of the specialized database management system software 126, running on the processing unit(s) within the socket 105, accesses only the local resources, such as the memory 109, the NIC 121 and the disk drive 114 that are local to the socket 105 and all the processing units within the socket 105. Similarly, the instance of the software 126 running on the processing unit(s) within the socket 107 accesses only the NIC 120, the memory 113 and the disk drives 115-117 local to the socket 107 and all the processing units within the socket 107. In other words, the instance of the software 126 running on the socket 107 do not access the remotely connected physical devices 109, 114, 121 when, for example, data queries are served. However, cross-silo access is possible in certain cases, such as system startup and shutdown. It should be noted that the silo boundary based computing is programmed for a set of predetermined functionality. For example, for storing data into and retrieving data from a database and disk drives, the specialized program 126 limits its access to local devices and avoids remote access to a different silo. The silo boundary control is further illustrated by reference to FIGS. 41A, 41B and 41C.

Referring to FIGS. 41A, 41B and 41C, three flow charts illustrating processes by which the node 99 implements the silo oriented highly efficient database management are shown and generally indicated at 200A, 200B and 200C respectively. The processes 200A-200C are performed by the specialized database management program 126. The process 200A is initiated when the program 126 is loaded and run by the processing units within a socket of a silo, such as the socket 105 of the silo system 101. In one implementation, the software program 126 runs as a process in the silo 101. The process includes one or more threads. The threads within the process share the same virtual address space and can all access the same physical resources (such as memory and other physical devices). At 202, the specialized database management software 126 determines the identification of a list of local devices, such as the processing units within the socket 105, the memory 109, the disk drive 114 and the MC 121. For instance, the software 126 queries the operating system 122 for identification and other information of the list of local devices. Each physical device within the list can be identified by, for example, a name or a handle.

At 204, the special software program 126 performs a specialized memory allocation to allocate a huge page of the memory 109. The huge page is a big swatch of memory (such as 1 GB) that is a virtual memory region. The huge page is physically backed by the memory 109. In other words, the virtual memory region corresponds to a region of the same size on the memory device 109. Multiple accesses to the virtual memory region result in the same physical region being accessed. A processor maintains a cache of virtual-to-physical page mappings (i.e., the Translation Lookaside Buffer ("TLB")); and by utilizing a huge page the special software is able to address larger regions of memory with fewer TLB cache entries. The physically backed huge page is also referred to herein as a physical huge page of memory. The physically backed huge page is within the silo boundary, and corresponds to a segment manifest.

At 206, the specialized software program 126 loads a segment manifest into the physically backed huge page. The manifest describes a hierarchical structure indicating the location of data in the segment (such as the disk drive 114). In one implementation, each segment stores a manifest. A segment with a manifest is further illustrated by reference to FIG. 42.

Turning to FIG. 42, a simplified block diagram depicting a segment 114 with a manifest 301 is shown. In the segment 114, data is stored in coding blocks, such as the coding blocks 311-317. Coding blocks are written into the segment 114 in a sequential order starting from the beginning of the segment 114. In one implementation, the manifest 301 of the segment 114 is stored at the end of the segment 114. In one embodiment, the manifest 301 occupies a fixed size of the disk space on the segment 114. As further described below, the manifest 301 contains the maximum amount of signal for a certain size of storage. The signal is data indicating information about other data, such as the physical location of a block of data within a storage drive.

Returning to FIG. 41A, the manifest resides in memory for the best performance in locating data stored in the local disk drive 114. At 208, the specialized database software 126 pins a thread within the process of the software 126 to one or more processing units (such as CPUs and cores) within the socket 105 via operating systems calls. For example, the calls include "pthread_setaffinity_np" and/or "sched_setaffinity" on a Linux operating system. Operations (such as searches) on the loaded manifest that are performed by the pinned thread are then only performed on the memory 109 within the silo 101, not the memory 113 that is remote to the silo 101.

Referring to FIG. 41B, at 222, the specialized database management software 126 receives a chunk of data for storing into the disk drive 114 via the NIC 121. The chunk of data is some amount of data, such as a set of time based data records of the same or different cluster keys. At 224, the pinned thread processes the chunk of data for storing it onto the disk drive 114. For example, the pinned thread places the chunk of data into an open coding block, and updates the manifest to reflect the exact location where the chunk of data is stored in the segment 114. When the open coding block is full, at 226, the pinned thread directly flushes the coding block into the segment 114. It should be noted that the updated manifest is also flushed to the segment 114 periodically or when certain events occur.

Referring to FIG. 41C, at 242, the specialized database management software 126 receives a request for a chunk of data, such as a set of columns of certain records. At 244, the pinned thread searches the manifest in the physically backed huge page to determine the location of the coding blocks containing the requested data in the segment 114. At 246, the pinned thread reads the coding blocks from the segment 114. At 248, the pinned thread returns the request chunk of data over the NIC 121. It should be noted that the processes 200B-200C directly accesses the disk drive 114 using its identification determined by the process 200A. Furthermore, the process 200C directly accesses the NIC 121 using its identification determined by the process 200A. Accordingly, the operations to store a chunk of data are performed within a single silo; and the operations for retrieving and returning a chunk of data are also performed within a single silo. The silo oriented database management thus provides superior performance and efficiency.

Many types of data are generated in great volumes and of similar or same formats. For example, a computer network logger produces large volumes of records of the same format. Another example of the time based data is weather data. Each record includes a time stamp (meaning the time when the record is generated), a cluster key, and a number columns of other types of data. The cluster key can identify, for instance in network log data, a source IP address and a destination IP address. The source IP address is the IP address of the computer or device sending the data contained in the record, while the destination IP address is the IP address of the computer or device receiving the data contained in the record. In one implementation, the cluster key is derived from the source IP address (also referred to herein as local IP address) and the destination IP address (also referred to herein as remote IP address). Alternatively, the cluster key is derived from the local IP address, the remote IP address and a remote IP port number associated with the remote IP address. The remote IP address and the remote port collectively identify the remote computer receiving the data.

Such time stamp based data is uploaded to a database management system to be stored in disk drives, such as the disk drives 114-117. A logical representation of the time based data is further illustrated by reference to FIG. 43. Referring to FIG. 43, a table illustrating time stamp based data is shown and generally indicated at 400. The data is represented as a list of records 0-M (M stands for a positive integer). Each record has a time stamp in column 0, such as Oct. 12, 2016, 19:03:01, CST. The time stamp may further include additional information, such as milliseconds. A time stamp can also be represented by an integer, instead of a text string. Column 1 of the table 400 contains the cluster key of each record. Columns 2 through N (N stands for a positive integer) contain other data of each record.

The records with the same cluster key are said to be related. Taking a network logger as an example, the cluster key is the pair of source IP address and the destination IP address. All records with the same cluster key are data sent from a particular computer or device to another particular computer or device, and are said to be related herein. The related records have different time stamps and are also ordered by the time stamps. For instance, records 0-500 have a same cluster key while records 501-1000 share a different cluster key.

To maximize the performance in serving requests for such data after it is stored on the disk drives 114-117, the present database management system stores the records 0-M based on columns, instead of rows. Data queries usually request one or more columns of certain records, such as records during a particular time period. Storing the records 0-M by columns allows the minimum amount of reads to retrieve the desired data from a disk drive. The column based data storage in the highly parallel database management system is further illustrated by reference to FIG. 44.

Referring to FIG. 44, a simplified block diagram illustrating the layout of records stored in the segment 114 is shown. A set of representative coding blocks of data are indicated at 502 through 538 with the coding blocks 506, 512,518,524,530,536 being the parity blocks storing parity information for the corresponding coding lines. Each coding block of the coding blocks 502-538 is associated with a coding line that encompasses all segments within a segment group.

For example, data of Column 0 of the records with cluster key 0 (meaning a first cluster key) during a particular time period is stored in coding block 502; data of column 1 of the records with cluster key 0 during the particular time period is stored in coding blocks 502-504; data of column 2 of the records with cluster key 0 during the particular time period is stored in coding blocks 504, 508-510; data of column 3 of the records with cluster key 0 during the particular time period is stored in coding blocks 510 and 514; data of column 4 of the records with cluster key 0 during the particular time period is stored in coding blocks 514-516, 520-522,526; data of column 0 of the records with cluster key 1 during the particular time period is stored in coding block 526; data of column 1 of the records with cluster key 1 during the particular time period is stored in coding blocks 526-528; etc. Records of the cluster key 0 (as well as the cluster key 1) during the particular time period are ordered by their corresponding time stamps from, for example, the oldest to the newest.

The time based data is sequentially stored in segments groups, each of which comprises a set of segments. A particular time period is mapped to a small fixed set of segment groups. For example, in one implementation, a particular time period is mapped to a unique segment group. As an additional example, a particular time period is mapped to two segment groups in a different implementation due to the fact that segment groups can overlap slightly in time at their boundaries. The mapping is further illustrated by reference to FIG. 45. Turning to FIG. 45, a simplified block diagram illustrating a storage cluster of time based data is shown and generally indicated at 600. The cluster 600 includes a set of nodes, of which two are indicated at 602 and 604. The node 602 includes data storage disk drives 606 (such as the drive 114), 608 and 610 while the node 604 includes disk drives 612, 614 and 616. The drive 606 includes a segment 622; the drive 608 includes three segments 624, 626 and 628; the drive 610 includes two segments 630 and 632; the drive 612 includes a segment 642; the drive 614 includes three segments 644, 646 and 648; and the drive 616 includes two segments 650 and 652. The illustrative cluster 600 includes segment groups 672, 674, 676, 678, 680 and 682. The segment group 672 includes the segments 622, 642 and other segments (not shown). As another example, the segment group 680 includes the segments 630 and 650.

The time based data between time TA and time TB is stored in the segment group 672; the time based data between time TB and time TC is stored in the segment group 674; the time based data between time TC and time TD is stored in the segment group 676; and so on. The time stamps TA, TB, TC, TD, TE, TF and TG are ordered from the oldest to the latest. Accordingly, when a data record is requested, the segment group storing the record is first determined based on the time stamp of the record. The time based storage of data in the cluster 600 thus provides an efficient and faster response to a data query. The lengths of different time periods, such as from TA to TB and from TB to TC, may differ.

When time based data records are received, a segment group and a segment within the segment group is first determined for storing the record. For example, a function is performed on the cluster key of the records to determine the segment group and the segment. The function is shown below:

function(cluster key)=segment group identifier and segment identifier

The data records are then forwarded to the node (such as the node 99) having the segment. The data records are then received by the target node. For example, the data record is received at 222 of the process 200B. The function (cluster key) enables even distribution data records between segments within a segment group.

For efficiently placing and searching the time based data records, a hierarchical manifest for each segment is created and managed by the specialized database management software 126. The manifest is further illustrated by reference to FIGS. 46-47. Turning first to FIG. 46, a logical representation of a manifest is shown and generally indicated at 700. Time based data is grouped by cluster keys (such as the cluster key 0 and the cluster key 1); and time based data of each cluster key is grouped into buckets based on time. For example, a first data bucket of the cluster key 0 includes data from time stamp TA1 to time stamp TA2; a second data bucket includes data from time stamp TA2 to time stamp TA3; and a third data bucket includes data from time stamp TA3 to time stamp TA4. In one implementation, the time period for each data bucket is the same. In other words, TA2−TA1=TA3−TA2=TA4−TA3.

Within each data bucket, data records are organized by columns starting from column 0 to column 1 to column 2, and so on. Taking the cluster key 0 as an example, the data in the column 0 within the bucket of the period from TA1 to TA2 is stored in one or more coding blocks. The coding blocks are identified by a starting coding block number SL0, and an ending coding block number EL0. The coding block numbers SL0 and EL0 are also referred to herein as a starting coding block line and an ending coding block line. Accordingly, SL0 and EL0 identify one or more consecutive blocks on the segment storing the corresponding data. SB0 indicates the starting byte location from the beginning of the first coding block of the one or more consecutive coding blocks, while EB0 indicates the ending byte location from the beginning of the first coding block of the one or more consecutive blocks. In other words, the storage space starting from the byte at SB0 to the byte at EB0 in the one or more consecutive coding blocks store the data of the column 0 of the time based records in the data bucket between TA1 and TA2 of the cluster key 0. A data bucket cannot be empty. If no data is present for a particular time period, no bucket is stored, and during retrieval the lack of a bucket is interpreted as there being no data for that time period. In one embodiment, the manifest is immutable; and, if changes are required, the entire manifest is regenerated.

Referring to FIG. 47, a simplified block diagram illustrating the memory structure of the manifest 700 is shown. Cluster keys are stored in memory slots 802, 804 and 806 (indicating multiple memory slots). Each of these slot further stores a location, such as offset from the beginning of the manifest 700, of the corresponding buckets for the associated cluster key. Taking cluster key 0 in the memory slot 802 as an example, the data bucket location information is pointed to by the location and stored in the memory slots 808, 810 and 812. Taking the first data bucket as an example, it is indicated in the memory slot 808, which contains the time stamps of the bucket and a location pointing to the column information of the bucket. The location points to the memory slot 822, which stores information (such as data type) of the column 0 and a location pointing to the memory slot 842. The memory slot 842 stores the starting coding line number (SL0), the ending coding line number (EL0), the starting byte offset (SB0) and the ending byte offset EB0. There could be more than one memory slot (such as the memory slot 842) corresponding to a particular column when the span of data for a key/column pair interests with one or more parity blocks. The compact structure of the manifest 700 contains the maximum amount of signal about stored data while using the least amount of memory.

In one embodiment, the time based data is compressed before it is stored into a segment of the node 99. For instance, the data of column 3 of a particular data bucket of a particular cluster key is encoded. The compression can be optionally performed on some columns. For example, the compression is not performed on the time stamp and cluster key columns. The compression form can be, for example, Run-Length Encoding ("RLE"). In one implementation, the compression is performed at 224 of the process 200B.

Certain types of data, such as genomic base pairs in a genome sequence, are created in such a manner that the data value is not known to be 100% accurate. In other words, there is not a 100% confidence in the accuracy of such data. For instance, a gene sequencer may estimate that a genomic base pair at a given location is 90% likely to be C-G and 10% likely to be A-T. As an additional example, when network traffic data is collected, the accuracy of each data record may be affected by the bit error rate of the network hardware or some other reasons. When mathematical and statistical analysis is later performed on such data without 100% confidence in its accuracy, the confidence of the calculated output data would be affected by the less than 100% confidence in the network traffic data. Accordingly, in one embodiment, the confidence information about the data is stored in the database. When the data records are retrieved from the database system storing such records, the corresponding data confidence is also retrieved. The data confidence is further incorporated and considered in the analysis of the data records.

The data without 100% confidence in accuracy and the confidence information are further illustrated by reference to FIG. 48. Referring to FIG. 48, a data record without 100% confidence in its accuracy is shown and generally indicated at 900. The data record 900 includes columns 902 through 908. The confidence information is stored in one or more additional columns, such as the column 910. The data record 900 is first constructed in memory of a database management system computer and then stored in, for example, the segment 114.

Various datasets, such as network traffic data, financial transactions, and digital sensor data, are growing rapidly each day and becoming so large that humans can no longer examine such data and get a sense of what is unusual with such datasets. Accordingly, computers are needed to analyze these large datasets to determine whether any data abnormality are present. Computers generally analyze a dataset by performing analyses, such as calculating a standard deviation or a distance between data points. As used herein an analysis is also referred to as a calculation. On a large dataset, only a limited number of calculations could be effectively performed. Accordingly, prioritizing calculations to perform on large datasets is more desirable.

For example, it is beneficial to prioritize those next calculations of data abnormality in a dataset by prioritizing the calculations likely to complete faster. In a different implementation, future analytical calculations are prioritized based on how the results of previous calculations are scored. An analytical calculation similar to a previously executed calculation with high scoring results is also prioritized higher. In other words, the analytical calculation is assigned with the same priority score. The analytical calculation prioritization is further illustrated by reference to FIGS. 49A and 49B.

Referring to FIGS. 49A and 49B, two flowcharts depicting two processes by which a computer (such as the node 99) prioritizes analytical calculations are shown and generally indicated at 1000A and 1000B respectively. At 1002, a specialized software application running on the computer determines characteristics of a dataset. The characteristics include, for example, the number of records in the dataset and data types of columns of the records. At 1004, the software application determines a list of analytical calculations that may be executed on the dataset for determining any abnormality (such as errors, distorted data, data noise, etc.) in the dataset. At 1006, the software application prioritizes the list of analytical calculations based on the characteristics of a dataset and the characteristics of each analytical calculation in the list. For example, whether a calculation processes a dataset by performing only linear operations (such as comparisons) is a characteristic of the analytical calculation. As an additional example, whether a calculation processes a dataset by performing square root operations is a characteristic of the analytical calculation. Some characteristics deem the execution of a calculation on a dataset to be slower while others are faster. The prioritization associates a rank with each analytical calculation. At 1008, the software application selects the highest ranked analytical calculation from the prioritized list of analytical calculations. At 1010, the software application executes the selected analytical calculation on the dataset.

Referring now to FIG. 49B, at 1062, the software application executes each analytical calculation within a list of analytical calculations on a particular dataset. The list of analytical calculations includes one or more calculations. At 1064, the software application determines a result score of the execution of each analytical calculation on the dataset. At 1066, the software application ranks the list based on the scores. At 1068, the software application determines than an unlisted analytical calculation (meaning an analytical calculation that is not in the list) is similar to a listed analytical calculation (meaning a particular analytical calculation within the list). For example, the similarity is based on similar characteristics of the two analytical calculations. At 1070, the software application associates the rank of the listed analytical calculation with the unlisted analytical calculation.

The present disclosure teaches a massively parallel database management system optimized for managing time based data. The database system provides significant performance improvement over conventional database management system. For example, the massively parallel database management system is capable of processing tens and even hundreds of millions of data queries per second. To achieve the unprecedented performance, the database management system incorporates various novel features, such as high speed hybrid indexing tables in memory for fast search, a three tiered hierarchical dynamic query and data processing system, and others as set forth herein.

Referring to FIG. 50, a simplified block diagram of a cluster of nodes within the massively parallel database management system is shown and generally indicated at 1100. The cluster 1100 includes a set of nodes, such as nodes 1104, 1106, 1108, 1110 and 1112. The cluster 1100 also includes a query coordinator 1102. In one implementation, the query coordinator 1102 is a node within the set of nodes 1104-1112. In such a case, the particular node acts as a query coordinator for a period of time or on a per query basis. Alternatively, the query coordinator 1102 is a dedicated computer within or outside of the cluster 1100. When a query ("Q") for data is received by the cluster 1100, the cluster 1100 processes the query and returns the requested data. For example, the query is a data query for time based data between timestamp T1 and T2 sent from local IP address IP1 to remote IP address RIP1 and remote IP port RP1. The query coordinator 1102 forwards the query to each node within the cluster 1100. In response, each node (including the node 1102) within the cluster 1100 processes the same query, and returns data that it stores and meets the requirements of the query.

Each node within the cluster 1100 maintains one or more fast hybrid indexing table structures in memory for high speed data query processing. One high speed hybrid indexing table is illustrated in FIG. 51 and generally indicated at 1200. Referring to FIG. 51, the hybrid indexing table 1200 is a list of entries 1298. The entry 1298 includes an indicator 1202, a local IP address ("LIP") 1204, a remote IP address ("RIP") 1206, a remote IP port ("RP") 1208, a value field 1210. The entry 1298 is a header entry when it indicates a collection of other header entries and data entries. In such a case, the value field 1210 is the count of entries within the collection plus the header entry itself. When the entry 1298 is a data entry, it indicates a cluster key in the value field 1210.

The illustrative hybrid indexing table 1200 includes entries 1222 through 1252. The collection of entries with LIP1 in the LIP field 1204 is indicated at 1262 while the list of entries with LIP2 in the LIP field 1204 is indicated at 1264. The entry 1222 in the list 1262 is the first entry with the first bit of the indicator 1202 set to 0 and other bits set to 1. The 0 value indicates that the entry 1222 is a header entry and starts with a new LIP, i.e., LIP1 in this case. The value 10 in the value field 1210 of the entry 1222 indicates that the 10 entries 1222-1240 all have the same local IP address LIP1. The value 10 is also referred to herein as the length of the list 1262.

The first two bits of the indicator 1202 of the entry 1224 are set to 00 indicating that the entry 1224 is a header entry with a new remote IP address, i.e., RIP1 in this case. The value 3 in the value field 1210 of the entry 1224 indicates that the 3 entries 1224-1228 all have the same LIP1 and RIP1. All bits of the indicator field 1202 of the entries 1226-1228 are set value 1. Accordingly, the entries 1226-1228 are data entries. In each data entry, the value field 1210 contains a cluster key derived from the LIP, RIP and RP of the data entry. For example, the key 1210 of the entry 1226 is a cluster key derived from LIP1, RIP1 and RP1. The entry 1230 starts a new RIP, i.e., RIP2 in this case. In the list 1274 starting from the entry 1230, there are five data entries 1232-1240. The list 1264 starts with the header entry 1242 with a new LIP, i.e., LIP2 in this case.

In one implementation, the list 1200 is an ordered high-speed hybrid indexing list sorted by LIP, RIP and then RP fields. The sorted hybrid indexing list 1200 allows fast search, such as binary search because each entry 1298 is of the same size. For example, when a query requests for data sent from a particular LIP to a particular RIP at a particular RP, the ordered hybrid indexing list 1200 supports an extremely fast search for determining the cluster key corresponding to the query. Each cluster node can also maintain additional ordered hybrid indexing lists. For example, an additional list is ordered by RIP, RP and then LIP. Furthermore, additional lists are not limited to a single three-level deep segmentation. The ordered hybrid indexing structure is equally efficient at one, two, or any N-deep configuration.

The hybrid indexing table 1200 includes a plurality of header entries with entry counts and a plurality of data entries with cluster keys. Furthermore, each data entry includes both data identifying communication devices and a cluster key. Header entries and data entries each incorporate an indicator 1202. The indicator specifies the type of the entry and the type of the header entry when the entry is a header entry.

The hybrid indexing table 1200 illustrates a hierarchical indexing structure. The hierarchical indexing structure 1200 illustrates a hierarchy with two levels indicated by the header entries 1222 and 1242, and the header entries 1224 and 1244. The hierarchical indexing structure 1200 can be a hierarchy of more than two levels. For instance, the third level can be indicated by header entries of different port numbers.

In a different implementation, the hierarchical indexing structure 1200 is used to record the usage data of mobile devices, such as cell phones. In such a case, the tier one header entries, such as the header entries 1222 and 1242, identify unique mobile devices by, for example, their Mobile Identification Number ("MIN") or International Mobile Subscriber Identity ("IMSI"). The tier two header entries, such as the header entries 1224, 1230 and 1244, identify mobile device event types. The data entries include mobile usage data, such as phone calls, network access, application usage, etc.

In another implementation, the hierarchical indexing structure 1200 is used to record TV watching data. In such a case, the tier one header entries, such as the header entries 1222 and 1242, identify unique customer accounts by, for example, their account numbers. The tier two header entries, such as the header entries 1224, 1230 and 1244, identify TV set-top boxes. The data entries include TV watch data, such as watched channels and data and time, etc.

In yet another implementation, the hierarchical indexing structure 1200 is used to track and log system events of networked servers. In such a case, the tier one header entries, such as the header entries 1222 and 1242, identify unique server computers. The tier two header entries, such as the header entries 1224, 1230 and 1244, identify event categories. The tier three header entries identify event types. The data entries then include system event data, such as logins, etc.

High speed data retrieval is further illustrated by reference to FIG. 52, in which a flowchart depicting the data retrieval using hybrid indexing lists is shown and generally indicated at 1300. At 1302, the cluster 1100 receives a data query for retrieving some amount of data. At 1304, the query coordinator 1102 distributes the query to all nodes within the cluster (such as the cluster 1100). At 1306, each node determines the characteristics (also referred to herein as attributes) of the query, such as a LIP, a RIP, a RP and time internal of the data requested. At 1308, the node searches a hybrid indexing table, such as the fast hybrid indexing list 1200 based on the characteristics of the query. The search is fast since the fast hybrid indexing list 1200 is sorted. At 1310, the node determines the set of cluster keys corresponding to the query. Each individual cluster key is stored in one entry of the hybrid indexing list 1200.

At 1312, based on the cluster keys and the time interval (indicated by a starting timestamp and an ending timestamp) the node searches a manifest, such as the manifest 700, to determine the location on a storage drive where the requested data is stored. It should be noted that a given cluster key may not exist in all nodes. When a cluster key is not present in the manifest of a particular node, the node then terminates the search for that key. When a cluster key is present in the manifest of a particular node, the node may not have data within the time interval of the query. In such a case, the node also terminates the query for that key and does not read a drive or returns any data. At 1314, the node reads the data from the drive. At 1316, the coordinator combines the read data from different nodes within the cluster. At 1318, the coordinator returns the combined data to the data requestor.

To maximize the data query processing performance of the massively parallel database management and be able to handle tens and even hundreds of millions of queries per second, the database system further incorporates a three tiered hierarchical architecture as shown in FIG. 53. Turning to FIG. 53, a simplified block diagram depicting the three layer hierarchical data query and fetched data processing architecture is shown and generally indicated at 1400. The three layers are indicated at 1482, 1484 and 1486 respectively. The dispatch tier 1482 of the hierarchical query processing system 1400 includes a dispatcher thread 1402; the search tier 1484 includes a set of search threads that run in parallel, such as search threads 1412, 1414 and 1416; and the aggregation tier 1486 include a set of aggregation threads that run in parallel, such as aggregation threads 1422-1432. The hierarchical query processing system 1400 further includes a storage drive access thread 1452 responsible for reading data from a storage drive 1454.

In one implementation, the threads 1402, 1412-1416 and 1422-1432 are pinned to a particular silo, such as the silo 102 or 104. In a further implementation, the thread 1452 is also pinned to the particular silo. The three tier hierarchical query processing system 1400 can thus be implemented in different sockets of each node within a cluster of the massively parallel database management system.

When a node receives a data query (such as that illustrated in FIG. 50), a silo of the node processes the data query and returns the requested data in accordance with the query. The data query handling is further illustrated by reference to FIG. 54. Referring now to FIG. 54, the dispatcher thread 1402 receives the data query (also referred to herein as a work). The dispatcher thread 1402 divide the work into one or more work units that are processed in parallel, such as two work units. A work unit is an independent portion of the work. The work units are then dispatched to different search threads in the search tier. For instance, the dispatcher thread 1402 divides a work into two work units to be processed by and associated with the search threads 1412-1414 respectively. In an alternate embodiment, the work unit is not divided into multiple work units. In such a case, it is said herein that the work unit is divided into one work unit.

As an example, the work is a data query for data sent from a local IP address to a remote IP address at a remote port from time T1 to T2. In one implementation, the dispatcher thread 1402 groups the set of cluster keys for the query, such as that determined at 1310, and associates the groups (i.e., subsets) of the set of cluster keys to different search threads. Each subset of cluster keys is a work unit. In one implementation, a work unit with more cluster keys is considered a bigger work unit.

In an alternate embodiment in accordance with the present teachings, the work unit 1 is a data query for data sent from the local IP address to the remote IP address at the remote port from time T1 to Tm; and the work unit 2 is a data query for data sent from the local IP address to the remote IP address at the remote port from time Tm to T2. In the example above, Tm is a timestamp between timestamp T1 and timestamp T2. When Tm is the middle point between T1 and T2, the work units 1 and 2 are regarded as work units of the same size by the dispatcher thread 1402. In other words, work units 1-2 are equal size work units. When Tm is closer to T2 than to T1, the work unit 1 is regarded as a bigger work unit by the dispatcher thread 1402 and the work unit 2 is regarded as a smaller work unit. When Tm is closer to T1 than to T2, the work unit 1 is regarded as a smaller work unit by the dispatcher thread 1402 and the work unit 2 is regarded as a bigger work unit.

The search threads 1412-1414 process the work units 1-2 respectively. In one implementation, the search threads each divide a work unit into multiple subwork units that are processed in parallel. Each of the subwork units is an independent portion of the work unit. For example, the work unit is divided into the subwork units based on groups of cluster keys. For instance, each subwork unit corresponds to a group of cluster keys. As an additional example, the work unit 1 corresponds to the entire time period between T1 and Tm; and the subwork units correspond to different portions of time periods between T1 and Tm. The different portions of time periods are consecutive and not over lapping. Alternatively, a search thread does not divide a work unit into multiple subwork units. In such a case, it is also said herein that the search thread divides the work unit into one subwork unit. This alternate embodiment is further illustrated in FIG. 63.

The processing of the work units 1-2 is further illustrated by reference to FIG. 55. Referring to FIG. 55, a flowchart depicting a process by which a search thread processes a work unit is shown and generally indicated at 1600. At 1602, the search thread receives a work unit (such as a data query). For instance, the search thread 1412 is notified of the work unit 1 for it to process via a notification event signaled by the dispatcher thread 1402. At 1605, the search thread searches a manifest (such as the manifest 700) to identify each cluster key that is present in the work unit and has data. The search thread further identifies the location on the storage drive where data corresponding to the cluster key is stored. At 1606, the search thread divides the work unit into one or more subwork units. For instance, each subwork unit includes one of the identified cluster keys that correspond to data on the storage drive 1454. In a further implementation, more than one cluster key is associated with to a subwork unit. At 1608, the search thread assigns each of the subwork units to an aggregation thread. In other words, the search thread associates each subwork unit with a particular aggregation thread.

The search thread further maintains a list of buffers, which is further illustrated by reference to FIG. 56. Referring to FIG. 56, a block diagram of a buffer list maintained by a search thread is shown and generally indicated at 1700. The buffer list 1700 includes buffers 1702 through 1732, each of which is used to store an individual portion of data read from a storage disk. For instance, each buffer is used to store data of a subwork unit. Each individual buffer is considered to be in-use and unavailable for any additional storage tasks while it is actively being used by a search thread or aggregation thread.

Returning to FIG. 55, at 1610, for each subwork unit, the search thread generates a data read request based on the location determined at 1604. At 1612, the search thread signals the storage drive access thread 1452 to read the requested data of the subwork unit. For example, the search thread formulates a read request into the memory area of the buffer associated with the subwork unit, and notifies the thread 1452 via an event mechanism to process the data read request. In response, the storage drive read thread 1452 handles the request and other data read requests sent from other search threads. In such a case, the drive reading thread 1452 is highly utilized because multiple search threads operate in parallel to feed it with data read requests. Accordingly, the reading of the drive 1454 does not wait for data requests. The waiting occurs when, for example, there is only one search thread overly loaded with providing data read requests, or there are no additional requests to process.

In the tiered hierarchical system 1400, the drive 1454 is highly utilized for providing data with least amount of idling time. Furthermore, since multiple search threads are all submitting data read requests in a silo, the drive 1454 is made to process a large number of parallel requests. Different from conventional database management systems, the highly parallel nature of the new paradigm reduces the total time required to process a given query because it is divided into a large number of parallel tasks to be executed at once, instead of in sequence.

The process by which the storage drive 1452 provides data is further illustrated by reference to FIG. 57. Turning to FIG. 57, a flowchart depicting a process by which a storage drive reading thread handles data read requests is shown and generally indicated at 1800. At 1802, the drive reading thread receives a data read request, such as that sent at 1616. At 1804, the drive reading thread accesses the drive 1454 to read data as required by the data request. At 1806, the drive reading thread signals the aggregation thread that the requested data is available. For example, the data request identifies the aggregation thread. The subwork unit is associated with the aggregation thread by the search thread.

The process by which the aggregation thread processes the data read by the drive access thread 1452 is shown and generally indicated at 1900 in FIG. 58. Referring to FIG. 58, at 1902, the aggregation thread receives the data. For example, the aggregation thread is notified by the drive access thread 1452 when the data is ready and then access the data. In such a case, it is said the aggregation thread receives the data. The data is stored in the buffer entry storing the subwork unit. Alternatively, the data is stored in a different memory area. At 1904, the aggregation thread processes the data. For example, the aggregation thread converts the data into a particular format. As an additional example, the aggregation thread conducts statistical analysis on the data. As still a further example, the aggregation thread searches the data for particular information. At 1906, the aggregation thread signals the search thread that the data is ready.

Turning to FIG. 59, a flowchart depicting a process by which a search thread receives data from aggregation threads, merge the data and return the merged data is shown and generally indicated at 2000. At 2002, the search thread receives data from one or more aggregation threads (such as the threads 1422-1426). For instance, the search thread 1412 receives data corresponding to the subwork units 1-3 from the aggregation threads 1422-1426 respectively. As used herein, a search thread is said to receive data from an aggregation thread when the aggregation thread signals the search thread that the data is available. At 2004, the search thread merges the data corresponding to work unit 1. At 2006, the search thread returns the merged data to the dispatcher thread by signaling the dispatcher thread that the data for work unit 1 is available. At 2008, the search thread releases the usage of buffers of the subwork units 1-3. In other words, these three buffers can be used for new subwork units.

The dispatcher thread 1402 then merges data of all work units of a particular work to produce a final result. For example, it merges data for the work units 1-2 from the search threads 1412-1414. Thereafter, the dispatcher thread 1402 returns the merged data (i.e., data requested by the work) to a requester, such as another computer within the database management system, a web server or a computer of a third party or a different system. The data flow from aggregation threads to search threads and then to the dispatcher thread are indicated in FIG. 60.

In one implementation, a work is concurrently processed by more than one silo within a node as shown in FIG. 64. Each silo implements the hierarchical data processing architecture 1400. After each silo returns the data that it reads from a storage drive, all the data is then combined at 2502 and returned to the coordinator 1102. The coordinator 1102 then combines data from different nodes and returns the combined data to the data requestor.

Different work units oftentimes require different amount of resources, such as computer processing time of a core, and it is not always known in advance the amount of resources that will be necessary. Accordingly, some search threads may have a higher load than others at particular points in time. It is thus desired for search threads to provide backward pressure to the dispatcher thread, i.e., from the tier 2 to the tier 1. More generally speaking, a lower stream tier (or thread) provides backward pressure to an upper stream tier (or thread). The backward pressure communication is further illustrated by reference to FIG. 61.

Referring to FIG. 61, a flowchart depicting a process by which a search thread provides backward pressure to the tier 1482 is shown and indicated at 2200. At 2202, the search thread determines its current load. For example, it derives a load based on the percentage of buffers that are being in use. For instance, when its buffers 1702-1714 are in use and there are twenty buffers in total, the load (also referred to herein as backward pressure) is thirty five percent (35%). At 2204, the search thread indicates the load status to the dispatcher thread 1402 by, for example, a message or a notification event. In response, the upper tier distributes more tasks to less utilized search threads. The backward pressure communication mechanism helps avoid hot spot in the three layered hierarchical parallel system 1400. The task allocation by the tier 1482 is further illustrated by reference to FIG. 62.

Referring to FIG. 62, a flowchart depicting a process by which an upper tier allocates tasks based on backward pressure is shown and indicated at 2300. At 2302, the dispatcher thread 1402 receives a work (such as a data query). At 2304, the dispatcher thread 1402 determines the backward pressure of lower stream threads, such as the search threads 1412-1416. At 2306, the dispatcher thread 1402 divides the work into work units. For instance, the dispatcher thread 1402 groups cluster keys within the set of cluster keys determined at 1310 by dividing the set of cluster keys into different subsets. Each subset of cluster keys corresponds to a work unit.

At 2308, the dispatcher thread 1402 sends more work units to less occupied search threads, and fewer or none work units to more occupied search threads. For example, the allocation of work units between search threads are based on thresholds. When a search thread's load is over a threshold, it then receives no work units (as shown at 2310) until its load falls below the threshold. As an additional example, a search thread with a load of ten percent receives two work units while another search thread with a load of fifty percent receives one work unit when there are three work units available for processing. In a different implementation, at 2312, the dispatcher thread 1402 sends bigger work units to less occupied search threads and smaller work units to more occupied search threads.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprises:
a plurality of nodes, wherein a first node of the plurality of nodes operates in accordance with a computing device operation system (OS) and remaining nodes of the plurality of nodes operate in accordance with a database OS that is utilized for database operations including processing requests regarding data within rows and columns of a table, wherein the first node includes a set of processing core resources, wherein the remaining nodes include a plurality of sets of processing core resources, wherein the plurality of nodes are configured to process a plurality of sets of threads that correspond with an application, and wherein the plurality of sets of threads include a subset of database threads and a subset of computing device threads;
a divided main memory that is divided into a computing device memory section and a database memory section, wherein the database operating system determines the allocation of the divided main memory between the computing device memory section and the database memory section, wherein a plurality of portions of the database memory section of the divided main memory is logically and dynamically divided into a plurality of buffers, and wherein a first database thread of the subset of database threads is assigned a buffer of the plurality of buffers of the database memory section of the divided main memory, and wherein a first computing device thread of the subset of computing device threads utilizes the computing device memory section of the divided main memory;
disk memory; and
a controller hub that includes a memory access control module and a disk memory access control module, wherein:
the memory access control module is operable to coordinate access to the plurality of buffers of the divided main memory by at least some of the subset of database threads in accordance with the database OS and a processing order for processing at least some of the plurality of sets of threads, wherein the first database thread has priority in the processing order over the first computing device thread of the subset of computing device threads; and the disk memory access control module is operable to coordinate access to the disk memory in accordance with the computing device OS.

2. The computing device of claim 1, wherein the memory access control module is further operable to:
coordinate access to the computing device memory section of the divided main memory in accordance with the computing device OS.

3. The computing device of claim 2, wherein the memory access control module is further operable to:
coordinate between the accessing of the computing device memory section and the accessing of the plurality of buffers of the divided main memory.

4. The computing device of claim 1, wherein the memory access control module is further operable to coordinate access to the plurality of buffers of the divided main memory by one or more of:
utilizing a thread-safe cross core lock free data flow function;
utilizing an ordered buffer reuse function;
utilizing an out of order input-output re-ordering function; and
utilizing a deadlock free partitioning function.

5. The computing device of claim 1, wherein the processing order is determined based on one or more of:
processing a threshold number of database threads of the subset of database threads prior to processing a computing device thread of the subset of computing device threads;
an optimization factor that includes one or more of: a size of a thread of the plurality of sets of threads, an estimated computing time of the thread, a type of the thread; and
a protocol that includes one of a first come first served (FCFS) protocol and a first ready FCFS protocol.

6. The computing device of claim 1, wherein the application comprises one or more of:
   a bulk load application;
   a data storage application; and
   a query response application.

7. The computing device of claim 1, wherein a processing core resource of the processing core resources includes one or more of:
   a network interface module;
   a memory interface module;
   a processing module; and
   a cache memory.

8. The computing device of claim 1, wherein the disk memory comprises one or more of:
   solid state memory;
   disk drive memory; and
   non-volatile flash memory.

\* \* \* \* \*